United States Patent [19]
Choi et al.

[11] Patent Number: 5,999,800
[45] Date of Patent: Dec. 7, 1999

[54] DESIGN TECHNIQUE OF AN ARRAY ANTENNA, AND TELECOMMUNICATION SYSTEM AND METHOD UTILIZING THE ARRAY ANTENNA

[75] Inventors: Seung Won Choi, Seoul; Dong Un Yun, Kang-Won Do, both of Rep. of Korea

[73] Assignee: Korea Telecom Freetel Co., Ltd., Seoul, Rep. of Korea

[21] Appl. No.: 08/844,364

[22] Filed: Apr. 18, 1997

[30] Foreign Application Priority Data

Apr. 18, 1996 [KR] Rep. of Korea ............... 96-12172

[51] Int. Cl.$^6$ .................................................. H04B 1/38
[52] U.S. Cl. ................. 455/73; 455/63; 455/277.2; 455/562; 704/226; 342/378; 342/383
[58] Field of Search ......................... 455/132, 137, 455/138, 139, 562, 62, 63, 67.3, 69, 103, 73, 136, 561, 277.1, 277.2; 704/226; 342/350, 375, 378, 380, 383

[56] References Cited

U.S. PATENT DOCUMENTS

| | | | |
|---|---|---|---|
| 5,299,148 | 3/1994 | Gardner et al. | 364/574 |
| 5,525,997 | 6/1996 | Kwon | 342/174 |
| 5,546,090 | 8/1996 | Roy et al. | 342/174 |
| 5,634,199 | 5/1997 | Gerlach et al. | 455/63 |
| 5,752,173 | 5/1998 | Tsujimoto | 455/137 |
| 5,771,439 | 6/1998 | Kennedy, Jr. et al. | 455/63 |
| 5,808,913 | 9/1998 | Choi et al. | 364/574 |
| 5,818,385 | 10/1998 | Bartholomew | 455/440 |
| 5,854,612 | 12/1998 | Kamiya et al. | 342/383 |

OTHER PUBLICATIONS

Fu, Z. et al., "Conjugate Gradient Eigenstructure Tracking for Adaptive Spectral Estimation", *IEEE Transactions on Signal Processing*, 43(5):1151–1160 (May 1995).

Nicolau, E. et al., "Adaptive Arrays", *ELSEVIER*, pp. 135–151, 259–216 (1989).

*Primary Examiner*—Paul Loomis
*Assistant Examiner*—Binh K. Tieu
*Attorney, Agent, or Firm*—Merchant & Gould P.C.

[57] ABSTRACT

This invention provides a design technique of the array antenna, and a telecommunication system and method utilizing the array antenna for enhancing the communication quality and increasing the communication capacity by reducing the interfering signals and noises with the nice beam pattern. And, the design technique of the array antenna, and the telecommunication system and method utilizing the array antenna introduce a simplified computational technique for generating a nice beam pattern having its maximum gain along the direction of the wanted signal and maintaining the gain toward the direction of the interfering signals in as low a level as possible.

44 Claims, 36 Drawing Sheets

SIGNALS TO BE TRANSMITTED

DESIGN TECHNIQUE OF AN ARRAY ANTENNA, AND TELECOMMUNICATION SYSTEM AND METHOD UTILIZING THE ARRAY ANTENNA

FIELD OF THE INVENTION

This invention relates to an array antenna for wireless communication systems, and more particularly to a design technique of an array antenna, and a telecommunication system and method utilizing the array antenna to reduce the effect of interference and noise by controlling beam patterns in real-time.

BACKGROUND OF THE INVENTION

In general, an original signal transmitted by a certain transmitter (hereinafter, simply called a "wanted signal") is always received at a receiving set together with other plural interfering signals. Since the level of distortion in a telecommunication system is determined by the ratio between the power of the wanted signal and total power of all the interfering signals and noises, even if the level of the wanted signal is much higher than each of the interfering signals, the distortion of the communication system can pose a serious problem when the total power of all the interfering signals proportionally increase due to the large number of interfering signals.

In conventional telecommunication systems, interfering signals make it very difficult to extract the information from the wanted signal.

Although an array antenna has been considered as a countermeasure to improve the problems caused by the interfering signals, no practical method of synthesizing the array antenna in an actual telecommunication system has yet been suggested. The problems of applying conventional array antennas, which is based on the method of Eigen-Decomposition, is mainly due to its complexity and operating speed which is too large for real-time processing in telecommunication systems.

The conventional technique about the array antenna was introduced in the following references:

[1] M. Kaveh and A. J. Barabell, "The Statistical Performance of the MUSIC and Minimun-Norm Algorithms for Resolving Plane Waves in Noise," IEEE Trans., Acoust., speech and signal process., vol. ASSP-34, pp. 331–341, April 1986.

[2] T. Denidni and G. Y. Delisle, "A Nonlinear Algorithm for Output Power Maximization of an Indoor Adaptive Phased Array," IEEE Electromagnetic Compatibility, vol. 37, no. 2, pp. 201–209, May, 1995.

The problems in the conventional method of designing array antennas are, first, it requires some knowledge about the location of the wanted signal apriori, and second, it requires so many computations that real-time processing cannot be performed. Especially, when the arrival angle of the wanted signal or the total number of signal sources is unknown, the required amount of computation becomes even larger, which makes it impossible to apply the conventional method of synthesizing the array antenna to the practical signal environment, such as mobile communications.

SUMMARY OF THE INVENTION

To solve the above mentioned problems, it is an object of the present invention to provide a design technique of the array antenna and a telecommunication system and method utilizing the array antenna for enhancing the communication quality and increasing the communication capacity by reducing the interfering signals and noises with the nice beam pattern.

And, the design technique of the array antenna, and the telecommunication system and method utilizing the array antenna introduce a simplified computational technique for generating a nice beam pattern having its maximum gain along the direction of the wanted signal and maintaining the gain toward the direction of the interfering signals in as low a level as possible.

To accomplish the object of the present invention, there is disclosed an array antenna in which the phase delay is appended to the signal induced at each antenna element of the array antenna in such a way that the power of said final array output signal is maximized during the receiving mode and the same phase delay is appended to each of the antenna elements during the transmitting mode so that the signal is transmitted with the same beam pattern as during the receiving mode.

Also, in another aspect of the present invention, there is disclosed an array antenna in which the phase delay to be appended to each signal of said antenna element is determined by the phase of the corresponding element of the eigenvector of the largest eigenvalue of the autocorrelation matrix that is obtained from the signals induced at said antenna elements.

Also, in another aspect of the present invention, there is disclosed an array antenna in which the phase delay is appended to each signal of the corresponding antenna element by a complex-valued gain vector of which the value is determined by said eigenvector of said autocorrelation matrix.

Also, in another aspect of the present invention, there is disclosed a signal receiving apparatus comprising: (a) array antenna, consisting of plural antenna elements with a predetermined position and spacing, for receiving the transmitted signals; (b) phase delaying means, consisting of plural phase delaying elements, for delaying the phase of each signal as desired by the amount determined by the received signals at each antenna element; (c) means for adding the signals each of which is phase-delayed by said phase delaying means; and (d) signal processing means for computing the phase delay from the present value of said final array output and said signal vector provided by said array antenna.

Also, in another aspect of the present invention, there is disclosed a signal transmitting apparatus comprising plural phase-delaying elements each of which appends the phase delay at each signal to be transmitted from the corresponding antenna element by the amount determined by said phase delay vector obtained during the receiving mode.

Also, in another aspect of the present invention, there is disclosed a signal transmitting and receiving method comprising the steps of: (a) setting the initial phase delay vector based on the received signal in such a way that the phase of each signal induced at every antenna element be synchronized to the phase of the signal at the reference antenna element; (b) receiving and transmitting the signals utilizing the complex-valued gain vector (or, phase delay vector) computed in said signal processing apparatus; and (c) repeating the reception and transmission of the signals utilizing the new said gain vector (or, phase delay vector) computed at each snapshot in said signal processing apparatus from the new signal vector received at each snapshot.

Also, in another aspect of the present invention, there is disclosed a signal receiving apparatus comprising: an array antenna consisting of plural antenna elements for catching the signals radiated from signal sources and transferring the induced signals to the signal receiving means; signal receiving means for generating said signal vector (x(t)) by processing the signals transferred from said array antenna utilizing the proper receiving procedures such as frequency-down conversion, demodulation, etc; inner product computing means for generating said final array output (y(t)) by performing the Euclidean inner product between said signal vector (x(t)) and said gain vector (w) at the present snapshot, i.e., $y(t)=w^H x(t)$; and signal processing means for generating said gain vector by processing said signal vector together with said final array output at the present snapshot.

Also, in another aspect of the present invention, there is disclosed a signal transmitting apparatus comprising: phase delaying means for appending the phase delay at the signal to be transmitted by the amount of the phase value of each element of said gain vector, which has been obtained in said signal processing means of said signal receiving apparatus; signal transmitting means for generating the radio frequency (RF) signals by processing each output of said phase delaying means utilizing the proper transmitting procedures such as modulation, frequency-up conversion, etc; and array antenna consisting of plural antenna elements for radiating the signals generated from said signal transmitting apparatus.

Also, in another aspect of the present invention, there is disclosed a signal receiving and transmitting method comprising the steps of: (a) receiving the signals through the receiving antenna elements; (b) setting the initial gain vector (or, phase delay vector) from said signal processing means in such a way that the phase of each signal induced at every antenna element be synchronized to the signal at the reference antenna element; (c) generating the received signal (y(t)) as said final array output by computing the inner product between the received signal vector (x(t)) and said gain vector (w) at the present snapshot, i.e., $y(t)=w^H x(t)$, and the transmitting signals after appending the phase delay at the signal to be transmitted by the amount of the phase value of each corresponding element of said gain vector, which has been obtained during the receiving mode; (d) setting a new snapshot and receiving a new signal through said array antenna; (e) updating said complex-valued gain vector (w) in such a way that said gain vector be as close as possible to the normalized eigenvector corresponding to the largest eigenvalue of said autocorrelation matrix (R) containing said received signal vector (x(t)) at the present snapshot only, i.e., $R(k)=x(k) x^H(k)$ where k denotes the snapshot index; and (f) going back to the third step for continuing the signal reception and transmission as long as the snapshot continues.

Also, in another aspect of the present invention, there is disclosed a signal receiving and transmitting method comprising the steps of: (a) receiving the signals through the receiving antenna elements; (b) setting the initial gain vector (or, phase delay vector) from said signal processing means in such a way that the phase of each signal induced at every antenna element be synchronized to the signal at the reference antenna element; (c) generating the received signal (y(t)) as said final array output by computing the inner product between the received signal vector (x(t)) and said gain vector (w) at the present snapshot, i.e., $y(t)=w^H x(t)$, and the transmitting signals after appending the phase delay at the signal to be transmitted by the amount of the phase value of each corresponding element of said gain vector, which has been obtained during the receiving mode; (d) setting a new snapshot and receiving a new signal through said array antenna; (e) updating said autocorrelation matrix utilizing the predetermined value of the forgetting factor f, i.e., $R(k)=fR(k-1)+x(k) x^H(k)$ where k denotes the snapshot index and the forgetting factor f lies in between 0 and 1; (f) updating said complex-valued gain vector (w) in such a way that said gain vector be as close as possible to the normalized eigenvector corresponding to the largest eigenvalue of said autocorrelation matrix (R) that has been updated as described in the previous step; and (g) going back to the third step for continuing the signal reception and transmission at the next snapshot as long as the snapshot continues.

Also, in another aspect of the present invention, there is disclosed a signal receiving and transmitting method comprising the step of: appending the phase delay to the received signal and the signal to be transmitted by utilizing the phase delay vector instead of said complex-valued gain vector.

Also, in another aspect of the present invention, there is disclosed a signal processing method of controlling beam patterns of a telecommunication system having an array antenna, comprising the steps of: (a) setting the initial phase delay vector ($\phi(0)$) such that the phase of each signal at every antenna element be synchronized to the phase of the signal of the reference antenna element; (b) receiving and/or transmitting the signal utilizing the phase delay vector of the present snapshot; (c) updating the phase delay vector with said eigenvector corresponding to said largest eigenvalue of said autocorrelation matrix from the new autocorrelation matrix computed with the new signal vector; and (d) finding whether the procedure is going back to the second step with the new phase delay vector or it is to be terminated.

Also, in another aspect of the present invention, there is disclosed a signal processing method for minimizing interference and reducing effects of noises by controlling beam patterns of a telecommunication system having an array antenna, comprising the steps of: (a) determining the initial gain vector (w(0)) in such a way that the phase of each signal at every antenna element be synthesized to the phase of the signal of said reference antenna element; (b) receiving and/or transmitting the signal utilizing said gain vector of the present snapshot; (c) increasing the snapshot number, updating said autocorrelation matrix based on the new signal vector, and updating said gain vector with the vector approximating to the eigenvector corresponding to the largest eigenvalue of said autocorrelation matrix; and (d) going back to the second step with the updated gain vector to repeat the procedure. Also, in another aspect of the present invention, there is disclosed a signal processing method for minimizing interference and reducing effects of noises by controlling beam patterns of a telecommunication system having an array antenna, comprising the steps of: (a) synthesizing a residue vector by using a signal vector provided from said array antenna at each snapshot, a final array output signal of said telecommunication system at the last previous snapshot and a value of a gain vector of the present snapshot; (b) synthesizing a scalar value, which is needed to generate a search direction vector, from said residue vector; (c) producing a search direction vector by using said residue vector and said scalar value; (d) producing an adaptive gain by using said signal vector, said search direction vector, said final array output signal of said telecommunication system at the last previous snapshot and the value of gain vector of the present snapshot; and (e) updating said gain vector by using said search direction vector and said adaptive gain at the present snapshot.

Also, in another aspect of the present invention, there is disclosed a signal processing method for minimizing interference and reducing effects of noises by controlling beam patterns of a telecommunication system having an array antenna, comprising the steps of: (a) generating an autocorrelation matrix from a signal vector provided from said array antenna at each snapshot; (b) synthesizing a maximum eigenvalue of the autocorrelation matrix at each snapshot; (c) synthesizing a residue vector from the autocorrelation matrix generated at each snapshot, the maximum eigenvalue, and a present value of a gain vector; (d) synthesizing a scalar value, which is needed to generate a search direction vector, from said residue vector; (e) synthesizing a search direction vector from said residue vector and said scalar value; (f) synthesizing an adaptive gain from said autocorrelation matrix, said search direction vector, said maximum eigenvalue, and the present value of said gain vector; and (g) updating said gain vector from said search direction vector and adaptive gain at each present snapshot.

Also, in another aspect of the present invention, there is disclosed a signal processing method for minimizing interference and reducing effects of noises by controlling beam patterns of a telecommunication system having an array antenna, comprising the steps of: (a) generating a gamma vector and a zeta vector by approximating an autocorrelation matrix operations with a corresponding vector operations by utilizing a signal vector provided from said array antenna at each snapshot; (b) estimating a maximum eigenvalue of autocorrelation matrix by utilizing a gain vector at present snapshot and said gamma vector; (c) generating a residue vector by utilizing said gamma vector, said maximum eigenvalue of autocorrelation matrix, and said gain vector of the present snapshot; (d) generating a scalar quantity by utilizing said residue vector; (e) generating a search direction vector by utilizing said residue vector and said scalar quantity; (f) generating an adaptive gain at each snapshot by utilizing said zeta vector, said search direction vector, said maximum eigenvalue of autocorrelation matrix, and said gain vector at the present snapshot; and (g) updating said gain vector by utilizing said search direction vector and said adaptive gain at each snapshot.

Also, in another aspect of the present invention, there is disclosed a signal processing method for minimizing interference and reducing effects of noises by controlling beam patterns of a telecommunication system having an array antenna, comprising the steps of: (a) synthesizing a residue vector, by utilizing received signals provided from said array antenna at each snapshot, a final array output signal of said telecommunication system at the last previous snapshot and a phase delay vector during the last previous snapshot; (b) synthesizing a scalar value from said residue vector; (c) synthesizing a search direction vector by using said residue vector and said scalar value; (d) synthesizing a value of adaptive gain, by utilizing the received signals of present snapshot provided from the antenna elements, said final array output signal of said telecommunication system at the last previous snapshot, said search direction vector of the present snapshot and said phase delay vector during the last previous snapshot; and (e) updating said phase delay vector by utilizing said search direction vector and said adaptive gain of the present snapshot.

BRIEF DESCRIPTION OF THE DRAWINGS

The novel features believed characteristic of the invention, as well as other features and advantages thereof, will best be understood by reference to the following detailed description of a particular embodiment, read in connection with the accompanying drawings, wherein.

DETAILED DESCRIPTION OF THE PREFERRED EMBODIMENT

The preferred embodiment of the present invention will be explained below with reference to the accompanying drawings.

The array antenna proposed in the present invention performs wireless telecommunication with a beam pattern having its maximum gain along the direction of the wanted signal and maintaining the gain to the other directions in as low a level as possible.

Figure 1:
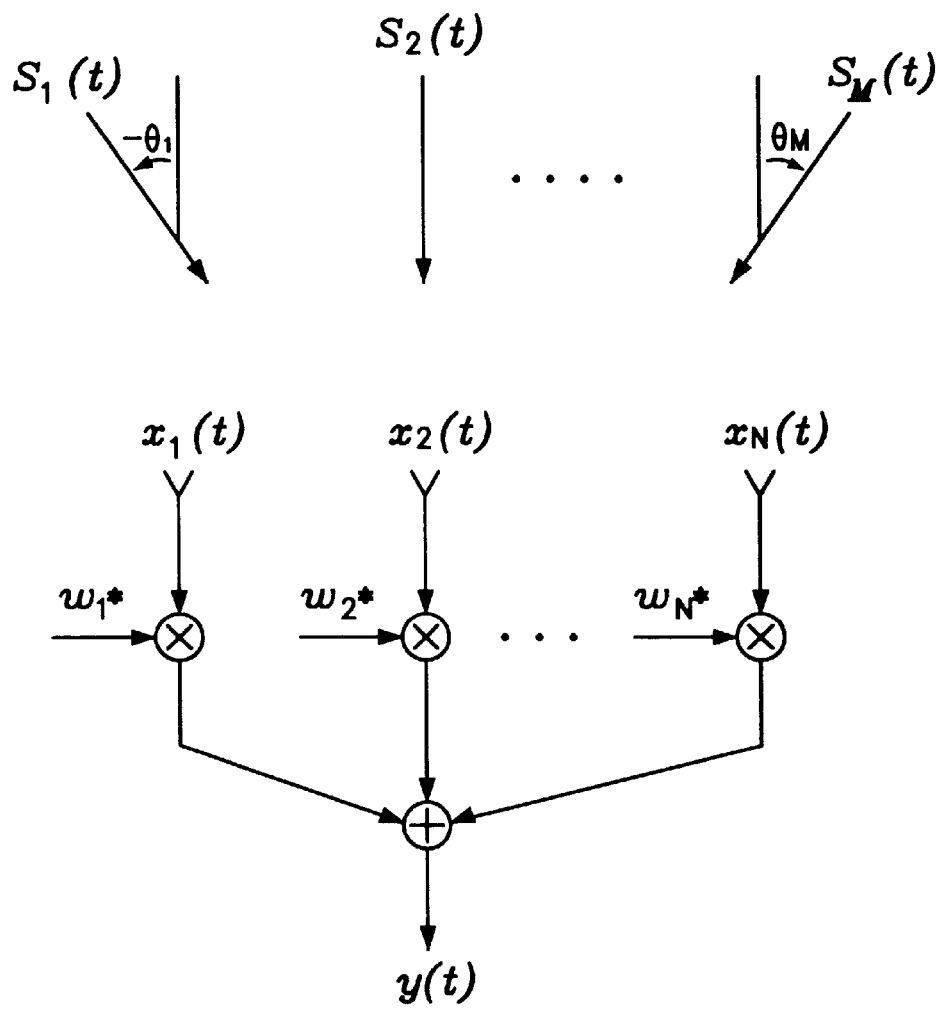
FIG. 1 is a schematic concept diagram to illustrate a structure and operation of the array antenna according to the present invention.

FIG. 1 is a schematic concept diagram to illustrate a structure and operation of the array antenna according to the present invention.

The optimal parameters for the nice beam pattern are provided by a signal processing technique that is included in the present invention utilizing two different approaches.

The first approach is to optimize the value of the complex gain that is to be multiplied to each signal received at each antenna element, and the other approach is to optimize the value of the phase delay that is to be added to each signal received at each antenna element.

The specific explanations about each approach is given separately in this manuscript because the applying means of each approach is different, although the two approaches are theoretically equivalent.

In other words, the present invention determines the complex gain vector "w" in such a way that the desired beam pattern be formed, and as a result, the output of the array antenna, i.e., the Euclidean inner product of the signals induced at the antenna elements and the complex gain vector, should be as close to the wanted value as possible.

If the magnitude of every element of the complex gain vector is normalized to 1, multiplying the signal received at each antenna element by the corresponding element of the complex gain vector w is equivalent to adding the phase delay to the signal by the amount of the phase term of each corresponding element of the complex gain vector w. Therefore, multiplying the signal vector by the gain vector is equivalent to adding the phase of the signal vector by the amount of the phase term of the gain vector.

The same effect can also be obtained by appending the time delay to the signal received at the i_th antenna element by the amount of $\phi i$ divided by $2\pi f_c$, where $\phi i$ and $f_c$ denote the phase delay to be added to the signal received at the i_th antenna element and the carrier frequency, respectively.

Besides the signal processing technique, this invention also includes embodied examples of telecommunication systems having the array antenna for receiving and transmitting signals with the beam pattern wherein the main lobe of the beam pattern points to the direction of the target signal source and the gain along the other directions of the interfering signals is maintained in as low a level as possible. The practical embodied examples of the CDMA (Code Division Multiple Access) mobile communication system is also presented in this invention.

For a linear array antenna having a uniform spacing of $\lambda_c/2$ between adjacent antenna elements, where $\lambda_c$ denotes the wavelength at the carrier frequency, the signal induced at the m_th antenna element can be represented after the frequency down conversion as follows:

$$x_m(t) = \sum_{k=1}^{M} S_k(t) e^{j(m-1)\pi \sin\theta_k} + n_m(t) \tag{1}$$

where $\theta_k$ denotes the incident angle of the k_th signal and $S_k(t)$ is the k_th transmitted signal observed at the receiving end.

The subscript m in equation (1) represents the antenna element. The reference antenna element is assigned to be m=1 and the other antenna elements are assigned the next numbers, i.e., m=2, 3, . . . , in the order of the magnitude of the phase of the signal induced at each antenna element.

In equation (1), one of the M signals is the wanted signal. For example, when $S_1(t)$ is the wanted signal, it must be received at the array antenna while all the other M−1 signals, i.e., $S_2(t)$, $S_3(t)$, . . . , $S_M(t)$, are interfering signals to be rejected, together with the noise $n_m(t)$, for a good signal reception.

Although equation (1) is valid for the linear array with the uniform half-wavelength spacing, the technique provided in the present invention can be generally applied to non-uniform spacing or non-linear array antennas as well.

For non-uniform spacing arrays, if the distance of the m_th antenna element from the reference antenna element is $d_m$, then there exists a phase difference in the signal induced at the m_th antenna element by $$x_m(t) = \sum_{k=1}^{M} S_k(t) e^{j 2\pi \frac{d_m}{\lambda_c} \sin\theta_k} + n_m(t).$$

compared to the phase of the signal at the reference antenna element. Thus, the signal induced at the m_th antenna element for non-uniform and/or non-linear array antennas can be written as follows:

$$2\pi \frac{d_m}{\lambda_c} \sin\theta_k$$

In the present invention, in order to make the phase delay to be appended to each antenna element be a positive quantity, the reference antenna element is defined as the antenna element at which the induced signal has the latest phase in the receiving array. In the transmitting array antenna, therefore, the antenna element at which the induced signal has the earliest phase is the reference antenna element.

As mentioned previously, the reference antenna element is defined to be the antenna element at which the induced signal has the latest phase in the receiving array. In the transmitting array antenna, therefore, the antenna element at which the induced signal has the earliest phase is the reference antenna element. This means that the reference antenna element to communicate with is physically located farthest from the signal source.

Defining the reference antenna element in the way explained above, the array antenna can easily be designed by appending the zero phase delay to the signal at the reference antenna element and the proper positive amount of the phase delay to the signal at the other antenna elements.

For an array antenna consisting of N antenna elements, the array receives the N-by-1 signal vector at every snapshot. The autocorrelation matrix of the received signals can be written as shown in equation (2).

The term "snapshot" in this document denotes the time period during which the new gain vector (or, phase delay vector) is computed upon receiving the new signal vector. In this invention, the array antenna that adapts to the new signal vector can be designed at each snapshot by determining the proper gain vector (or, phase delay vector) for each new signal vector received at every snapshot.

$$\underline{R}_x(J) = \frac{1}{J} \sum_{l=1}^{J} \underline{x}(t + lT_s)\underline{x}^H(t + lT_s) \qquad (2)$$

where the underlined quantities denote the vector or matrix, $T_s$ is the snapshot period and superscript H is the Hermitian operator. The N-by-1 signal vector x(t), of which the number of elements is N, consists of the received signal $x_m(t)$ for m=1, 2, . . . , N, which is explained in equation (1) as follows:

$$x(t) = [x_1(t)X_2(t) \ldots X_N(t)]^T \qquad (3)$$

where superscript T denotes the transpose operator.

However, equation (2) is valid only when the arrival angles of all the signal components remain unchanged. In a time-varying environment where each signal source moves during the communication, as in the mobile communication environment, the autocorrelation matrix cannot be obtained by equation (2) because the arrival angle of the signal source changes at every snapshot.

Therefore, in time-varying signal environments, it is recommended that the autocorrelation matrix be computed in an iterative manner as follows:

$$R_x(J+1) = fR_x(J) + x((J+1)T_s)x^H((J+1)T_s) \qquad (4)$$

where $R_x(J+1)$ and $R_x(J)$ denote the autocorrelation matrix at the J+1st and J_th snapshot, respectively, and f denotes the forgetting factor in the range between 0 and 1.

Since communication environments, especially mobile communications, are generally time-varying environments, the autocorrelation matrix in this invention is computed by equation (4) rather than equation (2).

From various computer simulations, it is recommended to set the value for the forgetting factor, f, in the range between 0.8 and 0.99 for optimal performances in land mobile communications.

Now, the design of the optimal array antenna will be explained in more detail by taking the practical examples of actual applications.

The eigenvalues $\{\lambda_i\}$ of the autocorrelation matrix, determined by equation (2) or (4), can be sorted by the magnitude as $\lambda_1 \geq \lambda_2 \geq \ldots \geq \lambda_N$. The largest eigenvalue $\lambda_1$ is determined by the signal components, not the noise components, regardless of the number of signal sources or antenna elements.

Therefore, the eigenvector corresponding to the largest eigenvalue $\lambda_1$ exists in the signal subspace as follows:

$$\underline{e} = \sum_{i=1}^{M} \gamma_i \underline{a}(\theta_i) \qquad (5)$$

where the complex quantity $\gamma_i$ is a constant determined by the magnitudes and distribution of the wanted and interfering signals, and the vector a(θi) is the steering vector of the i_th signal component in the following form:

$$a(\theta i) = [1 e^{j\pi \sin \theta_i} \ldots e^{j(N-1)\pi \sin \theta_i}]. \qquad (6)$$

Now, suppose the magnitude of the wanted signal is sufficiently larger than each of the interfering signals such that the condition shown in (7) is satisfied.

$$|S_1(t)| >> |S_i(t)| \text{ for } i \neq 1 \qquad (7)$$

In a signal environment in which condition (7) is satisfied, the eigenvector $\lambda_1$ corresponding to the largest eigenvalue can be approximated as:

$$e_1 = \gamma_1 a(\theta_1). \qquad (8)$$

This means that the steering vector, $a(\theta_1)$, of the wanted signal is almost the same as the eigenvector corresponding to the largest eigenvalue except that the complex-valued constant, $\gamma_1$, is multiplied. The complex-valued coefficient $\gamma_1$ in equation (8) can be eliminated when the phase of each signal at every antenna element is synchronized to the phase of the signal at the reference antenna element.

From the above discussions it can be observed that, under the condition that the wanted signal is sufficiently larger than each of interfering signals, the maximum gain of the array antenna will approximately point to the direction of the source of the wanted signal if the gain vector to be appended to the antenna elements of the array antenna is determined by the eigenvector corresponding to the largest eigenvalue of the autocorrelation matrix of the signals impinging upon the array antenna.

In conclusion of the above discussions, this invention suggests that the gain vector can be determined by the following equation:

$$\underline{w} = \frac{1}{\sqrt{N}} \underline{e}_1 \qquad (9)$$

Now, the practical way of computing the optimal weight vector is presented.

As mentioned previously, under a particular signal environment where the wanted signal is sufficiently larger than each of interfering signals, the array antenna having the desired beam pattern, which provides the maximum gain along the direction of the wanted signal source, can be obtained by taking the weight vector w with the normalized eigenvector $e_1$ corresponding to the largest eigenvalue $\lambda_1$ of the autocorrelation matrix.

However, to obtain the autocorrelation matrix itself requires a lot of computations, as shown in equations (2) and (4). Moreover, it is not a simple task to compute the eigenvector corresponding to the largest eigenvalue of the matrix. What makes the problem even more complicated is that the arrival angle of each signal changes at every snapshot in mobile communications such that the eigenvector to be obtained varies at every snapshot.

Considering the above-mentioned difficulties, this invention introduces a method of computing the weight vector w with the approximated value for the eigenvector $e_1$ by utilizing the conjugate gradient method, of which the original version has been developed previously in the following textbook.

[3] M. R. Hestenes, *Conjugate Direction Methods in Optimization*, Springer-Verlag, 1980.

The weight vector w is computed by updating the solution of the previous snapshot through the iterative means as follows:

$$w(k+1)=w(k)+\sigma(k)v(k) \tag{10}$$

where the independent variable k is the time index representing the snapshot, $\sigma(k)$ and $v(k)$ are the adaptive gain and search direction vector, respectively. Note that the gain vector $w(k+1)$ shown in equation (10) should be normalized at each snapshot to make the magnitude of the gain vector be 1.

From equation (10), it is observable that the solution to be computed at the present snapshot be obtained by updating the solution of the previous snapshot in the direction indicated by v(k) by the amount indicated by $\sigma$(k).

In order to compute the solution for the gain vector in the iterative manner mentioned above, however, the answers for the following two questions must be obtained:

First, how do we set the initial value of the gain vector w(0) in the beginning?

Second, how do we set the adaptive gain $\sigma(k)$ and the search direction vector v(k) at each snapshot?

In this invention, the initial value of the gain vector w(0) is determined from the received signal vector x(0) as follows:

$$\omega(0) = \frac{x(0)}{x_1(0)} \tag{11}$$

where $x_1(0)$, i.e., the first element of the signal vector x(0), is the signal induced at the reference antenna element at the very first snapshot.

The reason why the vector w(0) is determined by the equation (11) is that the received signal vector itself, x(0), must be a good approximation for the eigenvector because the rank of the matrix at the initial snapshot is 1 such that the number of the distinct nonzero eigenvalue is only 1, which must correspond to the signal received at the very first snapshot.

The technique introduced in this invention designs the array antenna by updating the weight vector in the manner shown in equation (10) utilizing the adaptive gain and search direction vector through the procedure provided in this invention with the initial value, as shown in equation (11).

In order to apply the CGM (conjugate gradient method) in the design of the array antenna, consider the cost function defined with the Rayleigh quotient given as follows:

$$f(\omega) = \frac{\omega^H(k)R_x(k)\omega(k)}{\omega^H(k)\omega(k)} \quad \text{with a constraint} \quad |\omega(k)|^2 = 1 \tag{12}$$

As can be easily proved mathematically, the maximum or minimum of functional (12) converges to the maximum or minimum eigenvalue of the matrix R(k), respectively, and the value for the vector w(k) is the eigenvector corresponding to the converged eigenvalue.

Since gain vector w of the array antenna must be determined with the eigenvector corresponding to the largest eigenvalue, as explained previously, in order to form the beam pattern providing the maximum gain along the direction of the wanted signal source, the adaptive gain and the search direction vector that maximize functional (12) are provided in this invention.

The adaptive gain $\sigma(k)$ that maximizes or minimizes the functional shown in equation (12) can be obtained by solving the following equation with respect to $\sigma(k)$ at every snapshot:

$$\frac{\partial f(w(k+1))}{\partial \rho(k)} = 0 \tag{13}$$

The solution for equation (13) can be obtained as follows:

$$\rho(k) = \frac{\left[-B \pm \sqrt{B^2 - 4AC}\right]}{2A} \tag{14}$$

where, A=b(k) Re[c(k)−d(k) Re[a(k)], $B=b(k)-\lambda(k)d(k)$, $C=Re[a(k)-\lambda(k)Re[c(k)]$, $\lambda(k)=w^H(k)R_x(k)w(k)$, $a(k)=w^H(k)R_x(k)v(k)$, $b(k)=v^H(k)R_x(k)v(k)$, $c(k)=w^H(k)v(k)$ $d(k)=v^H(k)v(k)$. \tag{15} with Re[\*] being the real part of the complex quantity "\*".

Since the positive and negative sign in equation (14) cause the functional to be minimized and maximized, respectively, the negative sign is selected in this invention for maximizing the functional.

As shown in the constraint of the equation (12), the weight vector w(k) must be normalized at every snapshot.

In the meantime, starting from the initial value of v(0)= $\lambda(0)$ w(0)−Rx(0) w(0), the search direction vector v(k) is updated as follows:

$$v(k+1)=r(k+1)+\beta(k)v(k). \tag{16}$$

The residue vector r(k+1) and the scalar $\beta(k)$ are respectively determined as:

$$\underline{r}(k+1) = \lambda(k+1)\underline{w}(k+1) - \underline{R}_x(k+1)\underline{w}(k+1), \quad (17)$$

$$\beta(k) = -\frac{\|\underline{r}(k+1)\|^2}{\|\underline{r}(k)\|^2} \quad (18)$$

The entire procedure of computing the weight vector provided in this invention can be summarized as follows:

<step 1> Set the initial value for the weight vector and autocorrelation matrix utilizing the received signal as $w(0)=x(0)/x_1(0)$ and $Rx(0)=x(0)x^H(0)$, respectively.

<step 2> Update the autocorrelation matrix by substituting the new signal vector x(k) to equation (4), compute the adaptive gain by equations (14) and (15), and update the weight vector w, as shown in equation (10), utilizing the search direction vector obtained in equation (18).

<step 3> Repeat <step 2> as the new signal vector is received at each snapshot.

According to the procedure provided in this invention, since the entire procedure has been tremendously simplified mainly due to the fact that the suggested method does not require any information regarding the directions of the wanted and interfering signals, the signal reception and transmission can be performed based on real-time processing in most practical signal environments including time-varying environments, such as mobile communications.

As shown in equations (14) and (18), the total amount of computation required to obtain the optimal weight vector by the proposed technique in this invention is only $O(3N^2+12N)$ at each snapshot, which makes it possible that the standard DSP (digital signal processor) can implement the proposed method without any technical problems in the signal environments of land mobile communications where the speed of each subscriber does not exceed 150 km/h.

Although the weight vector providing the desired beam pattern can be obtained with the computational load of $O(3N^2+12N)$ by utilizing the CGM as described above, the entire procedure is still quite complex mainly because the matrix must be updated at each snapshot, as shown in equation (4).

Therefore, in order to simplify the entire procedure even more, we suggest a particular value for the forgetting factor in updating the autocorrelation matrix required in the CGM.

Suppose the forgetting factor is fixed at 0 in equation (4). This particularly means that, as an effort to reduce the complexity of the procedure of the CGM, the autocorrelation matrix is to be determined by the signal vector of the present snapshot only.

Since the signal vectors of the previous snapshots cannot be considered when the arrival angles at each snapshot change too much, to set the forgetting factor to 0 can be applied in general signal environments.

First of all, the computation of the autocorrelation matrix can be simplified as $$R_x(J) \approx x(J)x^H(J). \quad (19)$$

Substituting the above equation into equation (15), all the computational procedures having the complexity of order $O(N^2)$ are simplified as $$\lambda(k)=|y(kT_s)|^2,$$

$$a(k)=y(kT_s)x^H(kT_s)v(k),$$

$$b(k)=|v^H(k)x(kT_s)|^2. \quad (20)$$

where $y(kT_s)$ is the output of the array antenna at the k_th snapshot defined as $y(kT_s)=w^H(k) x(kT_s)$.

As shown in equation (20), if the forgetting factor is fixed at zero, then, since the matrix is determined by the signal vector of the present snapshot only, the procedure of computing the optimal weight vector is considerably simplified and, moreover, the computation of the matrix at each snapshot is not needed, which means the calculation of equation (4) vanishes out of the entire procedure.

From the numerical results obtained in computer simulations, the proposed method, which accounts for the last previous signal vectors as well as for the present signal vector for computing the autocorrelation matrix at each snapshot, provides about 12 dB improvement in SIR (signal-to-interference ratio), whereas the noise power is reduced by the number of antenna elements, i.e., the SNR (signal-to-noise ratio) is increased by the factor of N.

On the other hand, the other method, which uses only the instantaneous signal vector at each snapshot, provides almost the same amount of improvement according to the noises while about 9 dB improvement is obtained in terms of the SIR (signal-to-interference ratio).

Consequently, the simplified version of the proposed method, which uses the signal vector at the present snapshot, only causes a degradation in SIR performance by about 3 dB compared to the original version of the proposed method which uses the signal vectors of the previous snapshots as well as the current signal vector in computing the autocorrelation matrix. However, since the complexity of the entire procedure is tremendously reduced, a simplified version would cause a much easier implementation and cost reduction.

Designing the array antenna utilizing a simplified method, all the operations requiring the computational load of $O(N^2)$ disappear and the total computational load of the entire procedure becomes about $O(11N)$.

Although the simplified version that employs the instantaneous signal vector can only be thought as being successful in terms of the simplification of the entire system, as mentioned above, the performance of the simplified system is inferior to the original version of the proposed method which adopts a proper forgetting factor for treating the previous signal vectors together with the current one. In computer simulations, it has been found that the performance of the simplified system in terms of the BER (bit error rate) is about 10 times worse, compared to the original version, although the SIR performance is not much worse as mentioned previously.

As the need for properly compromising the two versions taking advantages from each version arises, this invention presents another version of the original technique of which the complexity is a little more complicated but the performances, especially the BER performance, is a lot better compared to the simplified version.

The terms in the procedure of the proposed technique that increase the complexity of the system are related to the matrix operations, i.e., $Rx(k) \cdot w(k)$ and $R_x(k) \cdot V(k)$.

Thus, if these two terms are simplified properly, the complexity of the entire procedure can be considerably reduced without approximating the autocorrelation matrix with the instantaneous signal vector.

Letting the above two terms be denoted as $\gamma(k)=R_x(k)w(k)$ and $\zeta(k)=R_x(k) v(k)$, these two terms can be simplified as follows:

During the first snapshot, the $\gamma(0)$ and $\zeta(0)$ can respectively be written as $\gamma(0)=x(0) \cdot x^H(0) \cdot w(0)=x(0) \cdot v^*(0),$
$\zeta(0)=x(0) \cdot x^H(0) \cdot v(0).$
From the second snapshot,
these two terms are updated as $$\begin{aligned}\underline{\gamma}(k+1) &= \underline{R}_x(k+1) \cdot \underline{w}(k+1) \\ &= [f\underline{R}_x(k) + \underline{x}(k+1)\underline{x}^H(k+1)]\underline{w}(k+1) \\ &= f\underline{R}_x(k)\underline{w}(k+1) + \underline{x}(k+1)y^*(k+1) \\ &= f\underline{R}_x(k)[\underline{w}(k) + \rho(k)\underline{v}(k)] + y^*(k+1) \cdot \underline{x}(k+1) \\ &= f\underline{\gamma}(k) + f\rho(k)\underline{\zeta}(k) + y^*(k+1) \cdot \underline{x}(k+1)\end{aligned} \quad (21)$$

$$\begin{aligned}\underline{\zeta}(k+1) &= \underline{R}_x(k+1) \cdot \underline{v}_x(k+1) \\ &= [f\underline{R}_x(k) + \underline{x}(k) \cdot \underline{x}^H(k)]\underline{v}(k+1) \\ &= f\underline{R}_x(k)\underline{v}(k+1) + \underline{x}(k) \cdot \underline{x}^H(k) \cdot \underline{v}(k+1) \\ &= f\underline{R}_x(k)[\underline{\gamma}(k+1) + \beta(k)\underline{v}(k)] + \underline{x}(k) \cdot \underline{x}^H(k) \cdot \underline{v}(k+1) \\ &= f\underline{R}_x(k)\underline{\gamma}(k+1) + f \cdot \beta(k)\underline{R}(k)\underline{v}(k) + \underline{x}(k) \cdot \underline{x}^H(k) \cdot \underline{v}(k+1)\end{aligned} \quad (22)$$

Assuming the residue vector $\gamma(k+1)$ is obtained correctly, since $R_x(k) \gamma(k+1) \approx 0$, the equation (22) can be approximated as $$\approx f \cdot \beta(k) \cdot \zeta(k) + x(k) \cdot x^H(k) \cdot v(k+1). \quad (23)$$

Therefore, the two matrix-related terms, which mainly affect the complexity of the entire procedure, can finally be simplified into the vector operations as follows:

$$\begin{aligned}\underline{\gamma}(k+1) &= \underline{R}_x(k+1)\underline{w}(k+1) \\ &= f \cdot \underline{\gamma}(k) + f\rho(k) \cdot \underline{\zeta}(k) + y^*(k+1)\underline{x}(k+1)\end{aligned} \quad (24)$$

$$\begin{aligned}\underline{\zeta}(k+1) &= \underline{R}_x(k+1)\underline{w}(k+1) \\ &\approx f \cdot \beta(k) \cdot \underline{\zeta}(k) + \underline{x}(k) \cdot \underline{x}^H(k) \cdot \underline{v}(k+1)\end{aligned} \quad (25)$$

According to the above equations (24) and (25), the entire computational load of the proposed technique is about 0(15N). This is a little more complicated compared to the simplified version, which takes only the instantaneous signal vector at each snapshot, but it is much simpler compared to the original version of the proposed method which requires the computational load of about $0(3N^2+12N)$.

From computer simulations considering various signal environments, the compromised version utilizing the procedure of equations (24) and (25) shows almost the same level of performance improvement in SIR and BER compared to the original version.

The noise immunity of the compromised version is the same as the other two versions, i.e., the noise power reduces by about 1/N.

In this document, the vector computed in accordance with the equation (24) and equation (25) are called "gamma vector" and "zeta vector", respectively.

In order to implement the total system, which encounters both receiving and transmitting modes, the optimal weight vector computed during the receiving mode can be applied to obtain the optimal parameters for the transmitting mode.

Figure 2:
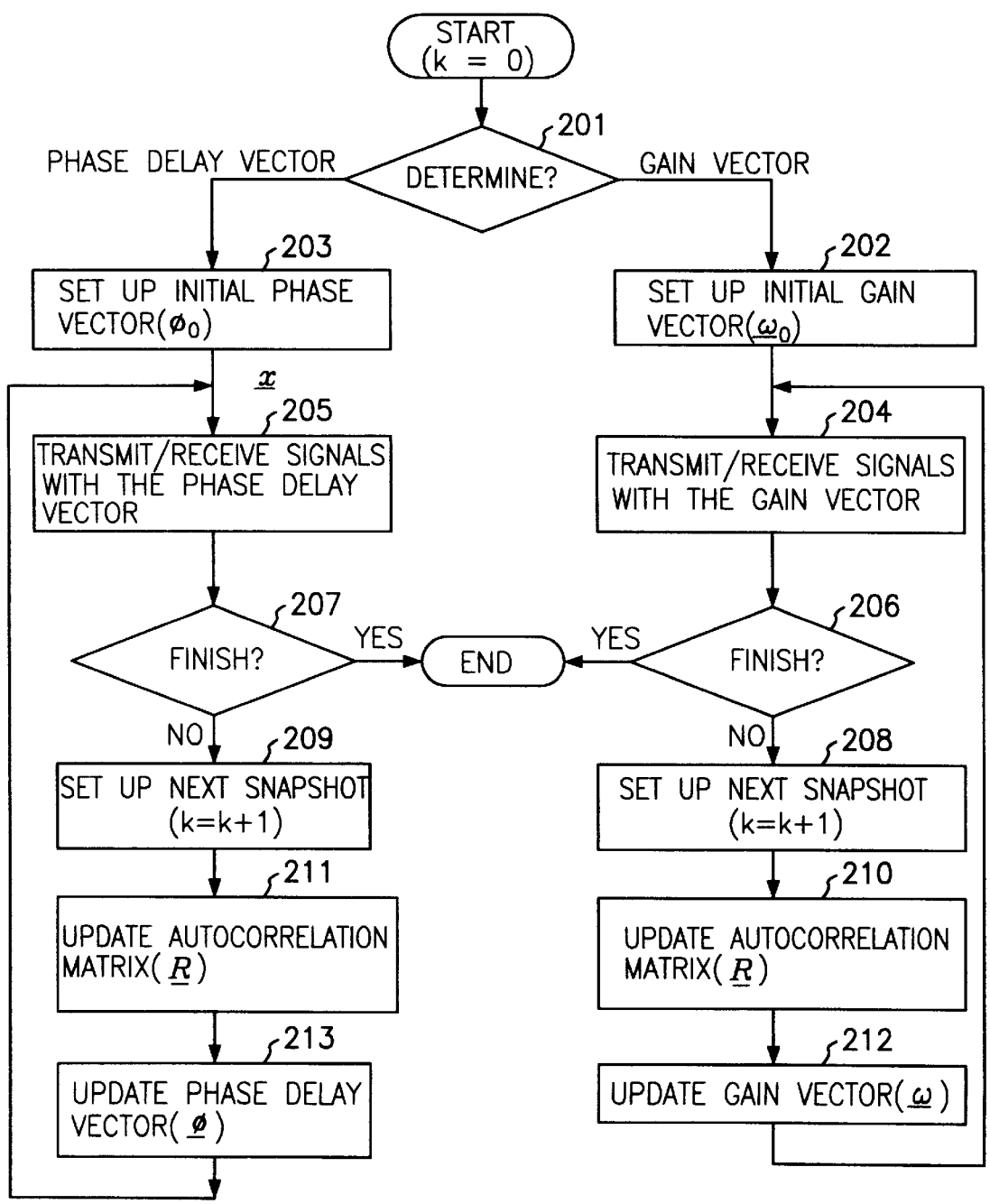
FIG. 2 is a flow chart to illustrate the entire procedure of designing the optimal array antenna.

As described previously, the entire procedure of designing the optimal array antenna and signal processing according to this invention is illustrated in FIG. 2, which can be summarized in two different ways, one is to optimize the phase delay vector and the other is to optimize the gain vector, though both are mathematically equivalent.

First of all, in order to design the array antenna according to this invention, one should determine whether the system is to be designed by the phase delay vector or the gain vector (step 201).

When the system is to be designed by the phase delay vector, the transmission and reception at the very first snapshot can be performed (step 205) based on the initial phase delay vector (step 203). If the snapshot is to be continued (step 207), the next snapshot must be set up (step 209) and said autocorrelation matrix must be updated (step 211) based on the new signal vector received. Then, the phase delay vector must be updated with the value which approximates to the phase of the eigenvector corresponding to the largest eigenvalue of said autocorrelation matrix (step 213). Then, the transmission and reception of signals must be performed utilizing the phase delay vector computed as above such that the above procedures (steps 205, 207, 209, 211 and 213) be repeatedly performed at each snapshot.

The whole procedure utilizing the phase delay vector can be summarized as follows: initially, the initial phase delay vector ($\phi(0)$)is determined (step 203) in such a way that the phase difference between the signals at every antenna element be compensated, then the transmission and reception of signals is continued at each snapshot utilizing the phase delay vector that is computed based on the phase value of the eigenvector corresponding to the largest eigenvalue ($\lambda_{max}$) of said autocorrelation matrix according to the technique provided in this invention.

Meanwhile, when the system is to be designed by the complex-valued gain vector, the transmission and reception at the very first snapshot can be performed (step 202) based on the initial gain vector(step 204). If the snapshot is to be continued (step 206), the next snapshot must be set up (step 208) and said autocorrelation matrix must be updated (step 210) based on the new signal vector received. Then, the gain vector must be updated (step 212) with the value which approximates to the eigenvector corresponding to the largest eigenvalue of said autocorrelation matrix. Then, the transmission and reception of signals must be performed utilizing the gain vector computed as above such that the above procedures (step 204, 206, 208, 210 and 212) be repeatedly performed at each snapshot.

The whole procedure utilizing the gain vector can be summarized as follows: initially, the initial gain vector (w(0)) is determined (step 202) in such a way that the phase difference between the signals at every antenna element be compensated, then the transmission and reception of signals is continued at each snapshot utilizing the gain vector that is computed based on the eigenvector corresponding to the largest eigenvalue ($\lambda_{max}$) of said autocorrelation matrix according to the technique provided in this invention.

As mentioned previously, when the proposed signal processing apparatus, which provides the desired beam pattern, is adopted at the cell-site antenna system, we can achieve not only an increase of the channel capacity and an enhancement of the communication quality but also a considerable extension of the battery's life with each subscriber in the cell.

An extension of the battery's life with each subscriber can be achieved because the cell-site antenna system adopting the proposed beam forming technique provides much better communication efficiency compared to the conventional cell-site antenna system by forming the main lobe along the direction of the wanted signal source.

Therefore, it is possible to perform an acceptable communication even with much less transmitting power at each subscriber's end. To reduce the transmitting power at each subscriber directly causes the life extension of the battery of each of the subscribers.

Now, an explanation of the proposed apparatus and method in more detail by taking practical examples will follow:

First Embodiment

In this embodied example, the technique of designing the signal processing apparatus of the telecommunication system with an array antenna will be disclosed. This technique achieves the above-mentioned object, by computing the phase delay vector generating the beam pattern having its maximum gain along the direction of the desired signal source, in the signal environment where the desired signal is much larger than each of interfering signals.

Figure 3:
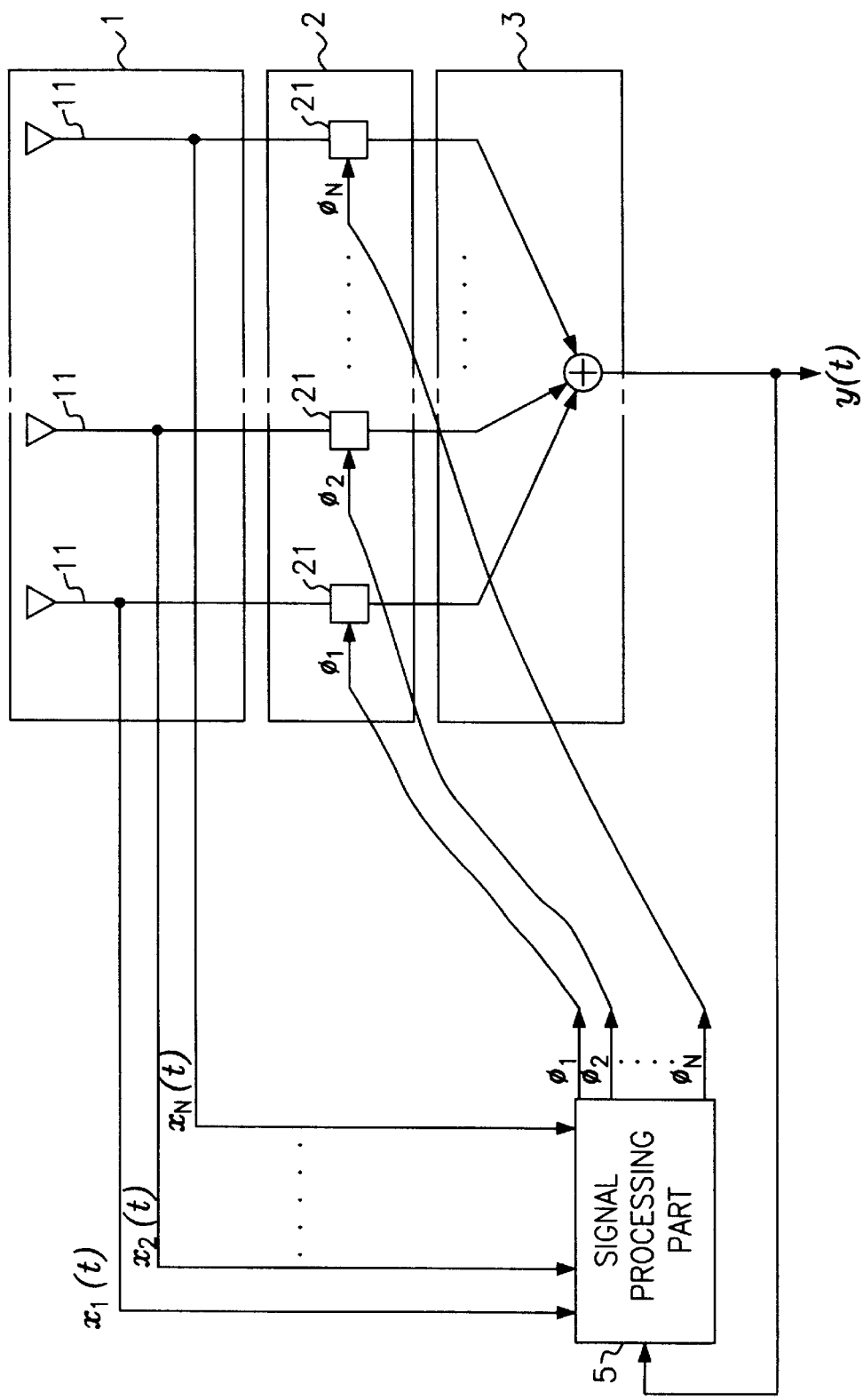
FIG. 3 shows a schematic block diagram of a signal receiving apparatus that utilizes the array antenna according to the first embodiment of the present invention.

FIG. 3 shows a schematic block diagram of a signal receiving apparatus that utilizes the array antenna according to the first embodiment of the present invention.

In the figure, reference number 1 denotes an array antenna, 2 a phase delay part, 3 a delay signal adding part, and 5 a signal processing part.

As illustrated in the figure, the signal receiving apparatus includes the following parts: an array antenna (1) consisting of plural antenna elements (11) for catching the signals radiated from signal sources and transferring the induced signals to a signal processing part (5) and a phase delay part (2); the phase delay part (2) for delaying the signal induced at each antenna element by the amount determined by said phase delay vector; a delay signal adding part (3) for generating said final array output (y(t)) by adding the phase delayed signals; a signal processing part (5) for generating said phase delay vector by processing said signal vector together with said final array output at the present snapshot.

Since the proposed apparatus receives the signals with said phase delay vector that provides the maximum gain along the direction of the target signal source, the level difference between the desired signal and each of interfering signals becomes more dominant. Therefore, the proposed receiving apparatus is very suitable in reducing effects of interferences in the signal environment where the desired signal is much larger than each of interfering signals.

Figure 4:
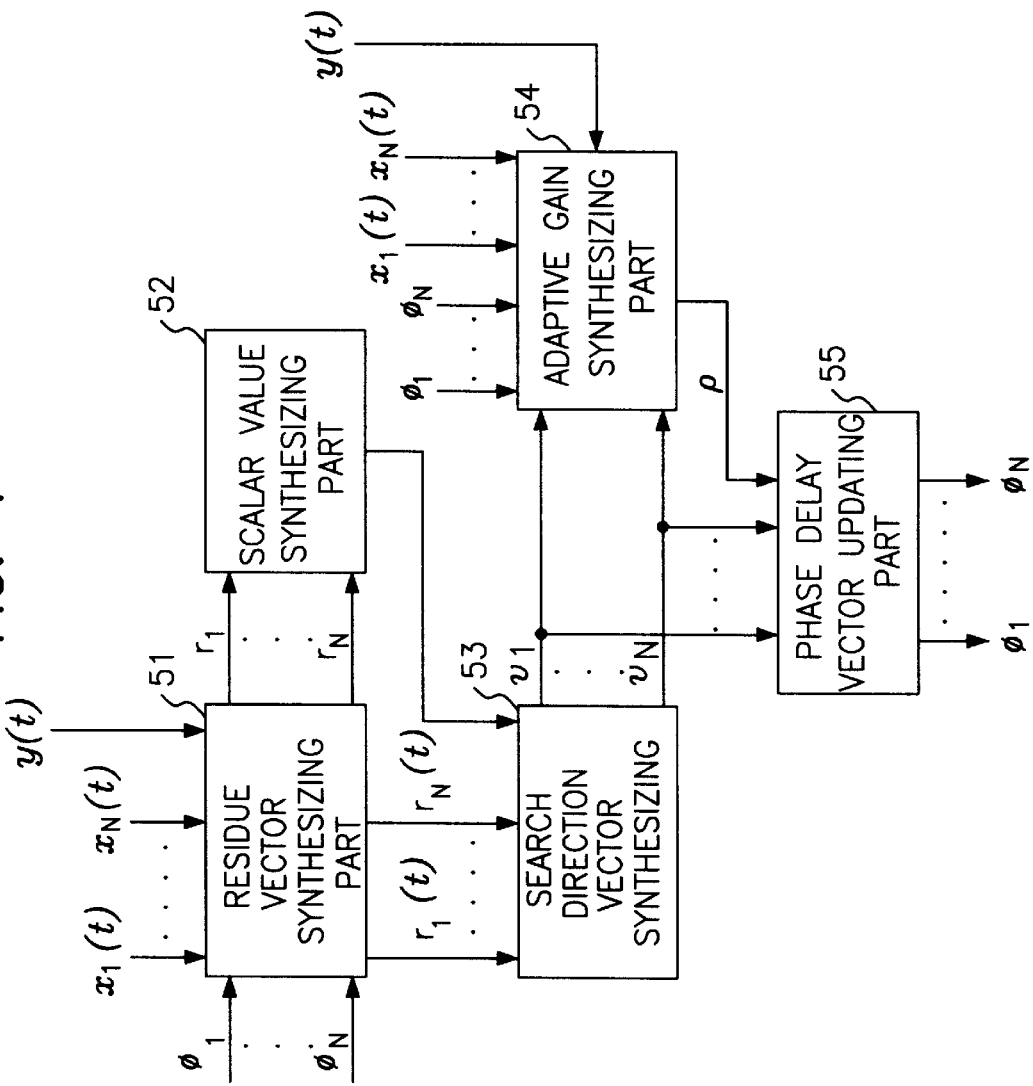
FIG. 4 is an example of the specified structure of the signal processing part shown in FIG. 3.

FIG. 4 is a block diagram of a signal processing part of said signal receiving apparatus shown in FIG. 3 according to an embodiment of the present invention.

In the figure, the reference number 51 denotes a residue vector synthesizing part, 52 a scalar synthesizing part, 53 a search direction vector synthesizing part, 54 an adaptive gain synthesizing part, and 55 a phase delay vector synthesizing part, respectively.

As illustrated in the figure, the signal processing apparatus according to the first embodied example comprises the following parts: the residue vector synthesizing part 51 for generating a residue vector by utilizing a received signals (x(t)) of the present snapshot, which are provided from antenna elements of the telecommunication system at every snapshot, a final array output signal (y(t)) of the array antenna at the last previous snapshot, and a phase delay vector during the last previous snapshot, and for outputting the residue vector; the scalar synthesizing part 52 connected to an output of the residue vector synthesizing part 51, for synthesizing a scalar value from the residue vector; the search direction vector synthesizing part 53 respectively connected to another output of the residue vector synthesizing part 51 and an output of the scalar synthesizing part 52, for producing a search direction vector from the residue vector and the scalar value; the adaptive gain synthesizing part 54 for generating a value of the adaptive gain by utilizing the received signals of the present snapshot provided from the array antenna elements, the final array output signal of the telecommunication system at last previous snapshot, the search direction vector of the present snapshot provided from the search direction vector synthesizing part 53, and the phase delay vector during the last previous snapshot, and for outputting the value of the adaptive gain; and the phase delay vector updating part 55, which is connected to the output of the search direction vector synthesizing part 53 and the adaptive gain synthesizing part 54, for updating the phase delay vector by utilizing the search direction vector and the adaptive gain of the present snapshot.

Figure 5:
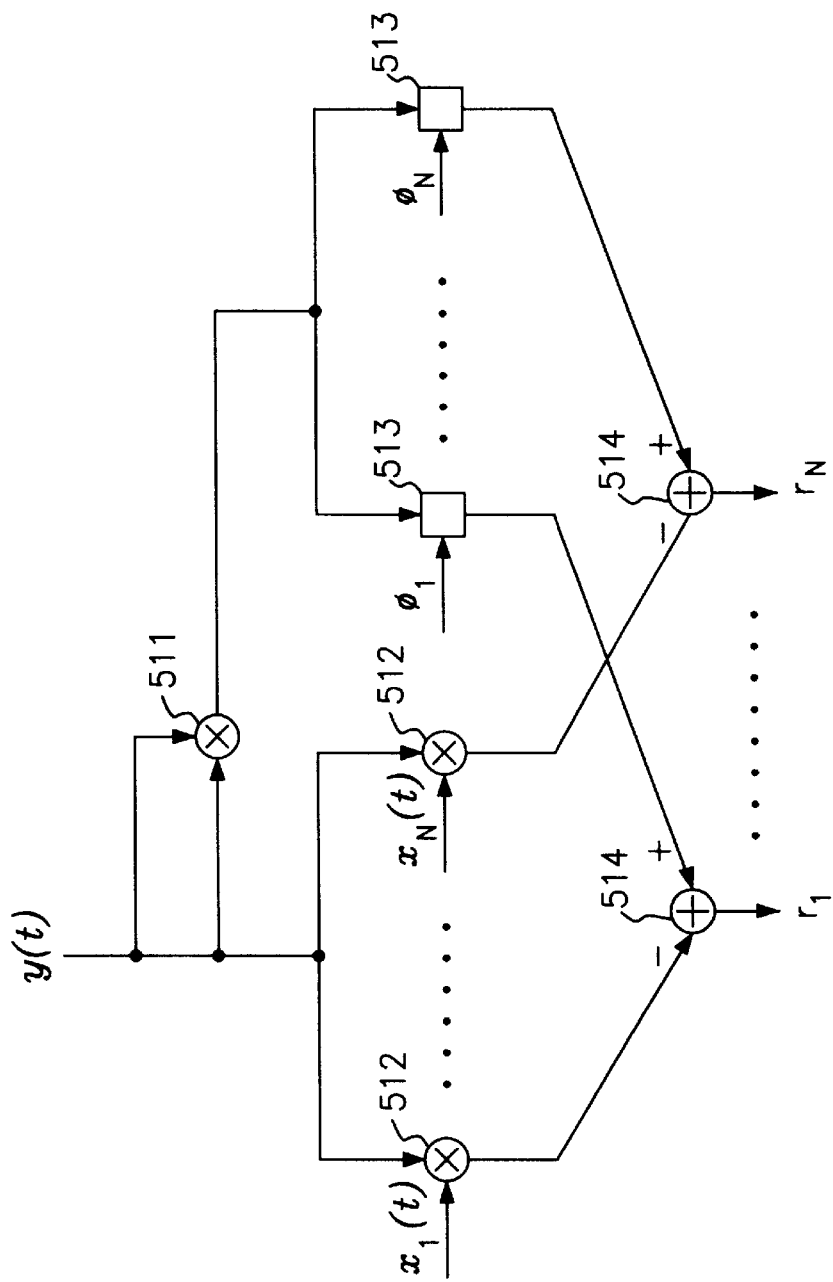
FIG. 5 is an example of the specified structure of the residue vector synthesizing part shown in FIG. 4.

FIG. 5 is an example of the specified structure of the residue vector synthesizing part 51 of the signal processing part shown in FIG. 4 in the signal receiving apparatus shown in FIG. 3.

As illustrated in the figure, the residue vector synthesizing part 51 comprises the following parts: a multiplying part 511 for computing the square of the current value of the final array output (y(t)); plural multiplying parts 512 for multiplying each element of the signal vector (x(t)), obtained from the received signals induced at each antenna element, by the final array output (y(t)); plural phase delaying parts 513 which cause the phase to be delayed at the output of the multiplying part 511 by the amount of each element of the phase delay vector; and plural adding parts 514 for subtracting each element of the vector computed from the multiplying parts 512 from each corresponding element of the vector obtained from the outputs of the phase delaying parts 513.

The outputs from each element of the adding parts 514 become each corresponding element of the residue vector.

The residue vector synthesizing part 51 computes the residue vector without down-converting the frequency of the received signals.

What is ultimately done in the residue vector synthesizing part is to produce the residue vector r(J) satisfying r(J)=λ(J)w(J)−R(J)w(J).

Since the autocorrelation matrix R(J) is only computed from the instantaneous signal vector, as described previously, the residue vector synthesizing part 51 can be simply realized, as shown in FIG. 5.

Figure 6:
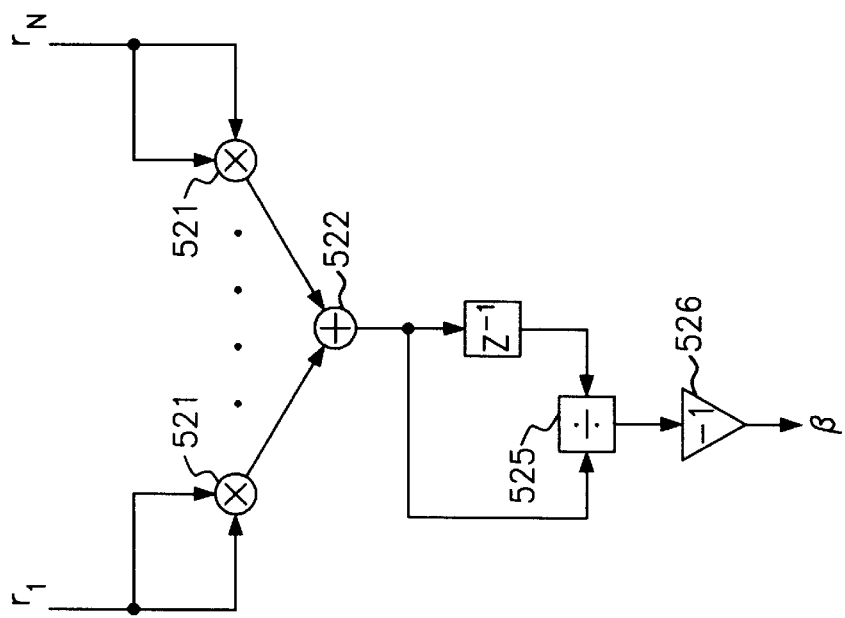
FIG. 6 is an example of the specified structure of the scalar synthesizing part shown in FIG. 4.

FIG. 6 is an example of the specified structure of the scalar synthesizing part of the signal processing part shown in FIG. 4 in the signal receiving apparatus shown in FIG. 3.

The scalar synthesizing part 52 comprises the following parts: plural multiplying parts 521 for computing the square of the magnitude of each element of the residue vector at the present snapshot; an adding part 522 for adding up all the outputs of the multiplying parts 521; a dividing part 525 that divides the output of the adding part 522 at the present snapshot with the output of the adding part 522 at the previous snapshot; and a sign exchanging part 526 which multiplies '−1' to the output of the dividing part 525.

The scalar quantity obtained in the scalar synthesizing part shown in FIG. 6 is used to compute the search direction vector (υ) by first multiplying each element of the search direction vector (υ) of the last previous snapshot by the scalar quantity (β), and then, adding the results of the additions to each corresponding element of the residue vector (r).

The scalar quantity (β) computed, as shown in FIG. 6, makes the search direction vector (υ) be orthogonal with respect to the autocorrelation matrix at every snapshot. Therefore, when the scalar value is computed accurately, the optimal value for the phase delay vector can be obtained with a minimum amount of computation.

Figure 7:
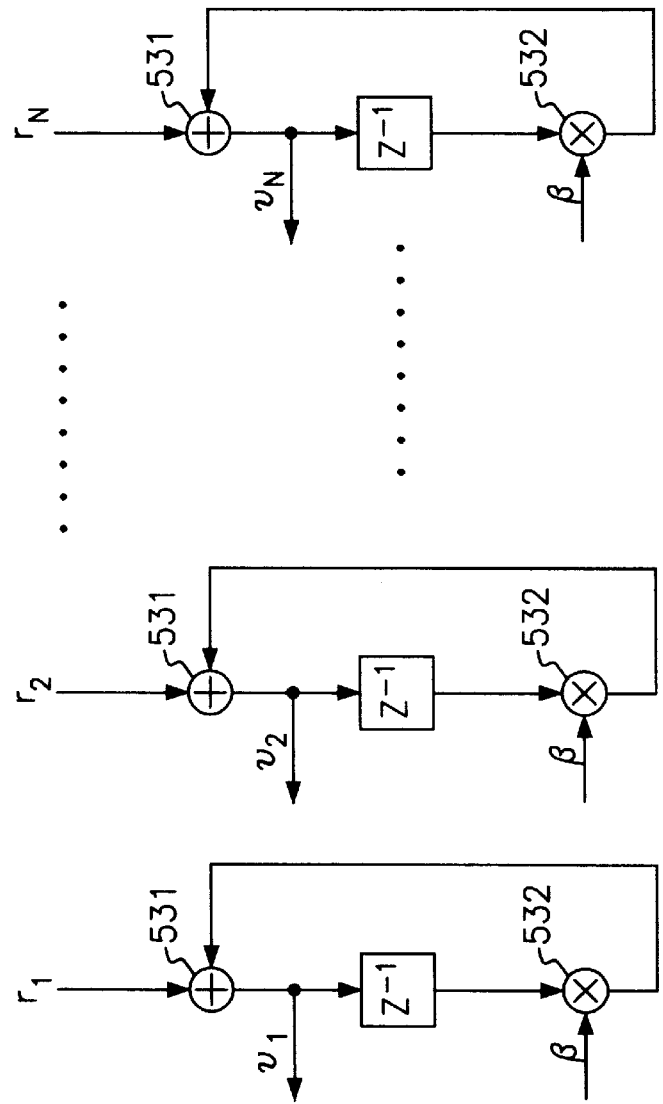
FIG. 7 is an example of the specified structure of the search direction vector synthesizing part shown in FIG. 4.

FIG. 7 is an example of the specified structure of the search direction vector synthesizing part of the signal processing part shown in FIG. 4 in the signal receiving apparatus shown in FIG. 3.

As illustrated in the figure, the search direction vector synthesizing part consists of the following parts: plural adding parts 531 that receive the outputs ($r_1 \ldots r_N$) of the residue vector synthesizing parts 51, respectively, for producing the search direction vector ($v_1 \ldots v_N$); and plural multiplying parts 532 for producing the inputs of the adding parts 531, respectively, by multiplying each element of the search direction vector at the last previous snapshot by the scalar quantity ($\beta$).

At the initial snapshot, the value of the residue vector is the search direction vector. From the second snapshot and on, the search direction vector takes the value of the output of the adding parts 531 of which the inputs are connected to the residue vector and the outputs of the multiplying parts 532, which multiply every element of the search direction vector of the last previous snapshot by the scalar quantity ($\beta$).

Figure 8:
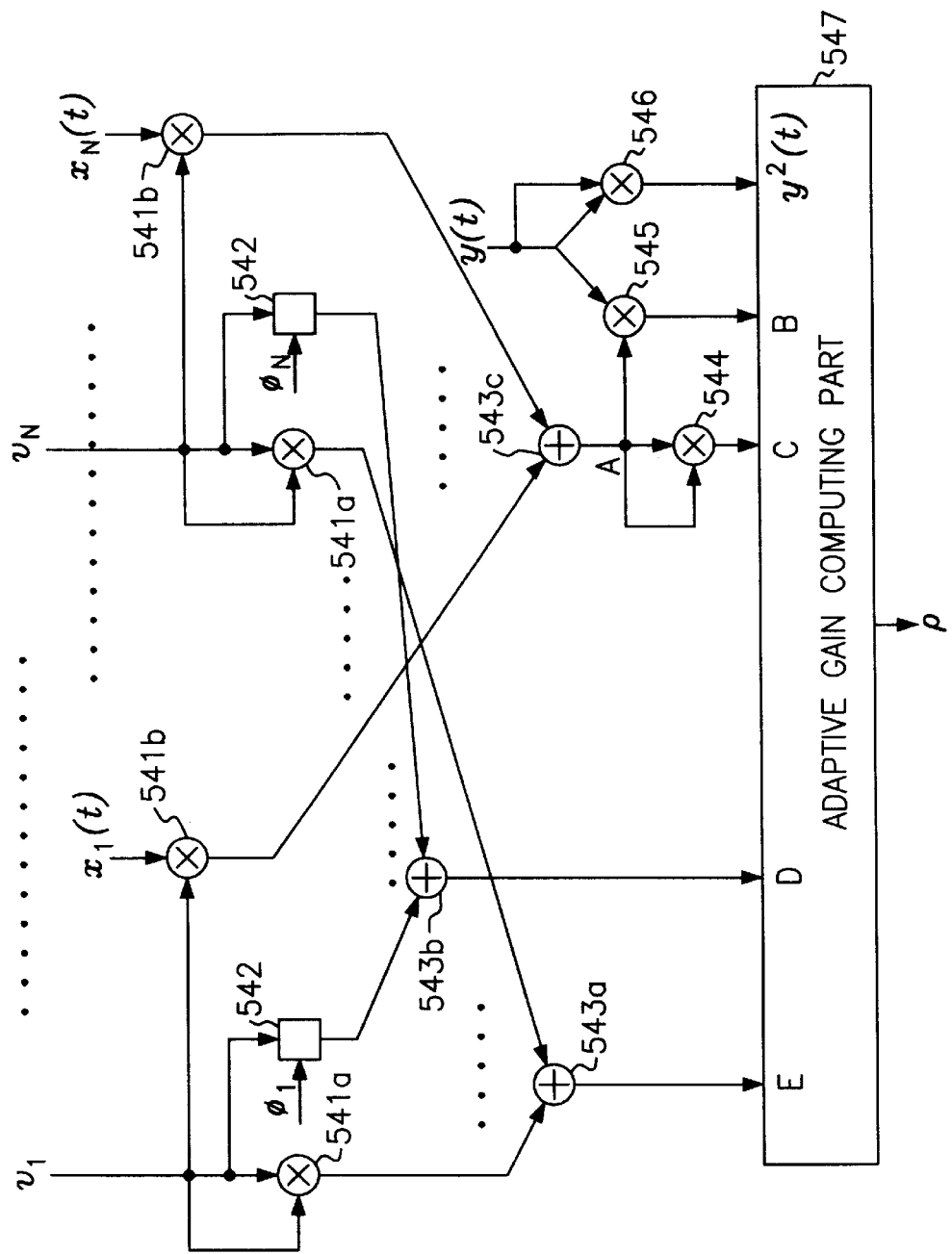
FIG. 8 is an example of the specified structure of the adaptive gain synthesizing part shown in FIG. 4.

FIG. 8 is an example of the specified structure of the adaptive gain synthesizing part 54 of the signal processing part shown in FIG. 4 in the signal receiving apparatus shown in FIG. 3.

As illustrated in the figure, the adaptive gain synthesizing part 54 comprises the following parts: plural multiplying parts 541b for multiplying, one by one, each element of the signal vector (x(t)) by the corresponding element of the search direction vector; plural multiplying parts 541a which compute the square of each element of the search direction vector ($\upsilon$); an adding part 543a which adds up all the squares of the elements of the search direction vector; plural phase delaying parts 542 for delaying the phase of every element of the search direction vector by the amount determined by the corresponding element of the phase delay vector at the present snapshot, respectively; an adding part 543b which adds the outputs of the phase delaying parts 542; an adding part 543c which adds the outputs of the plural multiplying parts 541b; a multiplying part 544 which computes the square of the output of the adding part 543c; a multiplying part 545 which multiplies the output of the adding part 543c by the output (y(t)) of the array antenna; a multiplying part 546 which computes the square of the output (y(t)) of the array antenna at the present snapshot; and an adaptive gain computing part 547 that is connected to the adding parts 543a and 543b, and the multiplying parts 544, 545 and 546.

The adaptive gain computing part 547 generates the adaptive gain ($\sigma$) in accordance with the equation given below:

$$\rho = \frac{-G - \sqrt{G^2 - 4FH}}{2F}$$

where $F = C \cdot D - B \cdot E$,
$G = C - y(t)^2 E$,
$H = B - y(t)^2 \cdot D$, with A being the output of the adding part 543c, B being the output of the multiplying part 545, which is the result of the multiplication of A and the final array output, C being the output of the multiplying part 544, which is the square of A, D being the output of the adding part 543b, and E being the output of the adding part 543a.

Figure 9:
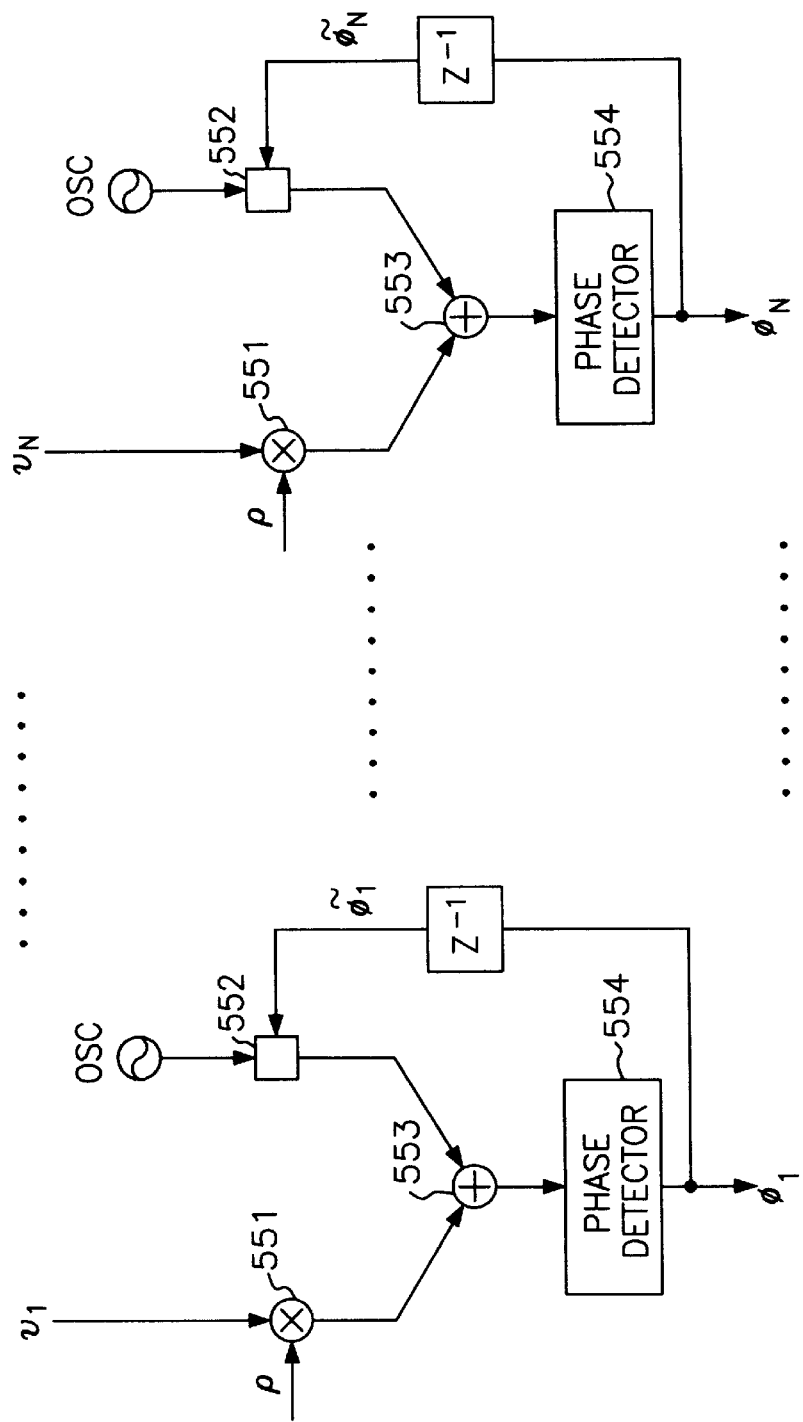
FIG. 9 is an example of the specified structure of the phase delay vector updating part shown in FIG. 4.

FIG. 9 is an example of the specified structure of the phase delay vector updating part 55 of the signal processing part shown in FIG. 4 in the signal receiving apparatus shown in FIG. 3.

As illustrated in the figure, the phase delay vector updating part 55 comprises the following parts: a multiplying part 551 for multiplying each element ($v1 \ldots v_N$) of the search direction vector by the adaptive gain ($\sigma$), which is generated from the adaptive gain synthesizing part 54; plural phase delaying parts 552 for delaying the phase of the oscillator output of which the frequency is the same as the carrier frequency of the received signal at each antenna element by the amount determined by each corresponding element of the phase delay vector at the last previous snapshot; plural adding parts 553 for adding the outputs of the multiplying parts 551 and the outputs of the phase delaying parts 552, respectively; and phase detecting parts 554 for generating the value of the phase delay vector at the present snapshot from the phase of each output of the adding part 553.

The objective of the phase delay vector updating part 55 is to generate the phase delay vector such that the phase of each element of the signal vector (x(t)) received at each snapshot is delayed by the amount of each corresponding element of the phase delay vector which is updated at each snapshot. Every element of the signal vector (x(t)), which has been delayed by the amount of the phase delay vector, is summed up to form the output of the array antenna.

Figure 10:
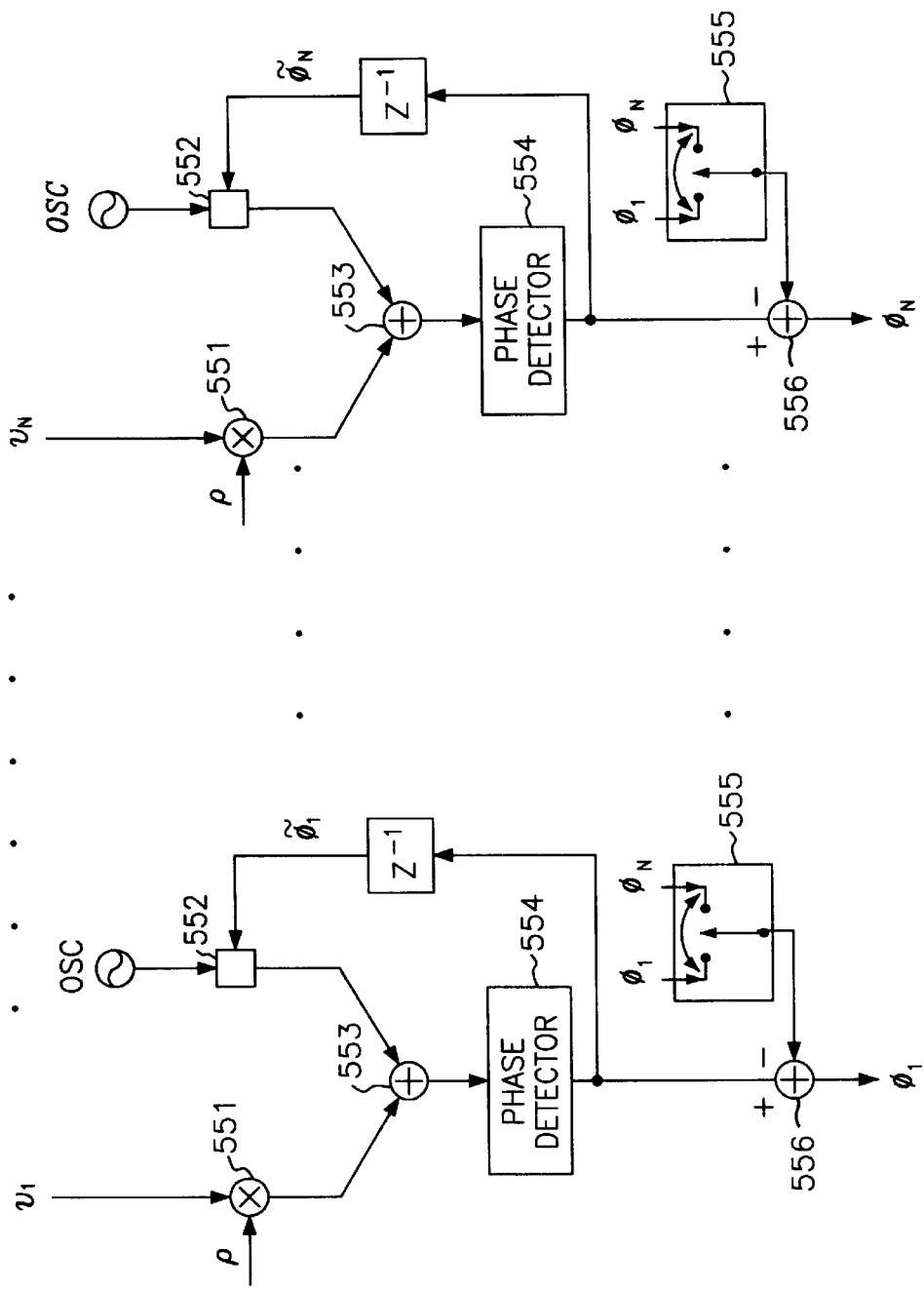
FIG. 10 is another example of the specified structure of the phase delay vector updating part shown in FIG. 4.

FIG. 10 is another example of the specified structure of the phase delay vector updating part 55 of the signal processing part shown in FIG. 4 in the signal receiving apparatus shown in FIG. 3.

It includes the adding parts and the switching parts in addition to the structure of the phase delay vector updating part, as shown in FIG. 9, in order to synchronize the received signals to the signal induced at the reference antenna element.

As illustrated in FIG. 10, the phase delay vector updating part 55 includes all the parts that were included in the previous structure shown in FIG. 9, i.e., the multiplying parts 551, the phase delaying parts 552, the adding parts 553 and the phase detecting parts 554.

In addition to those parts, it includes the following: plural switching parts 555, each of which selects the smaller element after comparing the magnitude of the first element and the last element of the phase delay vector, which is generated from the phase detecting parts 554 at each snapshot; and plural adding parts 556 for subtracting each output of the switching parts 555 from the corresponding output of the phase detecting parts, respectively.

In order to produce the phase delay vector, which appends no phase delay at the signal of the reference antenna element and positive amount of phase delay at the other signals, each element of the phase delay vector obtained at the output of the phase detecting parts 554 is subtracted by the output of the switching parts, each of which selects the smaller value of either the first element ($\phi_1$) or the last element ($\phi_N$) of the phase delay vector obtained from the outputs of the phase detecting parts.

Figure 11:
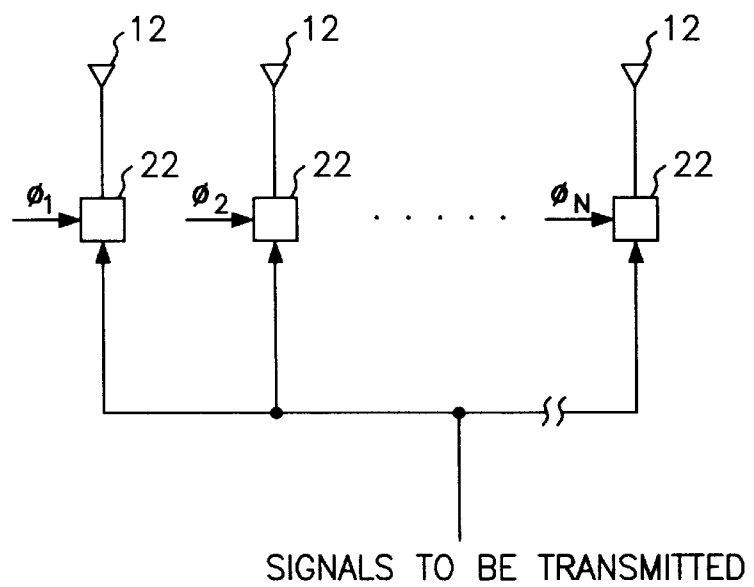
FIG. 11 shows a schematic block diagram of a signal transmitting apparatus that utilizes the array antenna according to the first embodiment of the present invention.

FIG. 11 is a block diagram of a signal transmitting apparatus according to an embodiment of the present invention. The signal transmitting apparatus provided in this invention includes plural phase delaying part (22) for appending the phase delay at the signal to be transmitted. The amount of the phase delay to be appended to the signal associated with each antenna element is determined by the corresponding element of said phase delay vector that was obtained during the receiving mode in said signal processing part (5) shown in FIG. 3.

The signal transmitting apparatus shown in this invention utilizes the same phase delay vector for transmitting the signal along the direction of the target signal source so that the same beam pattern is used for each target subscriber during both the receiving and transmitting mode.

Figure 12:
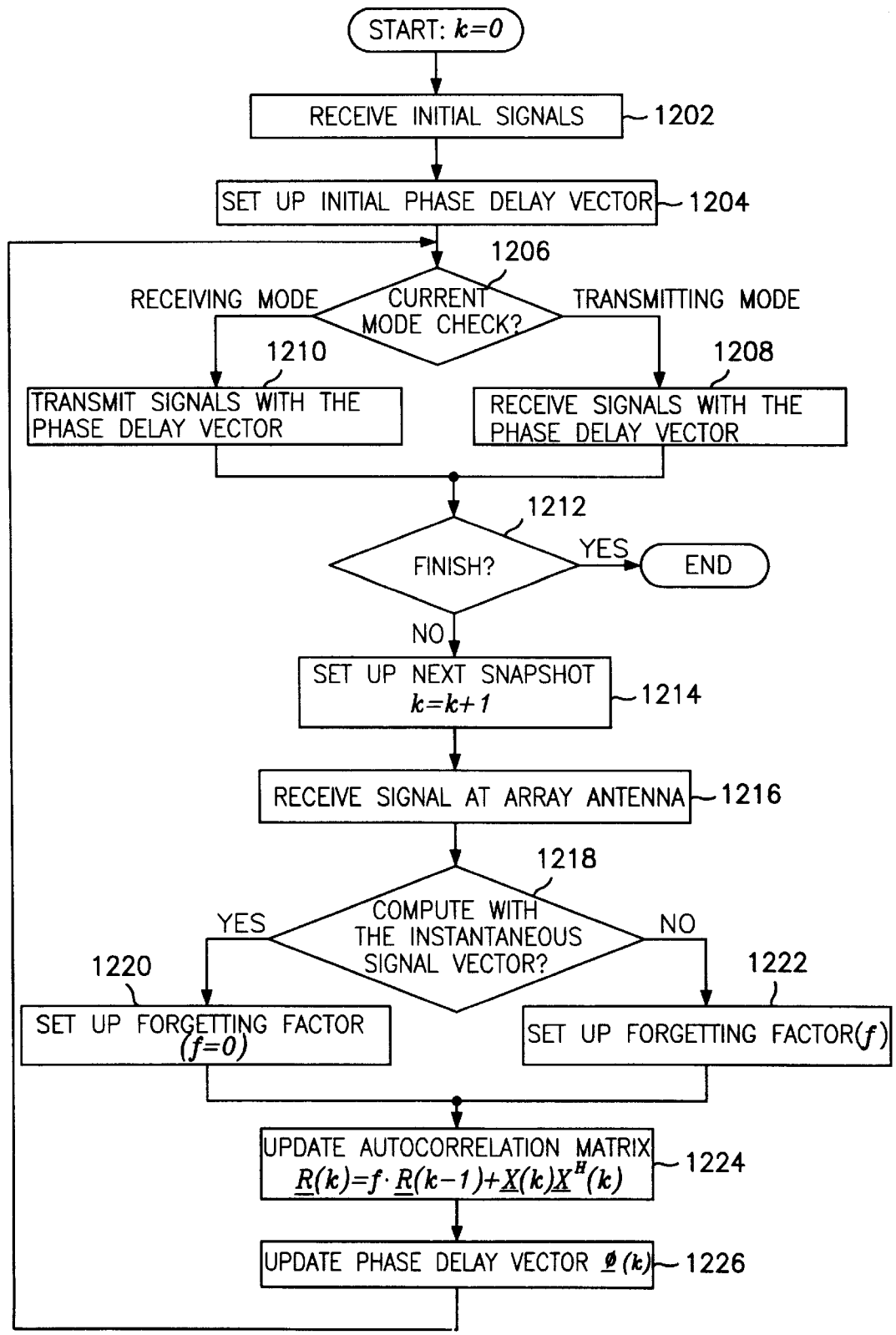
FIG. 12 is a flow chart to illustrate a telecommunication method for minimizing interference and reducing effects of noises by utilizing the array antenna according to the first embodiment of the present invention.

FIG. 12 is a flow chart to illustrate a telecommunication method for minimizing interference and reducing effects of noises by utilizing the array antenna according to the first embodiment of the present invention.

First, the initial phase delay vector is set up (1204) based on the signals received initially (1202).

Then, the current mode is checked whether it is in receiving mode or transmitting mode (1206).

In case of being in said receiving mode, the signal is received (1208) utilizing the phase delay vector at the present snapshot. If it is in transmitting mode, the target signal is transmitted (1210) utilizing the phase delay vector computed during the receiving mode.

If the snapshot is to be continued (1212), the snapshot index is updated (1214) and the new signals are received (1216) for the new snapshot. Then, decide (1218) whether the autocorrelation matrix is only computed with the instantaneous signal vector. If so, have 0 for the forgetting factor (1220), otherwise set up the forgetting factor (1222) properly in between 0 and 1.

The autocorrelation matrix is updated (1224) as $R(k)=fR(k-1)+x(k)x^H(k)$ where f is the forgetting factor, k denotes the snapshot index, and the superscript H is the Hermitian operator. Note that when the forgetting factor is 0 the autocorrelation matrix itself need not to be actually computed.

The phase delay vector is computed (1226) in such a way that each element of the phase delay vector is as close as possible to the phase of the corresponding element of the eigenvector corresponding to the largest eigenvalue of said updated autocorrelation matrix by the method released in this invention.

The procedure is to be repeated from the step of (1206).

If a proper value for the forgetting factor has been set, then the step of determining (1218) the value of the forgetting factor at each iteration can be eliminated. This means that a proper value for the forgetting factor can be predetermined. Furthermore, as mentioned earlier, when the processing is to be done with the instantaneous signal vector only, i.e., the forgetting factor is 0, the computation of the autocorrelation matrix itself is deleted. It is also possible that the procedure shown in FIG. 12 can separately be applied to either the receiving or transmitting signals. As mentioned earlier, the proposed technique can be very usefully applied when the desired signal is much larger than each interfering signal in magnitude.

Second Embodiment

In this embodied example, an array antenna is introduced that includes a signal processing apparatus computing the gain vector in real-time in order to generate the optimal beam pattern at the telecommunication system that employs the array antenna. The beam pattern of the array antenna in this embodied example is controlled by applying the complex-valued gain vector to the signals induced at the antenna elements.

It is noteworthy that in the previous embodied example the beam pattern was determined by the properly set phase delay vector instead of the complex-valued gain vector as in this example. Although these two approaches are equivalent mathematically, since the way of implementing the hardware is different, we will explain the detailed procedures of applying both approaches separately.

The main difference of the second embodied example compared to the first one is that multipliers instead of phase delaying elements in the first example are required in the second example.

In general, multipliers are much cheaper and easier to use compared to phase delaying elements. In that sense, therefore, the second approach introduced in this example is much better than the first approach introduced in the previous example.

Figure 13:
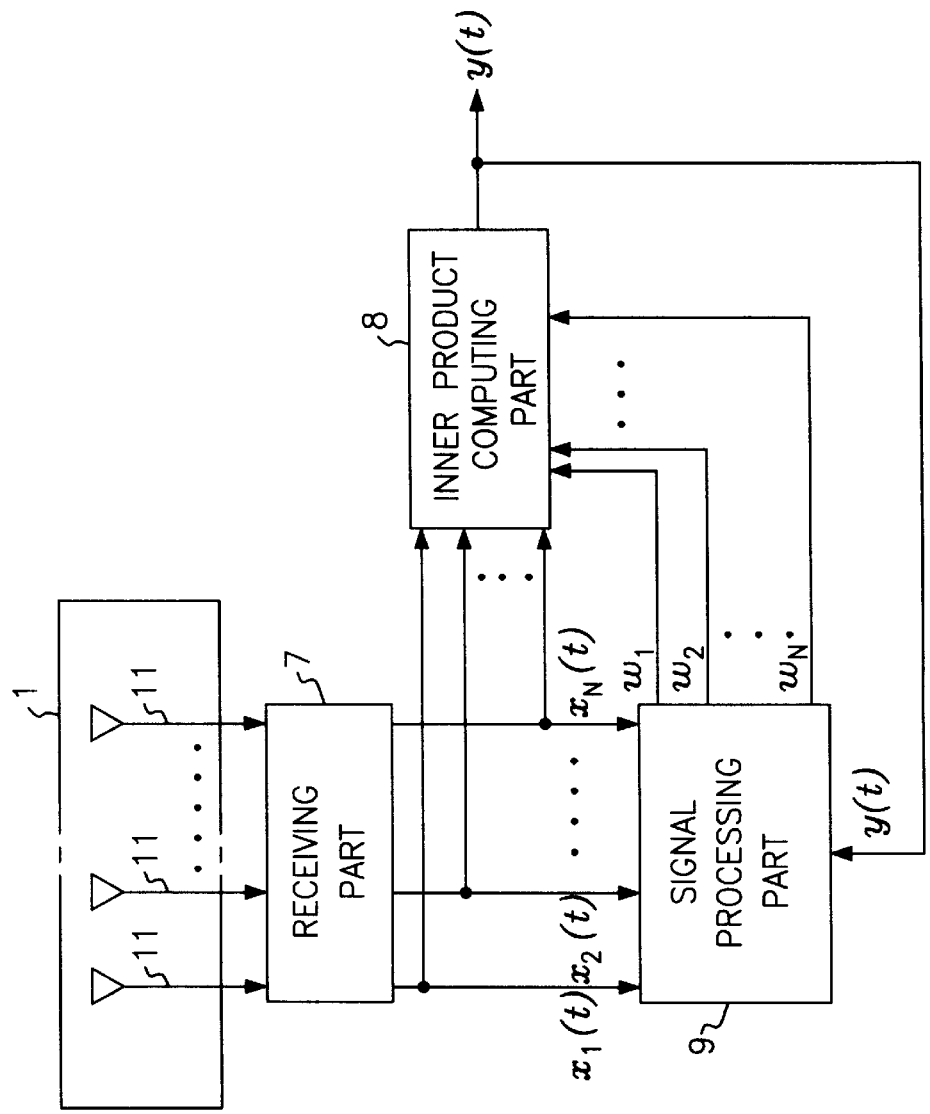
FIG. 13 shows a schematic block diagram of a signal receiving apparatus that utilizes the array antenna according to the second embodiment of the present invention.
Figure 15:
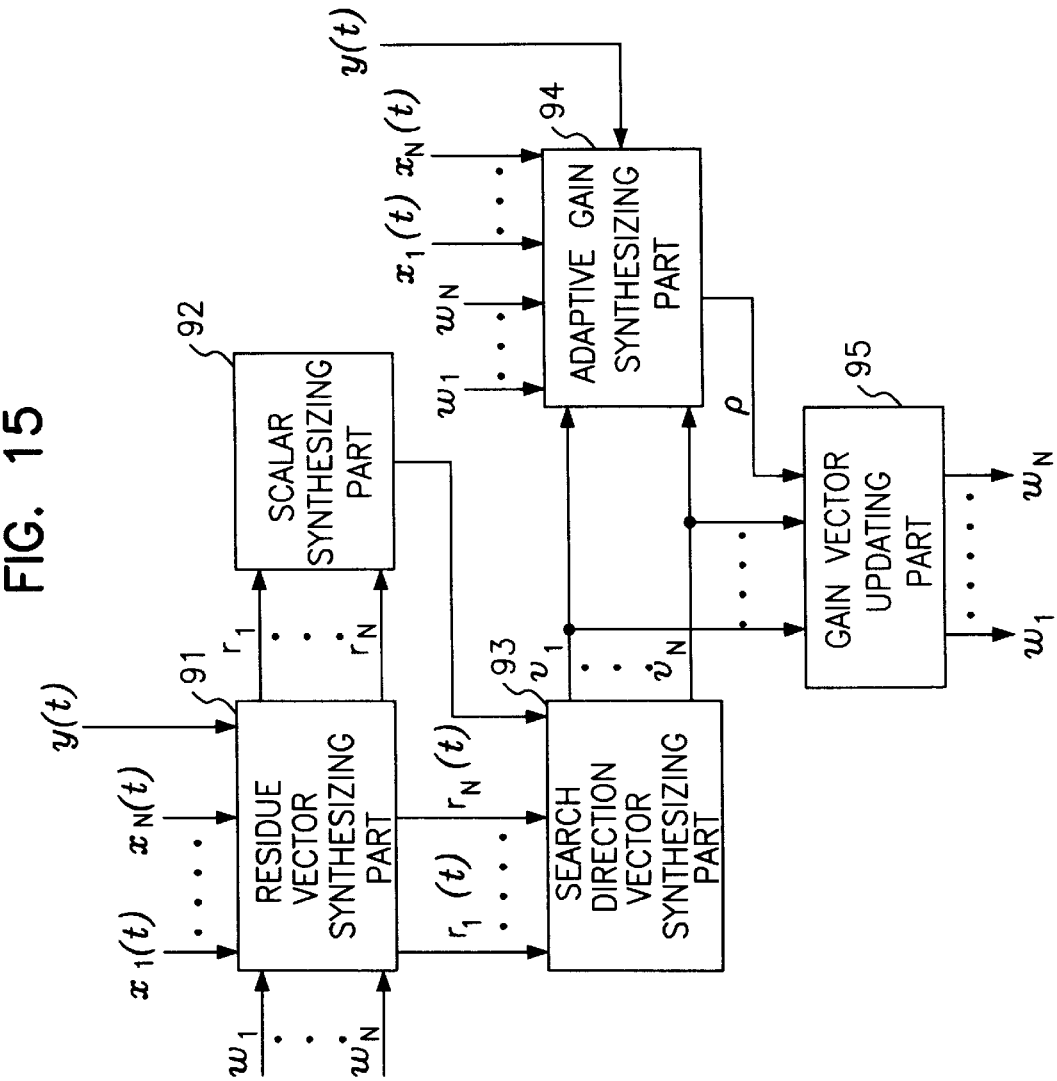
FIG. 15 is an example of the specified structure of the signal processing part shown in FIG. 13.
Figure 21:
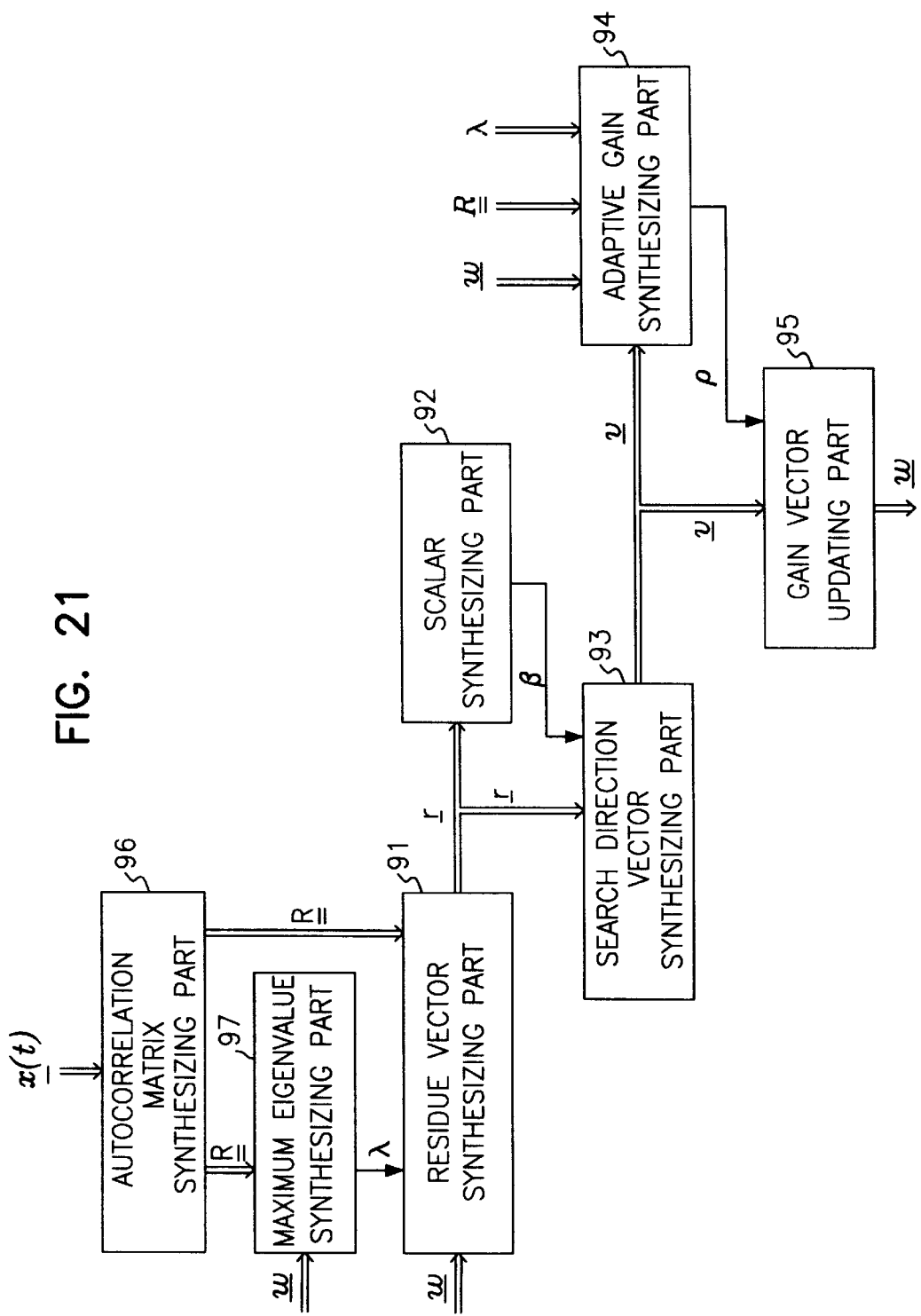
FIG. 21 is another example of the specified structure of the signal processing part shown in FIG. 13.
Figure 25:
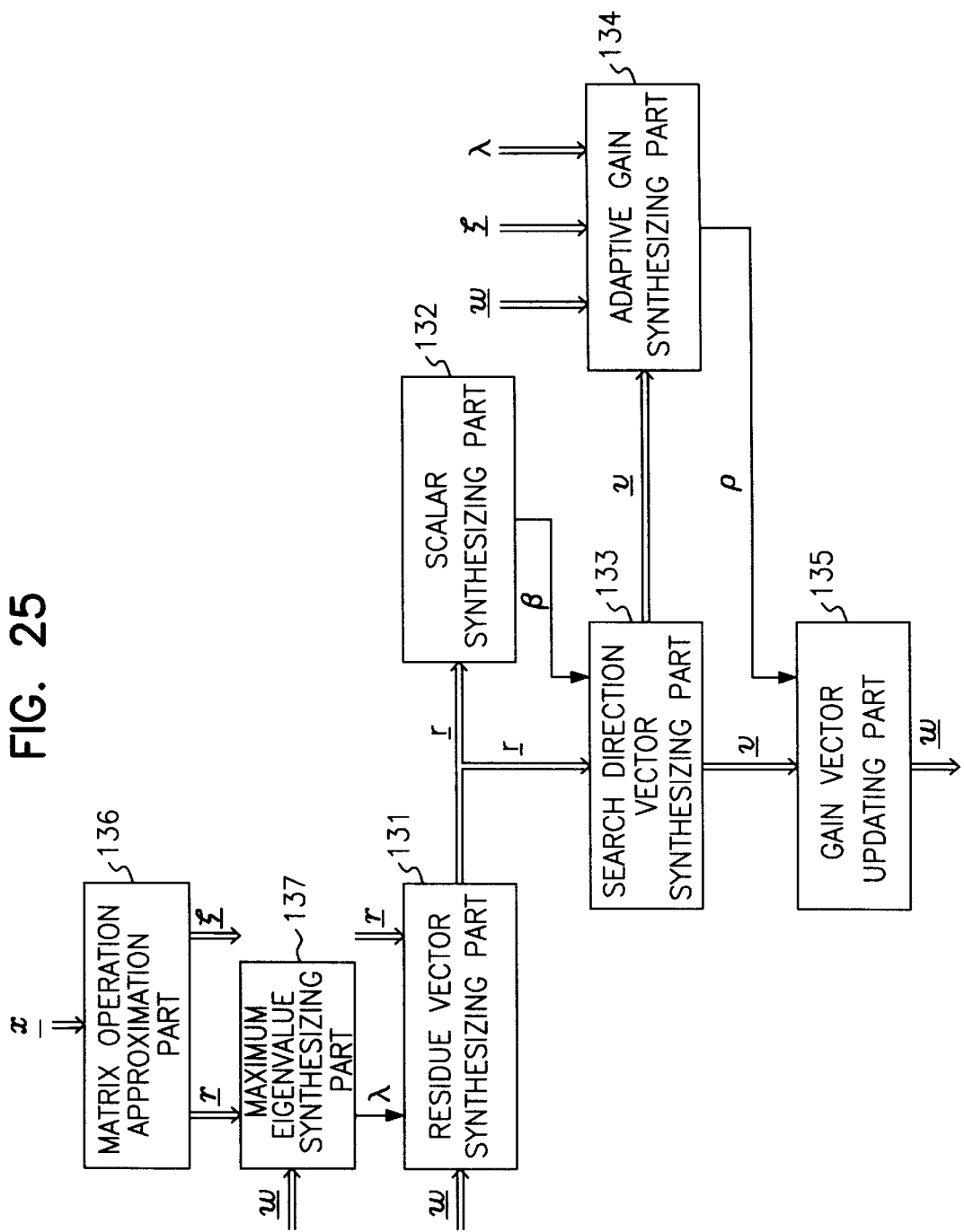
FIG. 25 is another example of the specified structure of the signal processing part shown in FIG. 13.

FIG. 13 is a block diagram of a signal receiving apparatus that utilizes the signal processing part according to the present invention shown in FIGS. 15, 21 or 25, wherein the effects of the interferences and noise are reduced utilizing said array antenna according to an embodiment of the present invention.

In FIG. 13, the reference number 1 denotes the array antenna, 7 denotes the receiving part, 8 denotes the inner product computing part (which is sometimes denoted as the part of generating the final array output), and 9 denotes the signal processing part, respectively.

As illustrated in the figure, the receiving part comprises the following parts: the array antenna 1 (or, simply called, "array", "array system", or, "array of antenna elements"), composed of the plural antenna elements 11, each of which is arranged by a predetermined geometry, that supplies the signal induced at each antenna element to the corresponding port of the receiving part 7; the receiving part 7 that generates the signal vector (x(t)) from the signals induced at each antenna element of the antenna array 1 by utilizing the proper signal-receiving part, such as filtering, frequency-down-conversion and demodulation; the inner product computing part 8 for generating the final array output (y(t)) by computing the Euclidean inner product between the two complex-valued vectors, $(y(t)=w^H x(t)$ i.e., the signal vector (x(t)) produced from the receiving part 7 and the gain vector (w) provided from the signal processing part 9; and the signal processing part 9 that computes the gain vector (w) by processing the signal vector (x(t)) together with the final array output (y(t)) obtained at the last previous snapshot for the inner product computing part 8 to generate the final array output (y(t)) at the present snapshot.

The signal receiving apparatus consists of the receiving part 7, the signal processing part 9 and the inner product computing part 8 for generating the final array output. The receiving part 7 generates the signal vector (x(t)) from the signals induced at the antenna elements 11 through the conventional signal reception part, such as the frequency-down-conversion and demodulation.

When the technique provided in this invention is applied in the CDMA (Code Division Multiple Access) system, the receiving part 7 includes the cross-correlation part for cross-correlating the demodulated received signal with the code sequence assigned to the wanted signal source. The signal vector (x(t)) obtained from the receiving part 7 is sent to the signal processing part 9 and the inner product computing part 8.

The signal processing part 9 produces the optimal gain vector (w), which is sometimes referred to as "weight vector", from the signal vector (x(t)) at the present snapshot and the final array output (y(t)) computed at the last previous snapshot. The optimal weight vector (w) is sent to the inner product computing part for the final array output (y(t)) of the next snapshot to be computed as a result of the inner product of the signal vector (x(t)) and weight vector (w), i.e., $y(t)=w^H x(t)$.

The key part of the signal receiving apparatus shown in FIG. 13 is the signal processing part 9 producing the optimal weight vector (x(t)), which gives the array antenna the optimal beam pattern having its maximum gain along the direction of the wanted signal source and small gain to the direction of the interfering signal sources.

Figure 14A:
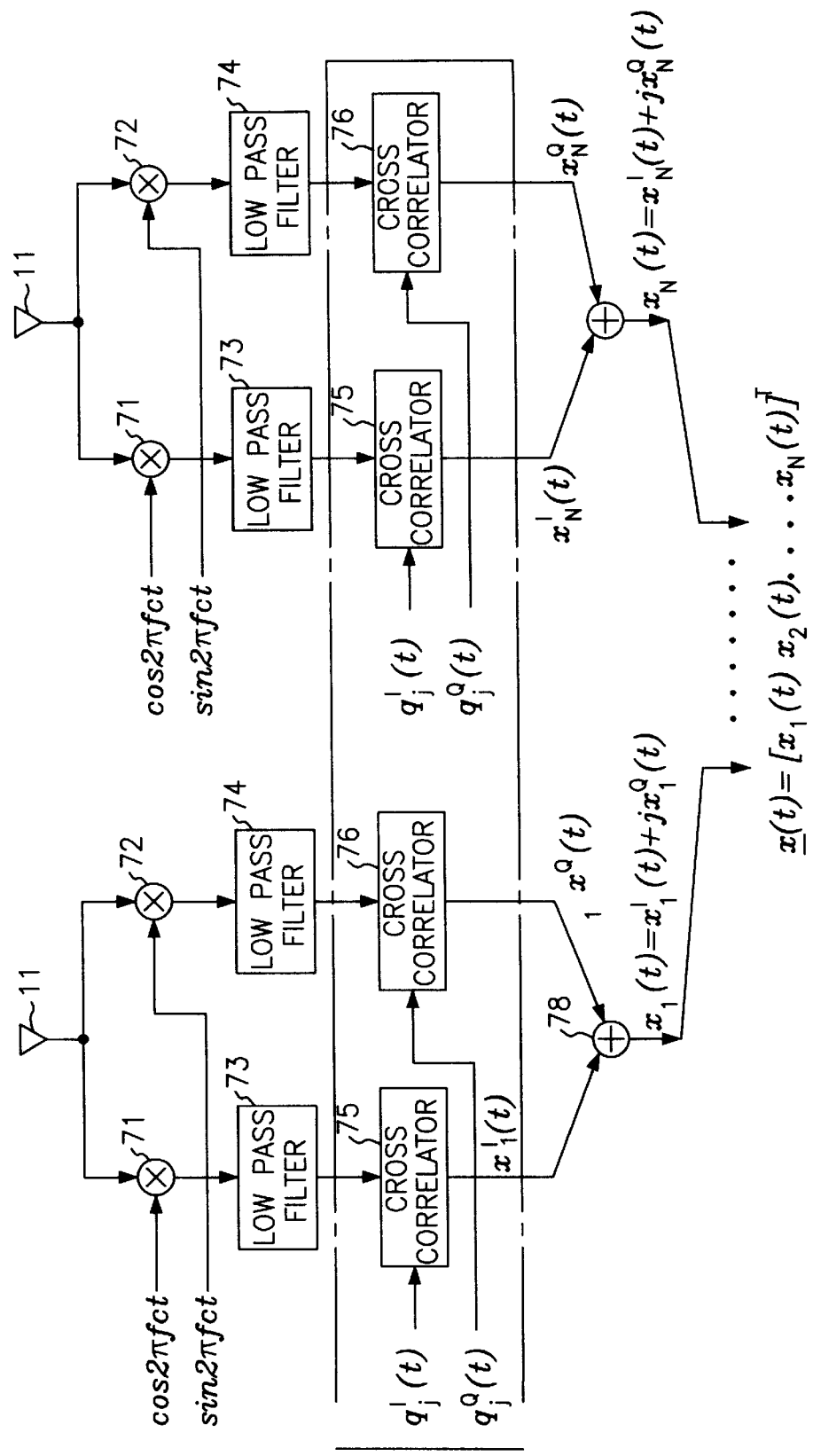
FIG. 14A is an example of the specified structure of the receiving part shown in FIG. 13.

FIG. 14A is a detailed structure of said receiving part (7) in said signal receiving apparatus shown in FIG. 13 according to the second embodied example.

As illustrated in the figure, the receiving part (7) produces the signal vector x(k) at each snapshot comprising: the first group of multiplying parts (71) for multiplying the cosine terms (cos(2 $\pi f_c t$)) to each signal induced at every antenna element and the second group of multiplying parts (72) for multiplying the sine terms (sin(2 $\pi f_c t$)) to each signal induced at every antenna element, where $f_c$ denotes the carrier frequency of the signal to be received; the first and second group of low pass filters (73, 74) which are connected to said first and second group of multiplying procedures, respectively,; the first and second group of chip correlators (75, 76) for performing cross-correlation of the outputs of said low pass filters (73, 74) with the chip codes of in-phase ($q_j^I(t)$) and quadrature ($q_j^Q(t)$) components, respectively, where the subscript j is the index denoting the target subscriber; plural adding procedures for adding the outputs of said cross-correlators (75) and (76) to each other. The subpart of said signal receiving part boxed with a broken line in FIG. 14A is needed when the proposed technique is to be applied to a signal environment utilizing the method of the spread spectrum.

In the figure, $q_j^I(t)$ and $q_j^Q(t)$ denote the chip codes for the in-phase and quadrature signal component used in the CDMA communications. Since the subscript j is the index denoting the wanted signal, if there are M signal sources, then j is either 1, 2, . . . , or M. Therefore, the receiving part (7) of the signal receiving apparatus, shown in FIG. 14A, is to receive the signal transmitted from the j_th subscriber.

Figure 14B:
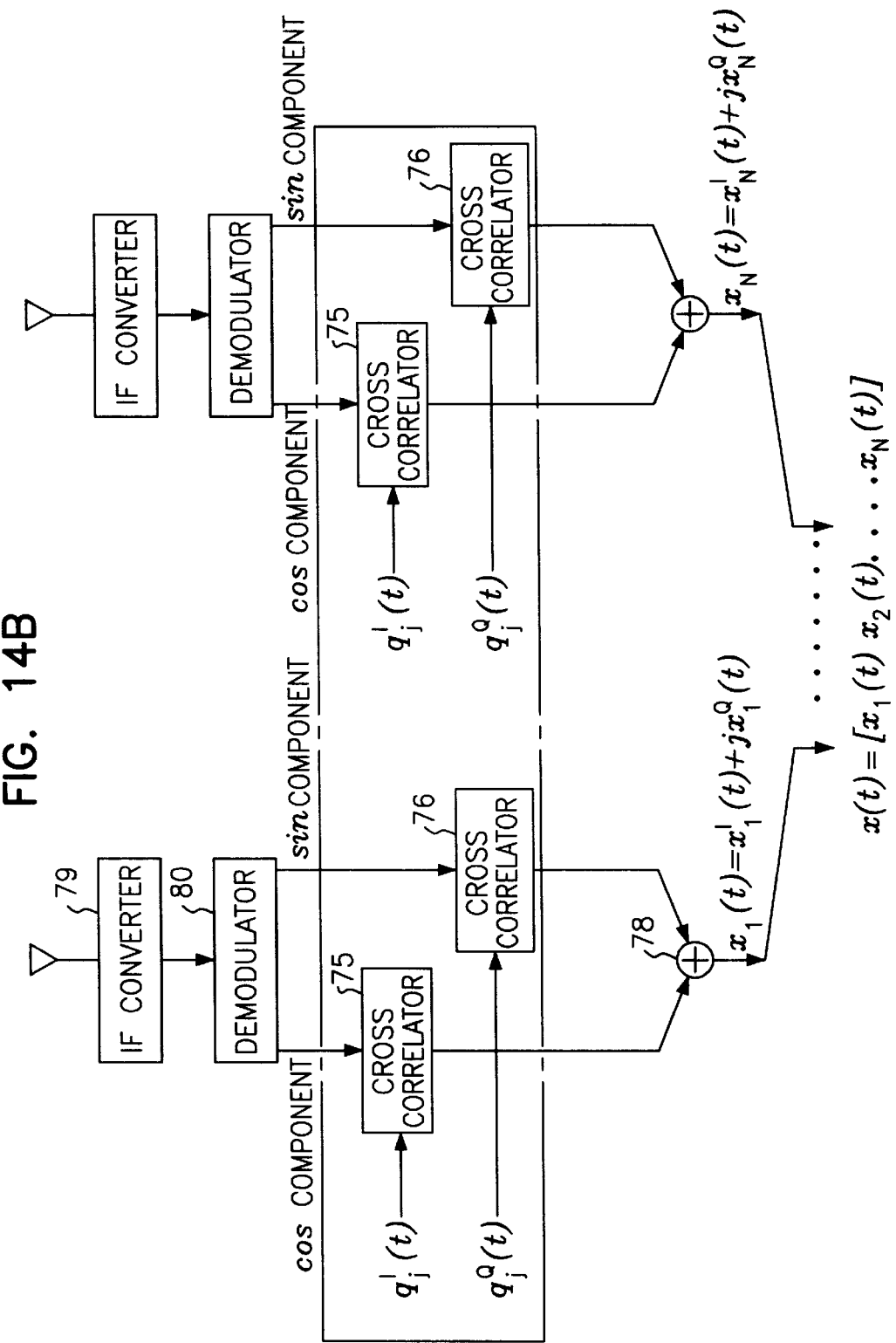
FIG. 14B is another example of the specified structure of the receiving part shown in FIG. 13.

Since it is sometimes difficult to generate the cosine and sine waves of the accurate carrier frequency, a frequency-down converter is introduced in order to convert the frequency values of the signals induced at the antenna elements to intermediate frequency values as shown in FIG. 14B.

In the receiving part shown in FIG. 14B, plural IF (intermediate frequency) converters (79) for converting the frequency values of the signals induced at the antenna elements to intermediate frequency values are included. Each frequency-down converted signal from said IF converters (79) is applied to the corresponding demodulator (80) which generates the cosine and sine components of the received signal. The rest of the parts of the receiving part shown in FIG. 14B below the demodulators (80) are exactly the same as the one shown in FIG. 14A. Therefore, the difference between the receiving part shown in FIG. 14A and that of FIG. 14B is that the signal is demodulated directly at the carrier frequency band in FIG. 14A whereas the signal induced at each antenna element is first down converted to the IF frequency band in FIG. 14B.

FIG. 15 is a block diagram of the signal processing part (9) in the signal receiving apparatus shown in FIG. 13 according to an embodiment of the present invention.

The signal processing apparatus according to the second embodiment of the present invention comprises a residue vector synthesizing part 91, a scalar value synthesizing part 92, a search direction vector synthesizing part 93, an adaptive gain synthesizing part 94, and a gain vector updating part 95.

The residue vector synthesizing part 91 computes the residue vector (r) by using the signal vector (x(t)) of present snapshot provided from the signal telecommunication system with the array antenna, the final array output signal (y) of the telecommunication system at the last previous snapshot, and the value of the gain vector (w) of the present snapshot, and the part 91 outputs the residue vector to the scalar value synthesizing part 92 and the search direction vector synthesizing part 93.

The scalar value synthesizing part 92 produces the scalar value ($\beta$) which is needed to generate the search direction vector ($\upsilon$), from the residue vector (r).

The search direction vector synthesizing part 93 produces the search direction vector ($\upsilon$) from the residue vector (r) and the scalar value ($\beta$), The adaptive gain synthesizing part 94 produces the adaptive gain ($\sigma$) at every snapshot from the signal vector (x(t)), the search direction vector ($\upsilon$), the final array output signal (y) of the telecommunication system at the last previous snapshot and the value of gain vector (w) of the present snapshot.

The gain vector updating part 95 updates the gain vector (w) by using the search direction vector ($\upsilon$) and the adaptive gain ($\sigma$) during the present snapshot.

The ultimate goal of the signal processing apparatus is to generate the gain vector (w) providing the optimal beam pattern for the telecommunication system that employs the array antenna to produce the final array output signal y(t) by computing the inner product between the signal vector received at the present snapshot and the gain vector (w).

Figure 16:
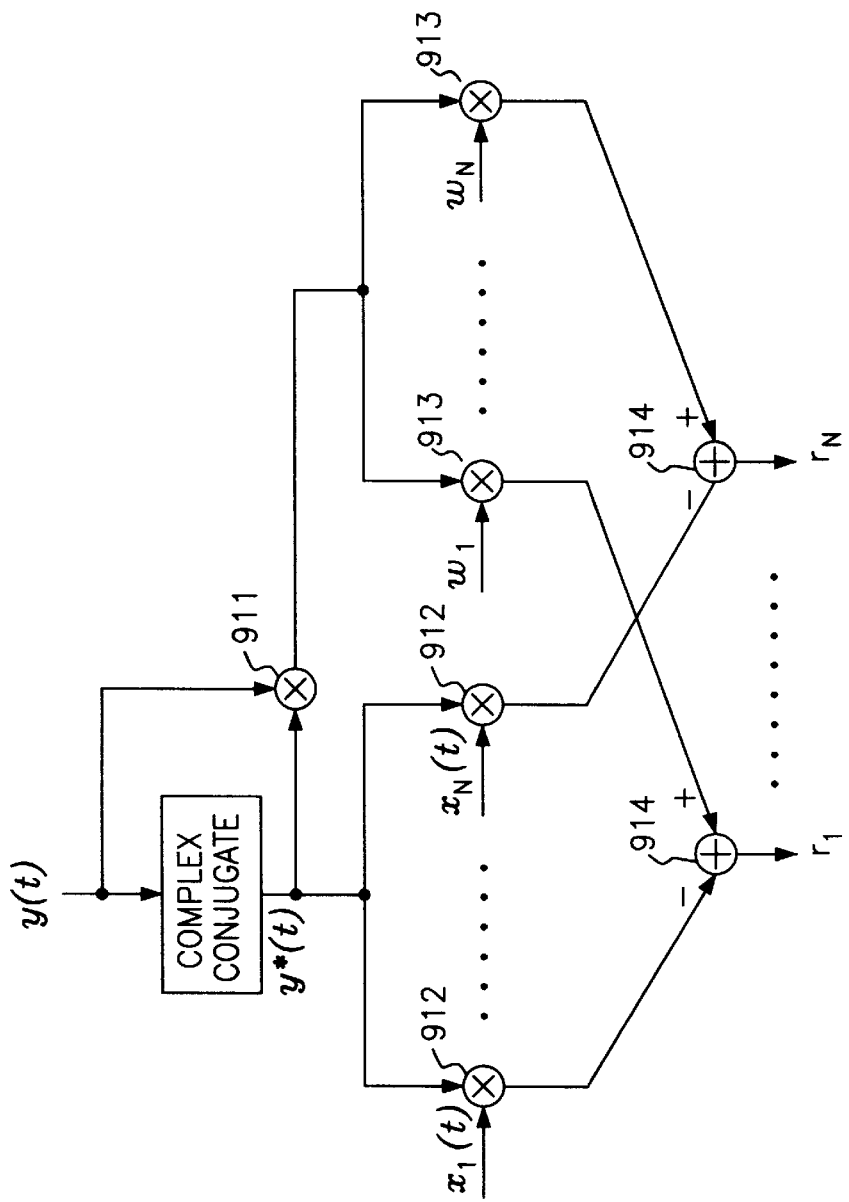
FIG. 16 is an example of the specified structure of the residue vector synthesizing part shown in FIG. 15.

FIG. 16 illustrates an example of the specified structure of the residue vector synthesizing part 91 shown in FIG. 15.

As shown in FIG. 16, the residue vector synthesizing part 91 comprises the following parts: a multiplying part 911 which computes the squared value of the final array output (y(t)) at the previous snapshot; plural multiplying parts 912 which multiply the complex conjugate of the final array output (y(t)) to each element of the signal vector coming from the array antenna of the telecommunication system; plural multiplying parts 913 which multiply the output of the multiplying part 911 to each element of the gain vector; and plural subtracting parts 914 which subtract each of outputs of the multiplying parts 912 from the corresponding output of the multiplying parts 913.

What is ultimately performed in the residue vector synthesizing part 91 shown in FIG. 16 is to compute the residue vector satisfying the following equation:

$$r=|y(t)|^2 w - x(t) y^*(t) \qquad (26)$$

where x(t), y(t) and w denote the received signal vector, the final array output and the gain vector, respectively, and the superscript (*) is the complex conjugate operator.

The procedure for obtaining the residue vector, as shown in FIG. 16 and equation (26), is the result of approximating the autocorrelation matrix with the instantaneous signal vector as: $R = x(t) \cdot x^H(t)$.

Figure 17:
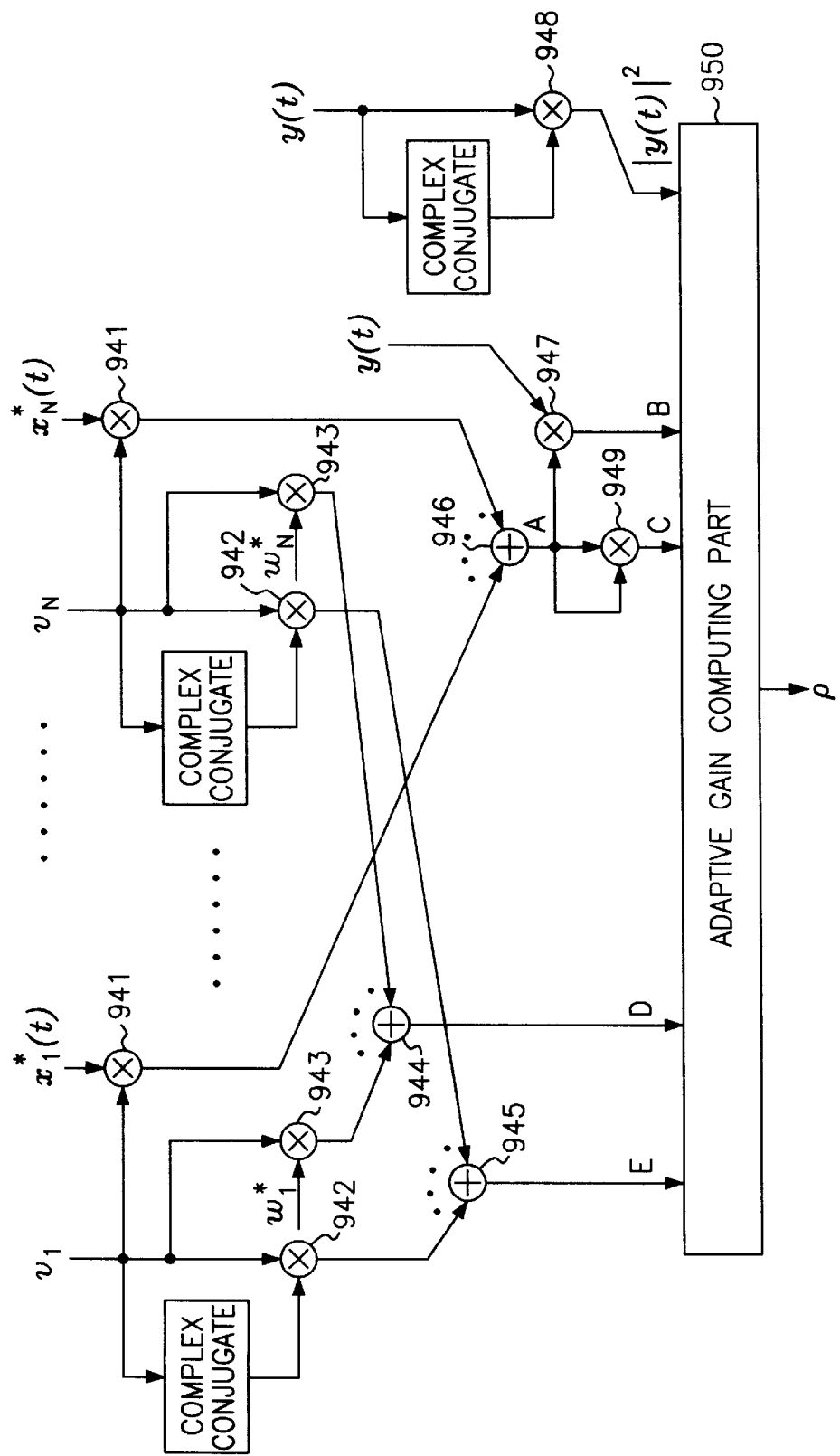
FIG. 17 is an example of the specified structure of the adaptive gain synthesizing part shown in FIG. 15.

FIG. 17 illustrates an example of the specified structure of the adaptive gain synthesizing part 94 shown in FIG. 15.

As shown in FIG. 17, the adaptive gain synthesizing part 94 comprises the following parts: plural multiplying parts 941 which multiply each element of the search direction vector ($\upsilon$) to the complex conjugate of each element of the signal vector (x(t)); an adding part 946 which adds the outputs of the plural multiplying parts (941); plural multiplying parts 942 which compute the squares of the absolute values of all the elements of the search direction vector ($\upsilon$);

an adding part which adds the outputs of the multiplying parts 942; plural multiplying parts 943 which multiply the complex conjugate of every element of the gain vector to each element of the search direction vector in the corresponding order; an adding part 944 which adds the outputs of the multiplying parts 943; a multiplying part 949 which computes the square of the output of the adding part 946; a multiplying part 947 which multiplies the final array output (y(t)) to the output of the adding part 946; a multiplying part 948 which computes the square of the absolute value of the final array output (y(t)); and an adaptive gain computer 950 that is connected to the adding parts 944 and 945 and the multiplying parts 947, 948 and 949.

As for the adaptive gain, letting A denote the output of the adding part 946, which is the result of the inner product of the signal vector and the search direction vector, letting B denote the output of the multiplying part 947, which is the result of the multiplication of the A and the final array output, letting C denote the output of the multiplying part 949, which is the square of the A, letting D denote the output of the adding part 944, which is the result of the inner product of the gain vector and the search direction vector, and letting E denote the output of the adding part 945, which is the result of the inner product of the search direction vector and itself, the adaptive gain ($\sigma$) is computed in accordance with the equation given below:

$$\rho = \frac{-G - \sqrt{G^2 - 4FH}}{2F}$$

where $F = C \cdot Re[D] - B \cdot Re[E]$,
$G = C - |y(t)|^2 E$,
$H = Re[B] - |y(t)|^2 \cdot Re[D]$,
and Re[·] denotes the real part of the complex-valued number ".".

Also, the respective value of A, B, C, D and E is defined, as follows:

$B = y^* \cdot x^H \cdot v$,
$C = v^H \cdot x \cdot x^H \cdot v$,
$D = w^H \cdot v$,
$E = |v|^2$.

Figure 18A:
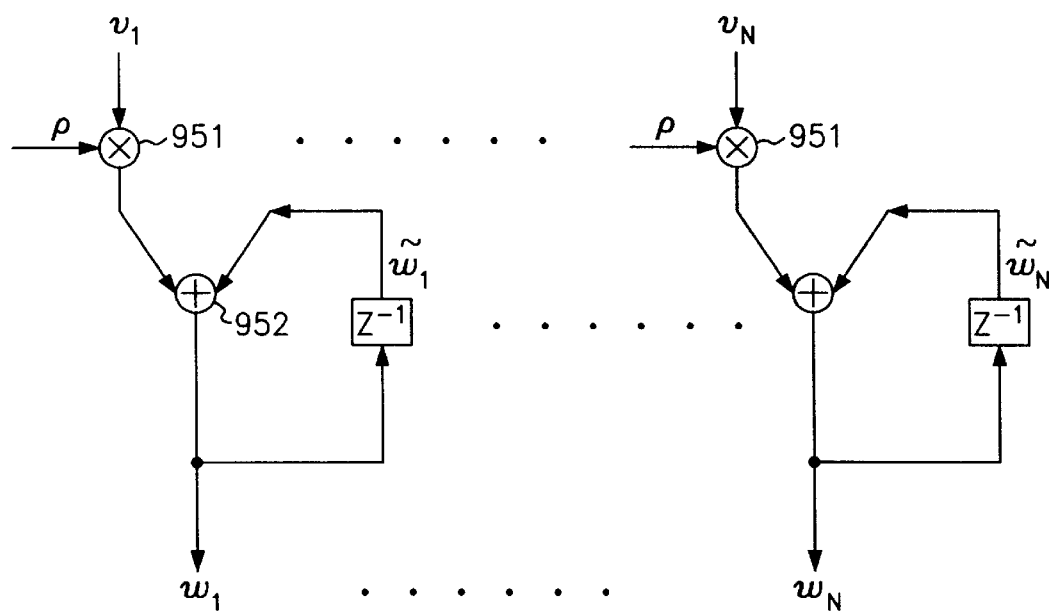
FIG. 18A is an example of the specified structure of the gain vector updating part shown in FIG. 15.

FIG. 18A illustrates an example of the specified structure of the gain vector synthesizing part 95 shown in FIG. 15. The gain vector synthesizing part 95 comprises the following parts: plural multiplying parts 951 which multiply the adaptive gain to each element of the search direction vector; and plural adding parts 952 that add the gain vector obtained during the last previous snapshot to each output of the multiplying parts 951.

Therefore, the gain vector is updated at each J_th snapshot in the gain vector synthesizing part 95 according to the following equation:

$$w(J+1) = w(J) + \sigma(J)v(J).$$

This part that the value of the gain vector at the next snapshot is determined by updating the current value by the amount specified by the adaptive gain in the direction specified by the search direction vector.

Figure 18B:
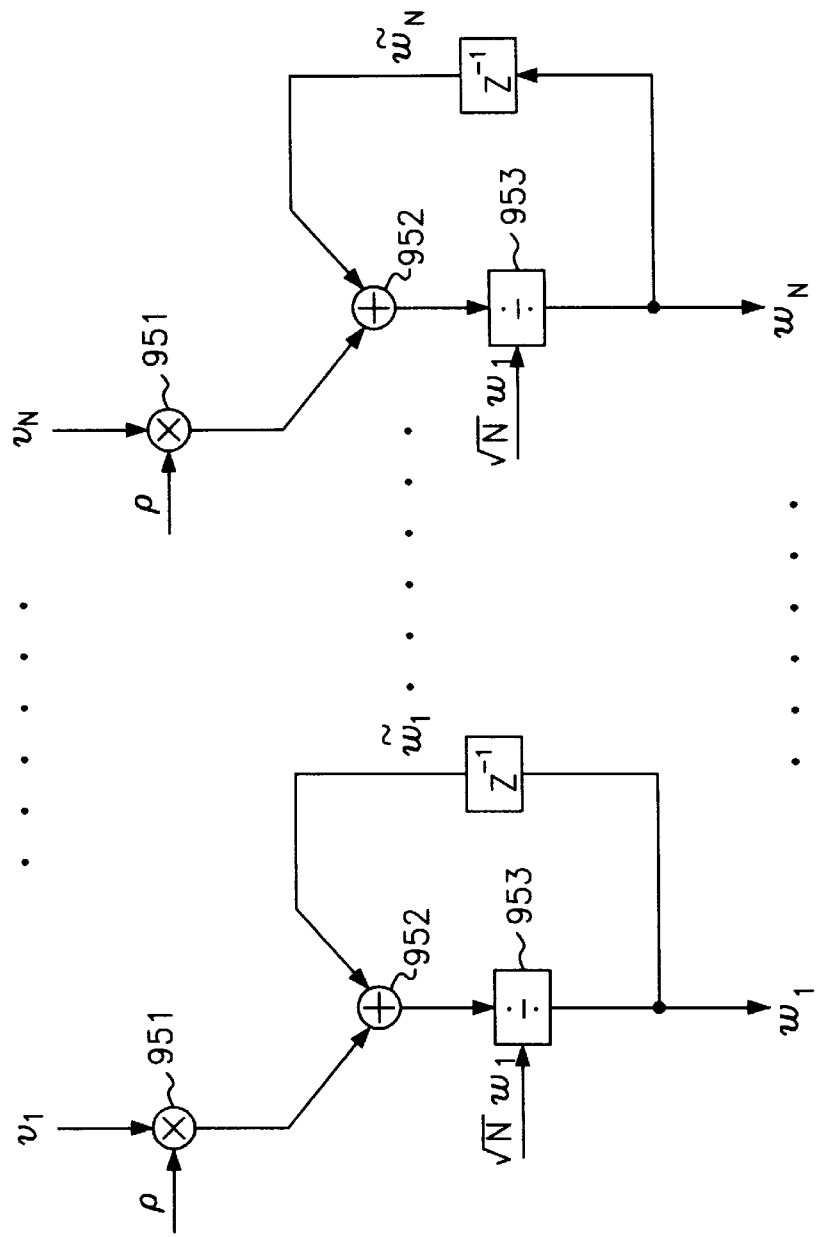
FIG. 18B is another example of the specified structure of the gain vector updating part shown in FIG. 15.

FIG. 18B illustrates another example of the specified structure of the gain vector synthesizing part 95.

The gain vector synthesizing part 95 shown in FIG. 18B includes plural dividing parts 953 in addition to the structure of the gain vector synthesizing part 95 shown in FIG. 18A, in order to divide each of the outputs of adding parts 952 with the square root of N multiplied with the value of one of the outputs of adding parts 952 that is connected to the reference antenna element, where N denotes the number of antenna elements in the array antenna.

Comparing to the gain vector synthesizing part shown in FIG. 18A, the gain vector synthesizing part illustrated in FIG. 18B has the following characteristics:

First, no phase delay is appended to the signal induced at the reference antenna element by having the element of the gain vector associated with the reference antenna element be always a real valued quantity. This particularly part that the received signal is synchronized with the signal induced at the reference antenna element.

Second, the magnitude of the resultant gain vector becomes 1.

And lastly, the gain vector synthesizing part 95, shown in FIG. 18B, computes the gain vector in accordance with the following equation:

$$\underline{w}(J+1) = \frac{\underline{w}(J) + \rho(J)\underline{v}(J)}{\sqrt{N}\, w_1(J+1)}$$

where $w_1(J+1)$ denotes the first element of the updated gain vector, i.e., $(W(J) + \sigma(J)\upsilon(J))$.

Figure 19:
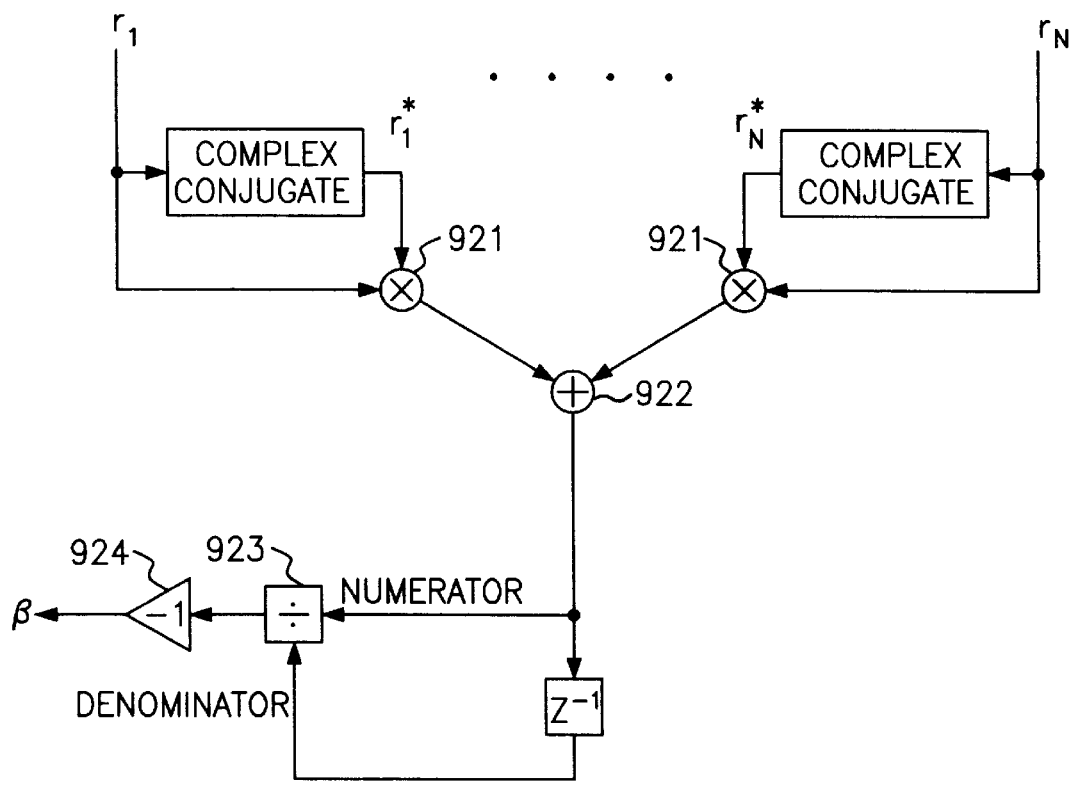
FIG. 19 is an example of the specified structure of the scalar synthesizing part shown in FIG. 15.

FIG. 19 illustrates an example of the specified structure of the scalar synthesizing part 92 shown in FIG. 15.

As illustrated in FIG. 19, the scalar synthesizing part 92 comprises the following parts: plural multiplying parts 921 which compute the square of the absolute value of each element of the residue vector; an adding part 922 that adds the outputs of the multiplying parts 921; a dividing part 923 that divides the output of the adding part 922 at the present snapshot with the output of the adding part 922 at the previous snapshot; and a sign exchanging part 924 which multiplies '−1' to the output of the dividing part 923.

Finally, the scalar synthesizing part 92 produces the value of the scalar ($\beta$) in accordance with the following equation:

$$\beta = -\frac{|\underline{r}(J+1)|^2}{|\underline{r}(J)|^2}.$$

The scalar value computed in FIG. 19 is used to obtain the search direction vector at the present snapshot by multiplying it to each element of the search direction vector of the last previous snapshot and adding each result of the multiplications to each corresponding element of the residue vector. The ultimate goal of computing the scalar value is to make all the search direction vectors at every snapshot be mutually orthogonal with respect to the autocorrelation matrix.

Figure 20:
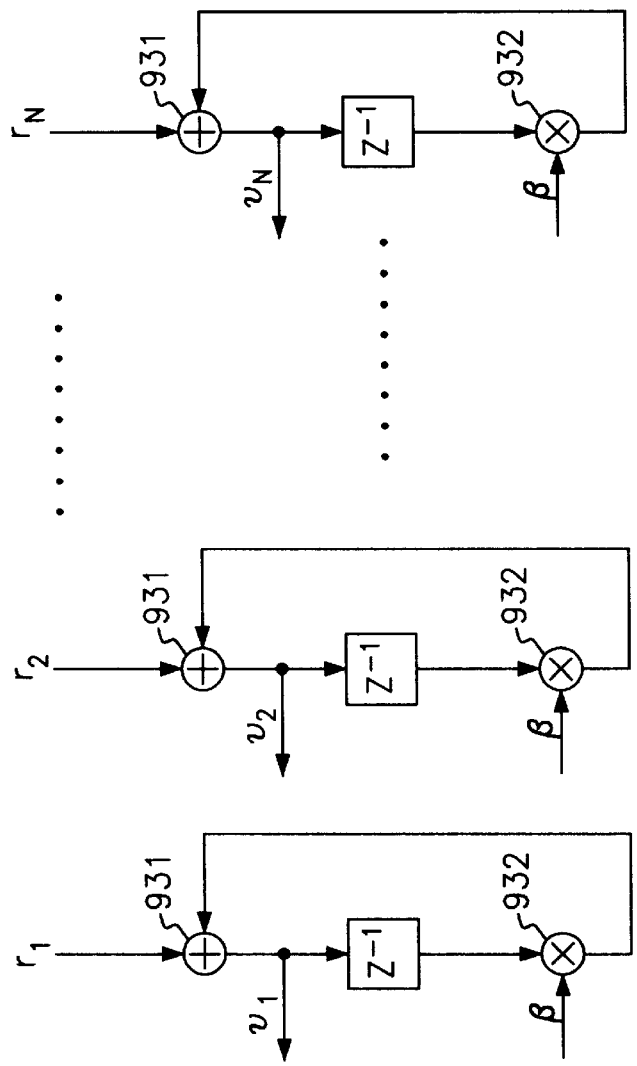
FIG. 20 is an example of the specified structure of the search direction vector synthesizing part shown in FIG. 15.

FIG. 20 illustrates an example of the specified structure of the search direction vector synthesizing part 93 shown in FIG. 15.

As illustrated in FIG. 20, the search direction vector synthesizing part 93 comprises the following parts: plural multiplying parts 932 for multiplying the scalar quantity ($\beta$) to each element of the search direction vector ($\upsilon$) of the last previous snapshot; and plural adding parts 931 for producing the search direction vector ($\upsilon$) of the present snapshot, by adding the corresponding element of the residue vector (r) and the output of the corresponding multiplying parts 932.

At the very first snapshot the residue vector itself produced from the residue vector synthesizing part 91 becomes the search direction vector. From the second snapshot and on, after computing the multiplication at the plural multipliers 932 between the scalar quantity and each element of the search direction vector obtained at the last previous snapshot, the search direction vector is produced by adding the output of the multipliers 932 to each element of the residue vector. The search direction vector is computed in accordance with the following equation:

$$\upsilon(J+1)=r(J+1)+\beta\upsilon(J)$$

where $\upsilon(J+1)$, $r(J+1)$, $\beta$, and $\upsilon(J)$ denote the search direction vector and residue vector at the J+1st snapshot, $\beta$ is the scalar quantity, and $\upsilon(J)$ is the residue vector obtained at the J_th snapshot.

FIG. 21 is an other block diagram of the signal processing part (9) shown in FIG. 13 according to the second embodiment of the present invention.

As shown in FIG. 21, the signal processing part according to the present invention further includes an autocorrelation matrix synthesizing part 96 and a maximum eigenvalue synthesizing part 97, in addition to all the parts included in the signal processing part shown in FIG. 16, i.e., the residue vector synthesizing part 91, the scalar synthesizing part 92, the search direction vector synthesizing part 93, the adaptive gain synthesizing part 94, and the gain vector synthesizing part 95.

The autocorrelation matrix synthesizing part 96 produces a autocorrelation matrix at each snapshot, and the maximum eigen value synthesizing part 97 produces an estimated value for the maximum eigenvalue of the autocorrelation matrix produced in the autocorrelation matrix synthesizing part 96.

The residue vector synthesizing part 91 produces the residue vector at each snapshot by utilizing the autocorrelation matrix generated from the autocorrelation matrix synthesizing part 96, the maximum eigenvalue generated from the maximum eigen value synthesizing part 97, and the value of the gain vector of the present snapshot.

The scalar synthesizing part 92 produces the scalar value, which is needed to compute the search direction vector, by utilizing the residue vector.

The search direction vector synthesizing part 93 produces the search direction vector from the residue vector and the scalar value, of which the detailed structure is the same as shown in FIG. 20.

The adaptive gain synthesizing part 94 produces the adaptive gain at each snapshot by utilizing the autocorrelation matrix, the search direction vector, the maximum eigenvalue and the gain vector.

Finally, the gain vector synthesizing part 95 produces the gain vector by updating the gain vector at the last previous snapshot by utilizing the search direction vector and the adaptive gain.

Figure 22:
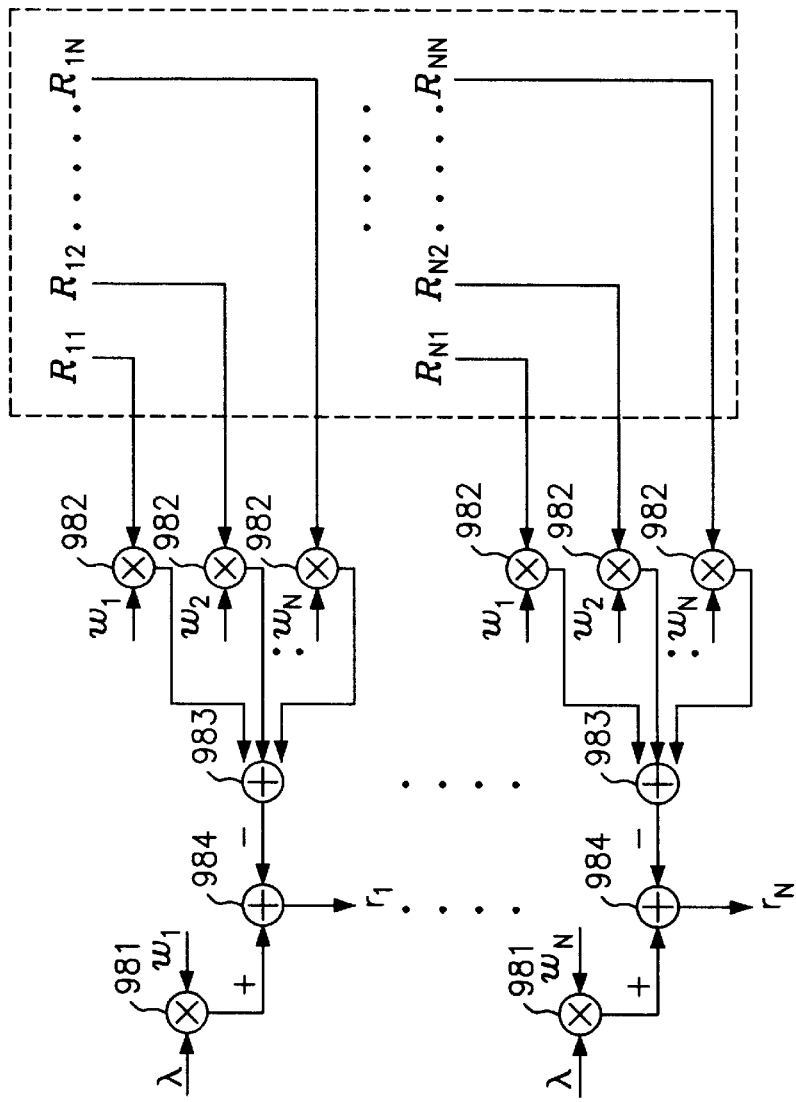
FIG. 22 is an example of the specified structure of the residue vector synthesizing part shown in FIG. 21.

FIG. 22 is an example of the specified structure of the residue vector synthesizing part 91 of the signal processing part shown in FIG. 21.

The residue vector synthesizing part 91 produces the residue vector utilizing the gain vector (w) and the maximum eigenvalue ($\lambda$) estimated at each snapshot from the autocorrelation matrix synthesized at the autocorrelation matrix synthesizing part 96 based on the equation (4).

As illustrated in the figure, the autocorrelation matrix synthesizing part 91 comprises the following parts: plural multiplying parts 982 to multiply, one by one, the element of each row of the autocorrelation matrix (R) by each corresponding element of the gain vector; plural adding parts 983, of which the number is as many as the number of rows of the autocorrelation matrix, for adding the outputs of the multiplying parts 982; plural multiplying parts 981 for multiplying every element of the gain vector by the maximum eigenvalue ($\lambda$) that has been estimated presently; and plural adding parts 984 for subtracting, one by one, each output of the adding parts 983 from each corresponding output of the multiplying parts 981.

Therefore, the residue vector (r) is produced at the residue vector synthesizing part (91) based on:

$$r=\lambda w-Rw.$$

Figure 23:
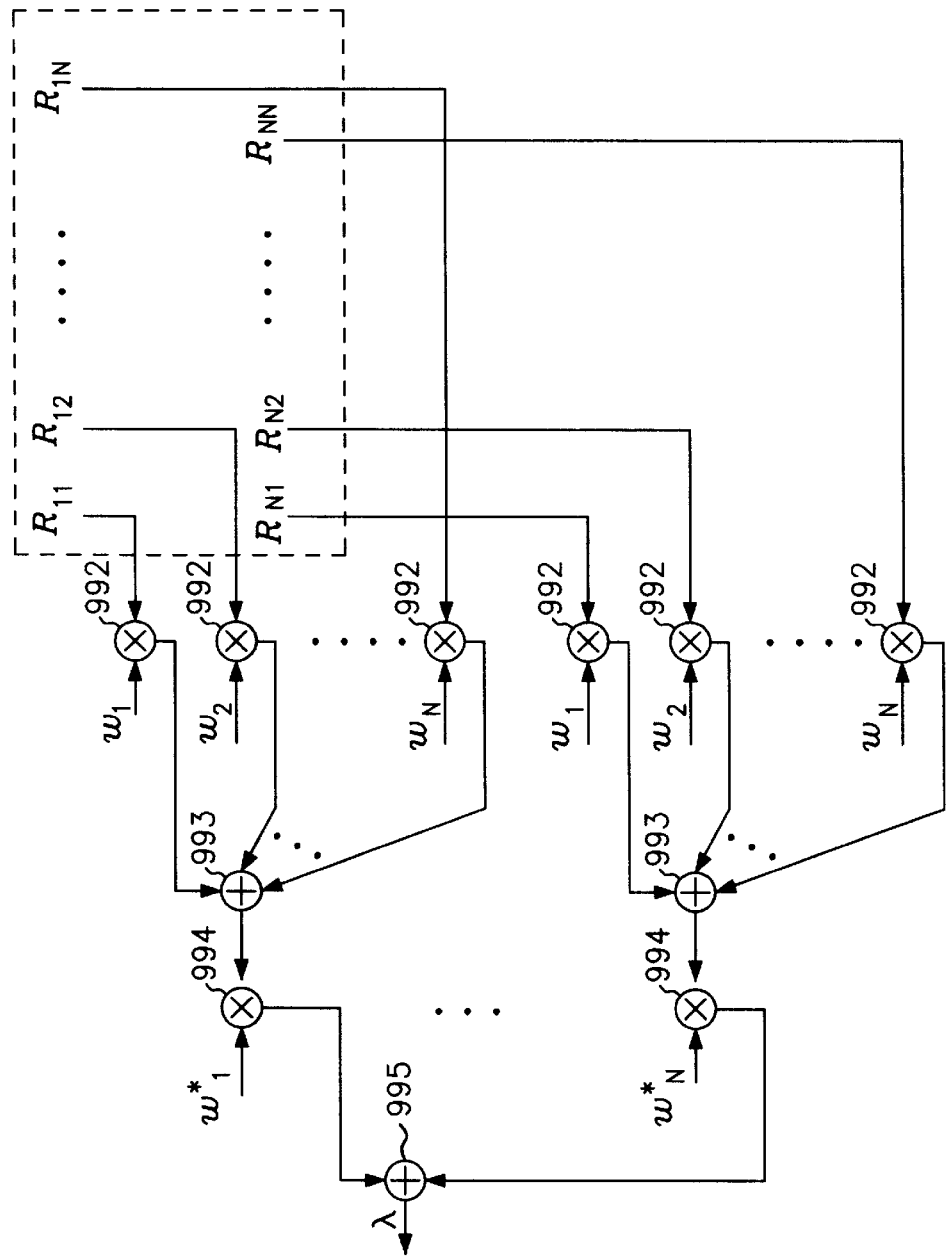
FIG. 23 is an example of the specified structure of the maximum eigenvalue synthesizing part shown in FIG. 21.

FIG. 23 is an example of the specified structure of the maximum eigenvalue synthesizing part 97 of the signal processing part described in FIG. 21.

As illustrated in the figure, the maximum eigenvalue synthesizing part 97 estimates the maximum eigenvalue ($\lambda$) from the autocorrelation matrix and the value of the gain vector (w) of the present snapshot.

The maximum eigenvalue synthesizing part 97 comprises the following parts: plural multiplying parts 992 for multiplying, one by one, each element of each row of the autocorrelation matrix by the corresponding element of the gain vector at the present snapshot; plural adding parts 993 for adding the outputs of the multiplying parts 992 each set of which are connected to the corresponding row; plural multiplying parts 994 for multiplying, one by one, each output of the adding parts 993 by the complex conjugate of each corresponding element of the gain vector at the present snapshot; and an adding part 995 for producing the estimated value for the maximum eigenvalue of the autocorrelation matrix of the present snapshot by adding the outputs of the multiplying parts 994, each of which is prepared for each corresponding row.

Finally, the maximum eigenvalue ($\lambda$) is produced at each snapshot for the normalized gain vector in accordance with the following equation:

$$\lambda=w^H Rw.$$

Figure 24:
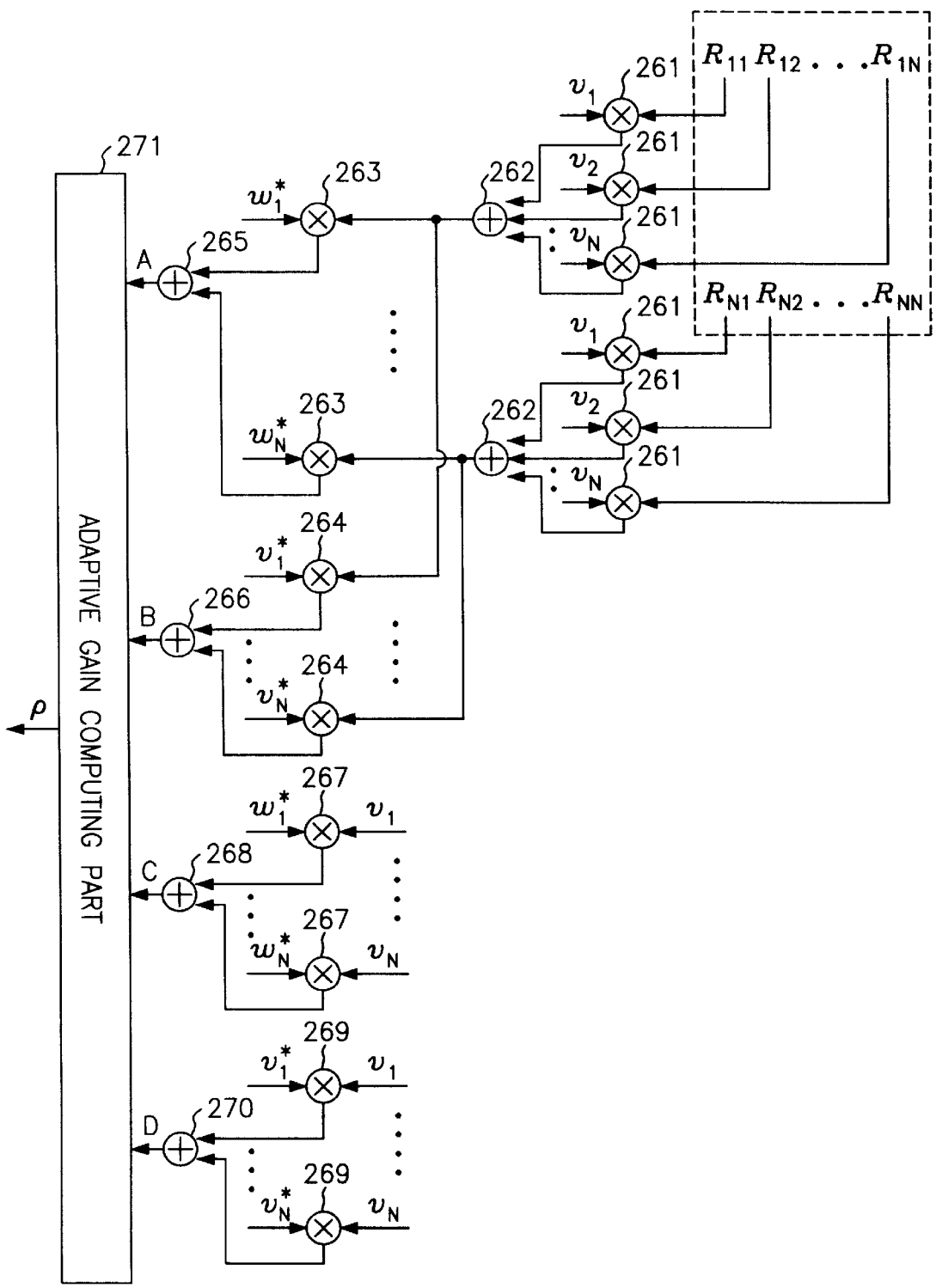
FIG. 24 is an example of the specified structure of the adaptive gain synthesizing part shown in FIG. 21.

FIG. 24 is an example of the specified structure of the adaptive gain synthesizing part 94 of the signal processing part shown in FIG. 21.

The adaptive gain synthesizing part 94 comprises the following parts: plural multiplying parts 261 for multiplying, one by one, each element of each row of the autocorrelation matrix by the corresponding element of the search direction vector; adding parts 262, of which the number is as many as the number of rows of the autocorrelation matrix, for adding the results of the multiplying parts 261 for each row of the autocorrelation matrix; plural multiplying parts 263 for multiplying each output of the adding parts 262 by the complex conjugate of each element of the gain vector; an adding part 265 for adding all the outputs of the multiplying parts 263; plural multiplying parts 264 for multiplying each output of the adding parts 262 by the complex conjugate of each corresponding element of the search direction vector; an adding part 266 for adding all the outputs of the multiplying parts 264; plural multiplying parts 267 for multiplying each element of the search direction vector by the complex conjugate of each corresponding element of the gain vector; an adding part 268 for adding all the outputs of the multiplying parts 267; plural multiplying parts 269 for multiplying each element of the search direction vector by the complex conjugate of the each element, one by one; an adding part 270 for adding all the outputs of the multiplying parts 269; and an adaptive gain computing part 271 for computing the adaptive gain from the outputs of the adding parts 265, 266, 268 and 270.

The adaptive gain computing part 271 generates the adaptive gain (σ) at each snapshot, in accordance with the equation given below:

$$\rho = \frac{-F - \sqrt{F^2 - 4EG}}{2E}$$

where E, F and G are defined as:
E=B·Re [C]–D·Re [A],
F=B–λ·D,
G=Re [D]–λ·Re [C],
with A, B, C and D being the output of the adding part 265, the output of the adding part 266, the output of the adding part 268, and the output of the adding part 270 respectively, and λ is the maximum eigenvalue, and Re [·] denotes the real part of the complex quantity ".".

Computing A, B, C and D as explained above, the values are obtained by:
A=$w^H R \upsilon$,
B=$\upsilon^H R \upsilon$,
C=$w^H \upsilon$,
D=$|\upsilon|^2$.

FIG. 25 is another block diagram of a signal processing part (9) of said signal receiving apparatus shown in FIG. 13 according to another embodiment of the present invention.

As shown in FIG. 25, the signal processing apparatus according to this embodied example has exactly the same structure as that in FIG. 21 except that the autocorrelation matrix synthesizing part 96 has been substituted by the matrix operation approximation part 136.

In the matrix operation approximation part 136 for approximating the matrix operations, instead of directly performing the matrix operations pertaining to the autocorrelation matrix, the two matrix-oriented operations are approximated with the proper vector operations and the results, which are gamma vector and zeta vector, are fed to the maximum eigenvalue synthesizing part 137, the residue vector synthesizing part 131, and the adaptive gain synthesizing part 134.

Therefore, the signal processing part shown in FIG. 25 has exactly the same structure as that shown in FIG. 21 except that the input of the maximum eigenvalue synthesizing part 137, the residue vector synthesizing part 131, and the adaptive gain synthesizing part 134 is the gamma and zeta vector, which are the results of approximating the matrix operations with the proper vector operations, instead of the autocorrelation matrix itself.

Figure 26:
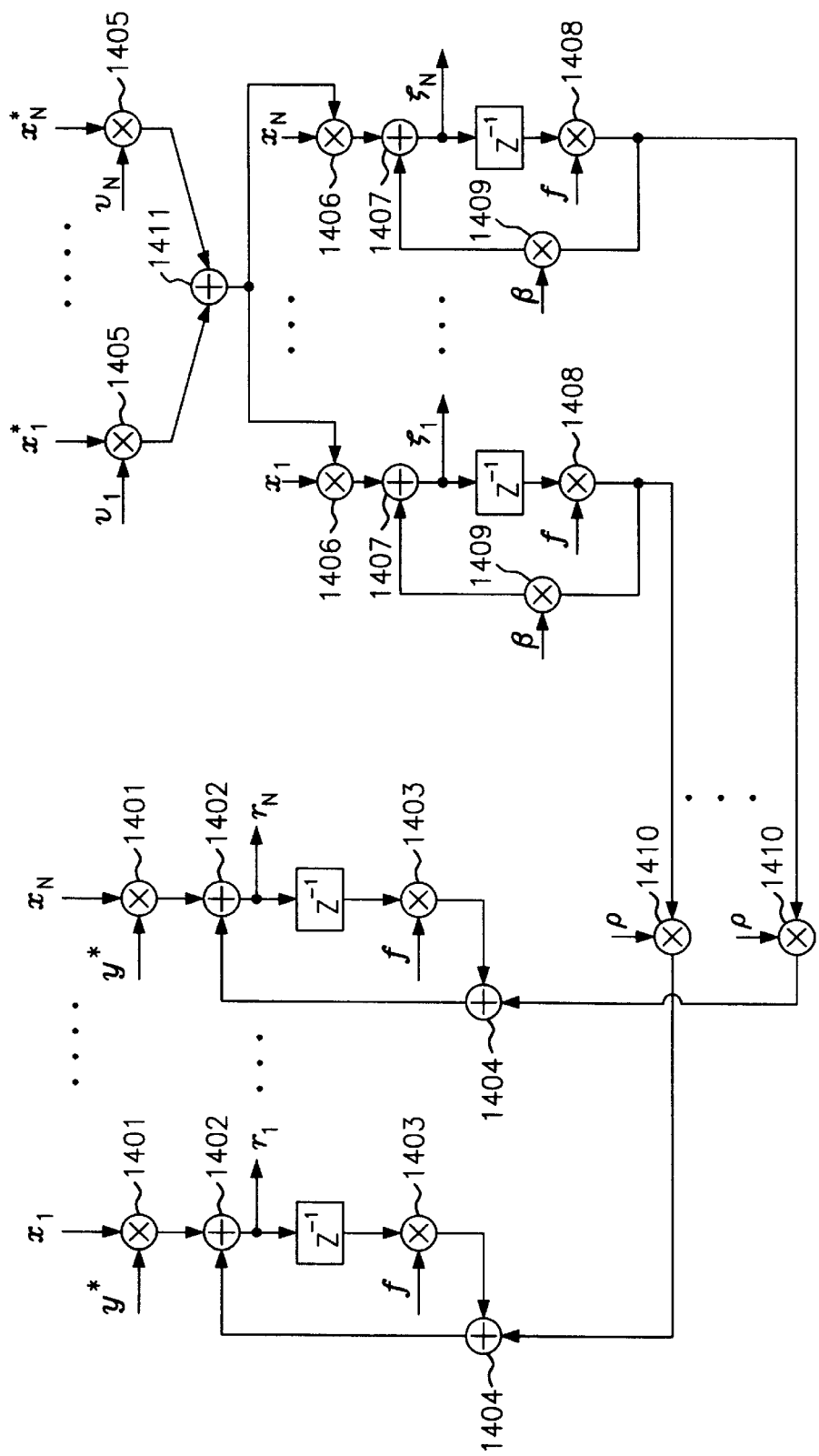
FIG. 26 is an example of the specified structure of the matrix operation approximation part shown in FIG. 25.

FIG. 26 is an example of the specified structure of the matrix operation approximation part 136 shown in FIG. 25.

As shown in the figure, the matrix operation approximation part 136 comprises the following parts: plural multiplying parts 1401 for multiplying each element of the signal vector (x), which is supplied from the outside, by the complex conjugate of the final array output (y(t)) of the telecommunication system, which is produced at the last previous snapshot; plural multiplying parts 1403 for multiplying each element of the gamma vector computed at the last previous snapshot by the forgetting factor (f); plural multiplying parts 1408 for multiplying each element of the zeta vector computed at the last previous snapshot by the forgetting factor (f); plural multiplying parts 1410 for multiplying the outputs of the multiplying parts 1408 by the adaptive gain (σ) generated from the adaptive gain synthesizing part 134; plural adding parts 1404 for adding the outputs of the multiplying parts 1410 to the outputs of other multiplying parts 1403; plural adding parts 1402 for adding the outputs of the adding parts 1404 to the outputs of the multiplying parts 1401; plural multiplying parts 1405 for multiplying the complex conjugate of each element of the signal vector (x), by each corresponding element of the search direction vector (v), which is generated from the search direction vector synthesizing part 133; an adding part 1411 for adding up all the outputs of the multiplying parts 1405; plural multiplying parts 1406 for multiplying the outputs of the adding parts to each element of the signal vector (x); plural multiplying parts 1409 for multiplying the outputs of the multiplying parts 1408 by the scalar quantity (β); and plural adding parts 1407 for adding the outputs of the multiplying parts 1409 to each corresponding output of the multiplying parts 1406.

The matrix operation approximation part 136 for approximating the matrix operations generates the gamma vector (γ) and the zeta vector (ζ) at the two sets of adding parts, i.e., 1402 and 1407, respectively. The gamma vector (γ) is fed to the maximum eigenvalue synthesizing part 137 and the residue vector synthesizing part 131. The zeta vector (ζ) is fed to the adaptive gain synthesizing part 134.

Figure 27:
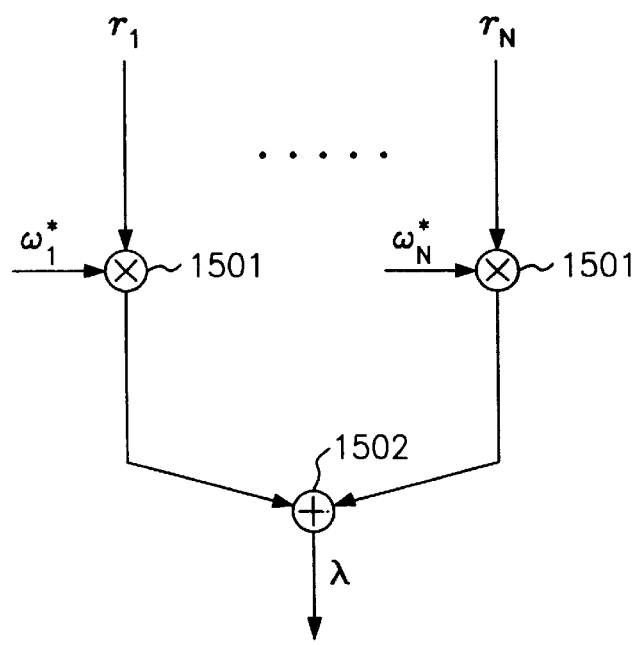
FIG. 27 is an example of the specified structure of the maximum eigenvalue synthesizing part shown in FIG. 25.

FIG. 27 is an example of the specified structure of the maximum eigenvalue synthesizing part 137 shown in FIG. 25.

As illustrated in FIG. 27, the maximum eigenvalue synthesizing part 137 comprises the following parts: plural multiplying parts 1501 for multiplying each element of the gamma vector (γ), which is supplied from the part 136 of approximating the matrix operations, by the complex conjugate of each corresponding element of gain vector (w); and an adding part 1502 for adding up all the outputs of the multiplying parts 1501.

The output of the adding part 1502 is provided as the output (λ) of the maximum eigenvalue synthesizing part 137.

Figure 28:
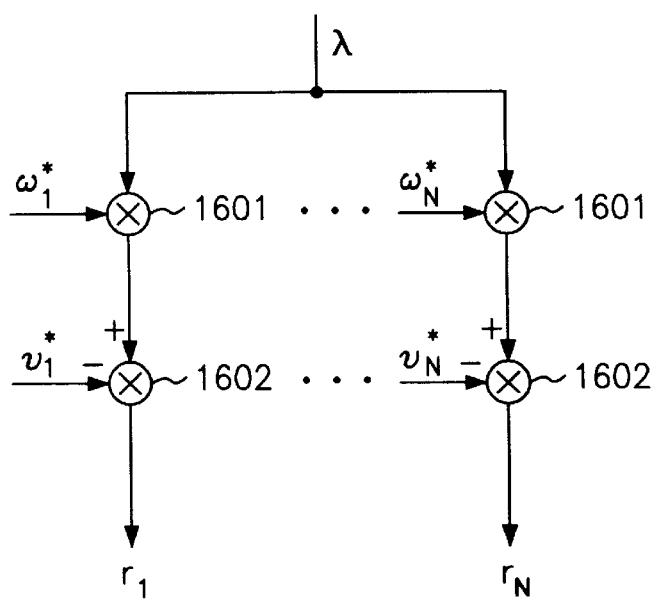
FIG. 28 is an example of the specified structure of the residue vector synthesizing part shown in FIG. 25.

FIG. 28 is an example of the specified structure of the residue vector synthesizing part 131 shown in FIG. 25. As illustrated in FIG. 28, the residue vector synthesizing part 131 comprises the following parts: plural multiplying parts 1601 for multiplying the value of each element of the gain vector (w) at the present snapshot by the maximum eigenvalue (λ) obtained from the maximum eigenvalue synthesizing part 137; and plural adding parts 1602 for subtracting each element of the search direction vector (v) from the corresponding output of the multiplying part 1601.

Ultimately, what is produced in the signal processing apparatus shown in FIG. 28 is the residue vector (r) satisfying the following equation:

r=λw–γ where λ, w and γ denote the output of the maximum eigenvalue synthesizing part 137, the gain vector of the present snapshot and the gamma vector, which is one of the two outputs of the part 136 of approximating the matrix operations, respectively.

Figure 29:
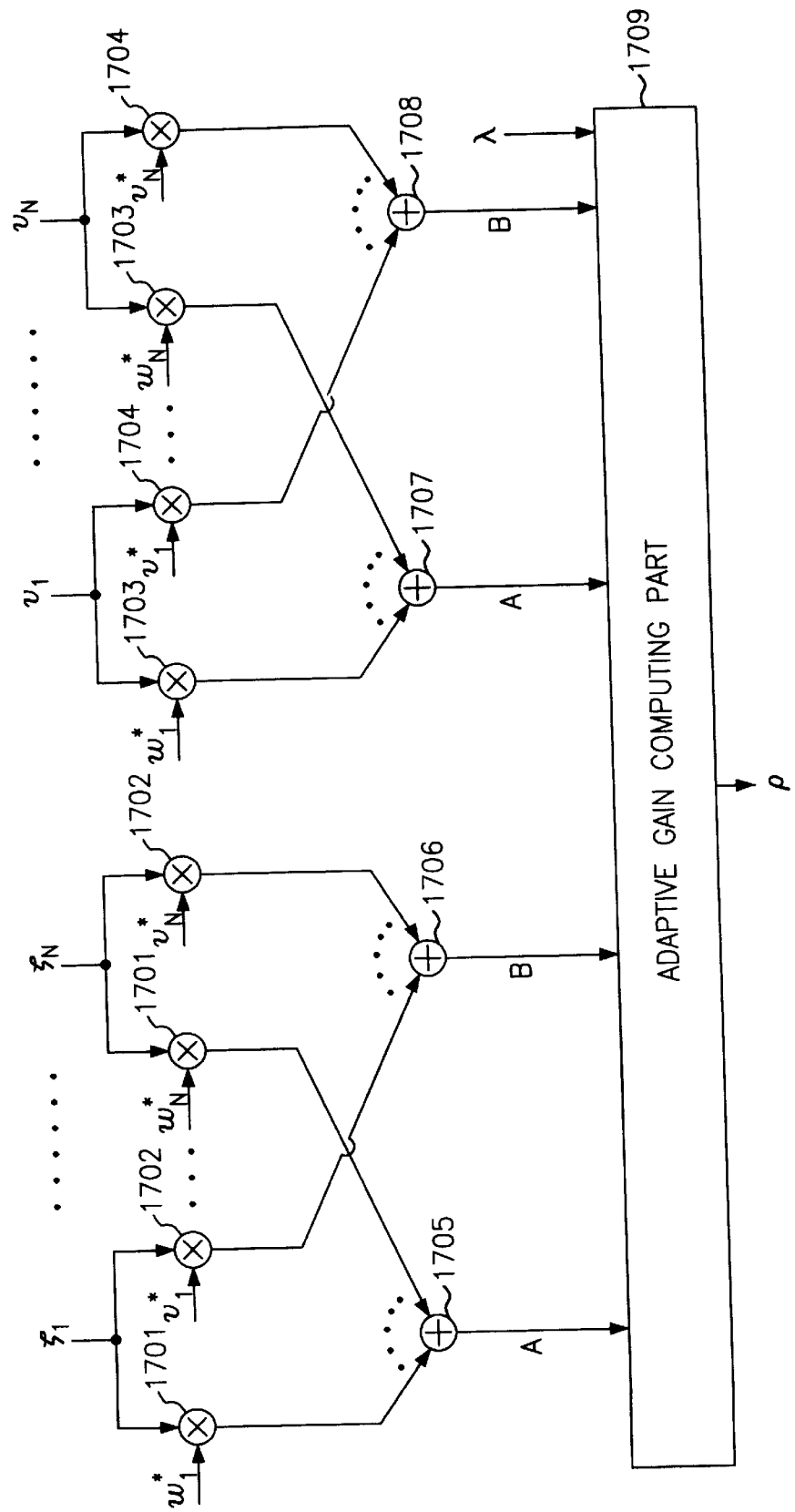
FIG. 29 is an example of the specified structure of the adaptive gain synthesizing part shown in FIG. 25.

FIG. 29 is an example of the specified structure of the adaptive gain synthesizing part 134 of the signal processing part shown in FIG. 25.

As illustrated in FIG. 29, the adaptive gain synthesizing part 134 comprises the following parts: plural multiplying parts 1704 for multiplying each element of the search direction vector (v) by the corresponding complex conjugate of the same element; an adding part 1708 for adding up all the outputs of the multiplying parts 1704; plural multiplying parts 1703 for multiplying each element of the search direction vector (v) by the complex conjugate of each corresponding element of the gain vector (w); an adding part 1707 for adding up all the outputs of the multiplying parts 1703; plural multiplying parts 1701 for multiplying, one by one, each element of the zeta vector (ζ) by the complex conjugate of each corresponding element of the gain vector (w); an adding part 1705 for adding up all the outputs of the multiplying parts 1701; plural multiplying parts 1702 for multiplying, one by one, each element of the zeta vector (ζ) by the complex conjugate of each corresponding element of the search direction vector (v); an adding part 1706 for adding up all the outputs of the multiplying parts 1702; and an adaptive gain computing part 1709 for computing the adaptive gain (σ) from the outputs of the adding parts 1705, 1706, 1707 and 1708.

The adaptive gain computing part 1709 described above generates the adaptive gain (σ) in accordance with the equation given below:

$$\rho = \frac{-F - \sqrt{F^2 - 4EG}}{2E}$$

where E, F and G are defined as:

E=B·Re [C]−D·Re [A],
F=B−λ·D,
G=Re [D]−λRe [C], with A, B, C, and D being the output of the adding part 1705, the output of the adding part 1706, the output of the adding part 1707 and the output of the adding part 1708, respectively, i.e.:

$A = w^H \cdot \zeta$,
$B = v^H \cdot \zeta$,
$C = w^H \cdot v$,
$D = v^H \cdot v$, and λ is the maximum eigenvalue and Re [·] denotes the real part of the complex quantity ".".

Figure 30:
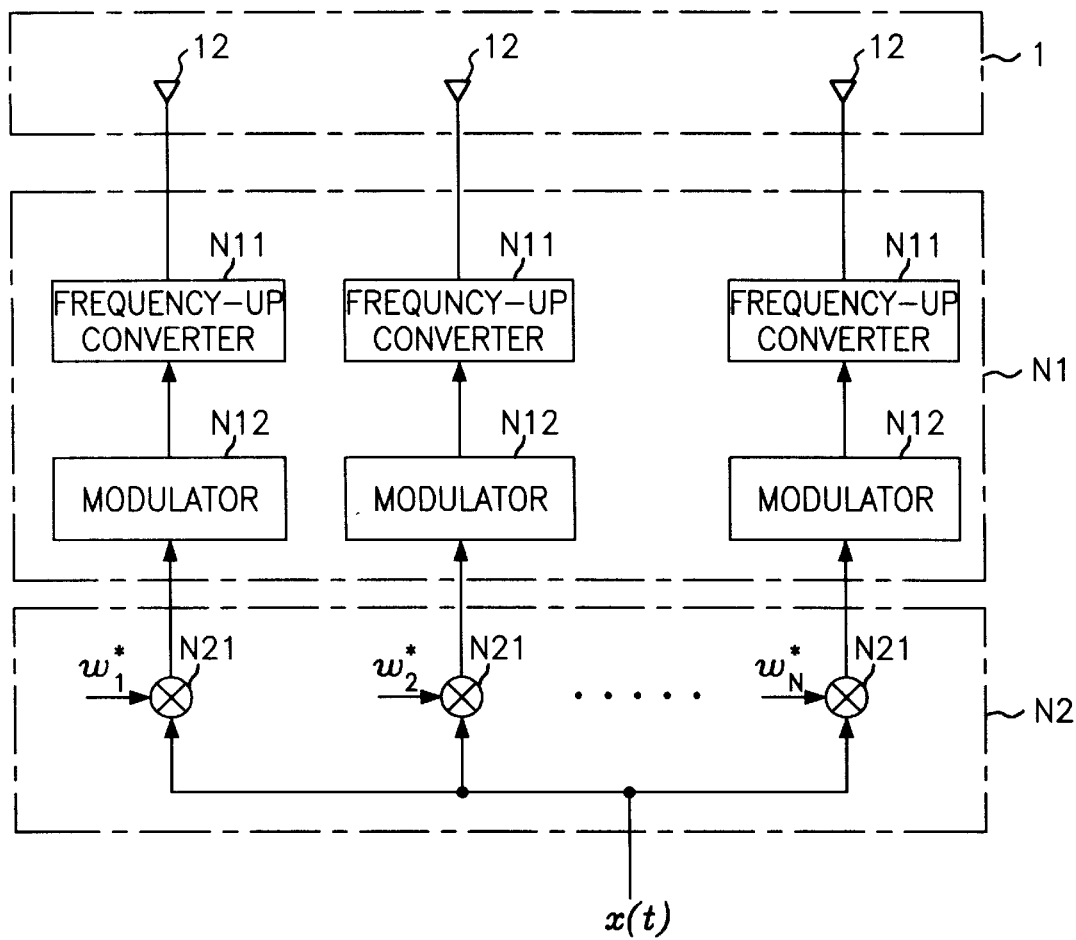
FIG. 30 shows a schematic block diagram of a signal transmitting apparatus that utilizes the array antenna according to the second embodiment of the present invention.

FIG. 30 is an example of the block diagram of a signal transmitting apparatus according to an embodiment of the present invention.

The main difference between this figure and FIG. 11 is that the complex gain vector is utilized in this figure whereas the phase delay vector was used in FIG. 11.

A single subscriber is considered in FIG. 30.

The signal to be transmitted is first divided into as many branches as the number of antenna elements to be sent to the phase delaying part (N2) which includes plural multipliers (N21). The signal to be transmitted via each antenna element is then multiplied by the complex conjugate of the corresponding element of said complex gain vector. The gain vector used in this apparatus is the one that has been obtained during the receiving mode in said signal processing part (5) shown in FIG. 3. Each phase delayed signal by said multiplier (N21) is sent to signal transmitting part (N1) that includes conventional procedures of transmitting signals such as plural modulators (N12) and frequency-up convertors (N11). Each modulated and frequency-up converted signal through said modulator (N12) and frequency-up convertor (N11), respectively, is fed to the corresponding antenna element (11) at the array antenna (1).

The signal transmitting apparatus shown in this invention utilizes the same gain vector for transmitting the signal along the direction of the target signal source so that the same beam pattern is used for each target subscriber during both the receiving and transmitting mode. As mentioned previously, it is possible to include both the receiving and transmitting apparatus in one telecommunication system. It is also possible to share an antenna element for both the receiving and transmitting signals.

Figure 31:
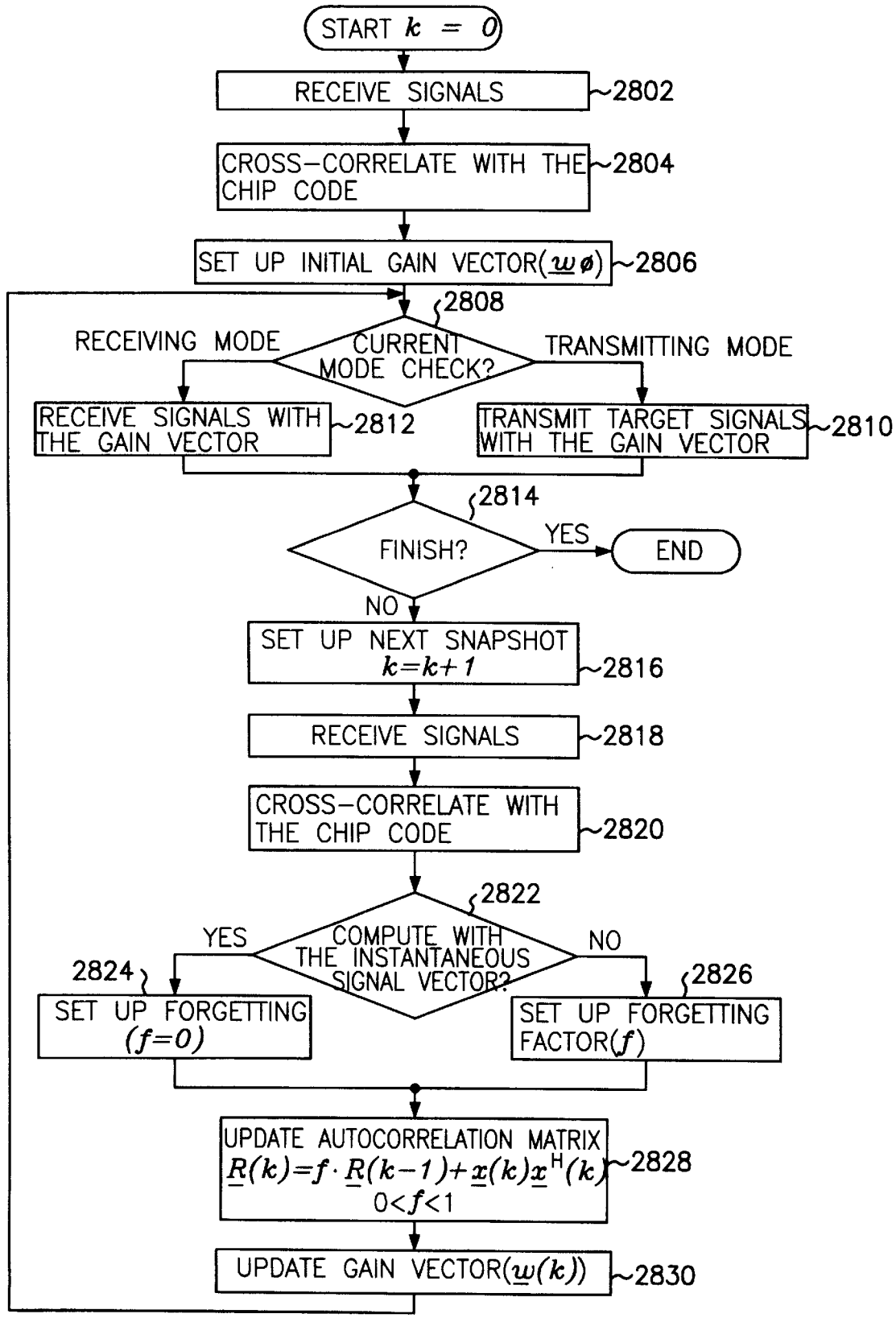
FIG. 31 is a flow chart to illustrate a telecommunication method for minimizing interference and reducing effects of noises by utilizing the array antenna according to the second embodiment of the present invention.

FIG. 31 is a flow chart explaining the functions of a signal receiving and transmitting apparatus wherein the effects of the interferences and noise are reduced utilizing said array antenna according to an embodiment of the present invention.

First, the initial complex-valued gain vector is set up (2806) based on the signals received initially (2802). If the proposed apparatus is to be applied in the CDMA communication system, the received signal must be cross-correlated (2804) with the chip code of the wanted signal source after the reception of the signals. Otherwise, skip the step of (2804).

Then, the current mode is checked as to whether it is in the receiving mode or the transmitting mode (2808).

In case of being in said receiving mode, the signal is received (2812) utilizing the gain vector at the present snapshot. If it is in transmitting mode, the target signal is transmitted (2810) utilizing the gain vector computed during the receiving mode.

If the snapshot is to be continued (2814), the snapshot index is updated (2816) and the new signals are received (2818) for the new snapshot. If the proposed apparatus is to be applied in the CDMA communication system, the received signal must be cross-correlated (2820) with the chip code of the wanted signal source after the reception of the signals. Otherwise, skip the step of (2820). Then, decide (2822) whether the autocorrelation matrix is only computed with the instantaneous signal vector. If so, have 0 for the forgetting factor (2824), otherwise set up the forgetting factor (2826) to be properly in between 0 and 1.

The autocorrelation matrix is updated (2828) as R(k)=f R(k−1)+x(k) $x^H$(k) where f is the forgetting factor, k denotes the snapshot index and the superscript H is the Hermitian operator. Note that when the forgetting factor is 0 the autocorrelation matrix itself need not actually be computed.

The gain vector is computed (2830) in such a way that each element of the gain vector be as close as possible to the corresponding element of the eigenvector corresponding to the largest eigenvalue of said updated autocorrelation matrix by the method released in this invention.

The procedure is to be repeated from the step of (2808).

If a proper value for the forgetting factor has been set, then the step of determining (2826) the value of the forgetting factor at each iteration can be eliminated. This means that a proper value for the forgetting factor can be predetermined. Furthermore, as mentioned earlier, when the processing is to be done with the instantaneous signal vector only, i.e., the forgetting factor is 0, the computation of the autocorrelation matrix itself is deleted. It is also possible that the procedure shown in FIG. 31 can separately be applied to either the receiving or transmitting signals. As mentioned earlier, the proposed technique can be very usefully applied when the desired signal is much larger than each interfering signal in magnitude. However, in case of CDMA communications, this condition is automatically satisfied at the output of the cross-correlator which performs on the received demodulated signal and the chip code of the target signal.

Figure 32:
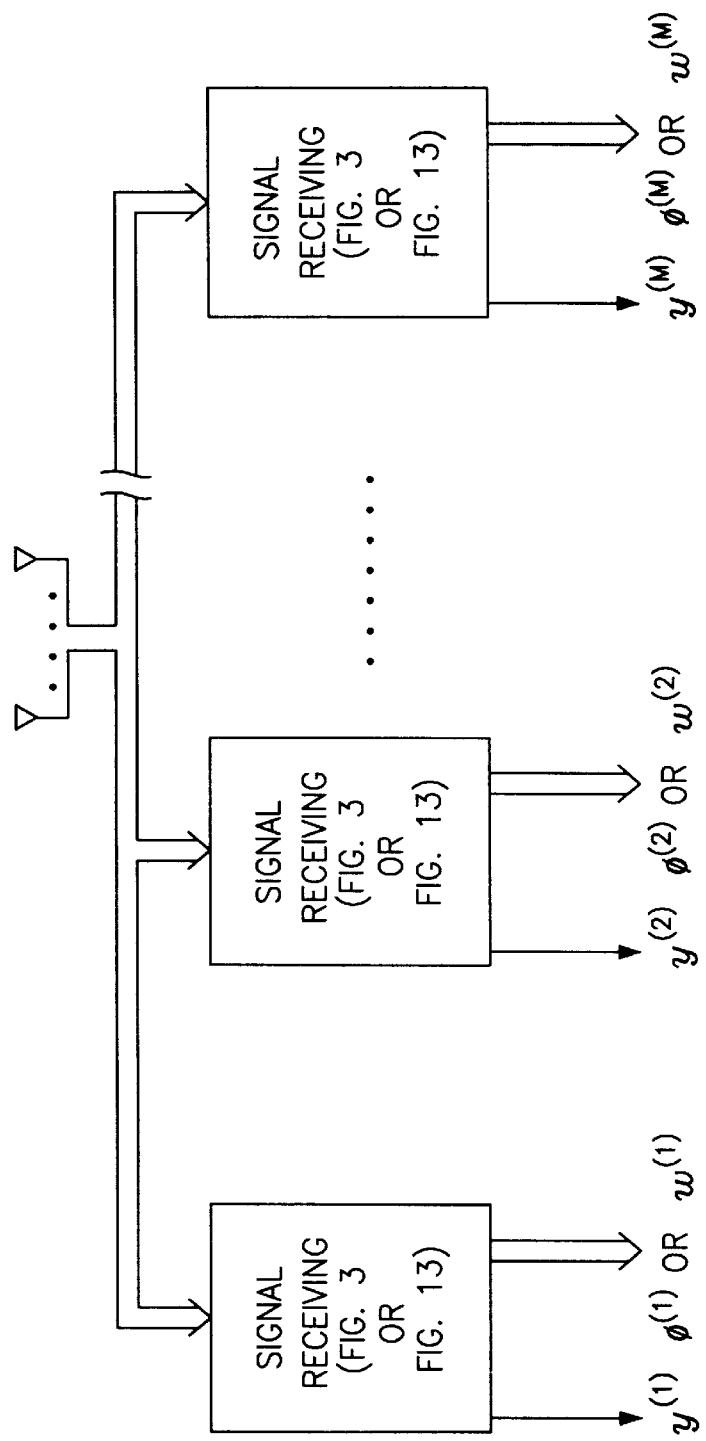
FIG. 32 is an example of the block diagram of a signal receiving apparatus for receiving signals each of which is transmitted from one of M subscribers according to the technique presented in the present invention.

FIG. 32 is a block diagram of the signal receiving apparatus for the receiving signals each of which is transmitted from one of M subscribers according to the technique presented in the present invention.

At each module, the receiving part and signal processing part that can be designed by the method presented in this invention are comprised.

For example, in order to receive the signal that has been transmitted from a subscriber, say subscriber #A, the signals induced at the array antenna are first processed through the conventional receiving procedure, such as frequency-down conversion, demodulation, and also chip code correlation in case of CDMA communication, in said signal receiving part that has been assigned for this subscriber. The signal vector $x_A$ generated based on the signal transmitted from the subscriber #A in said signal receiving part is then processed in the signal processing part that has been assigned for the subscriber #A where the optimal gain vector is computed to generated the final array output, i.e., $y^{(A)}$.

Figure 33:
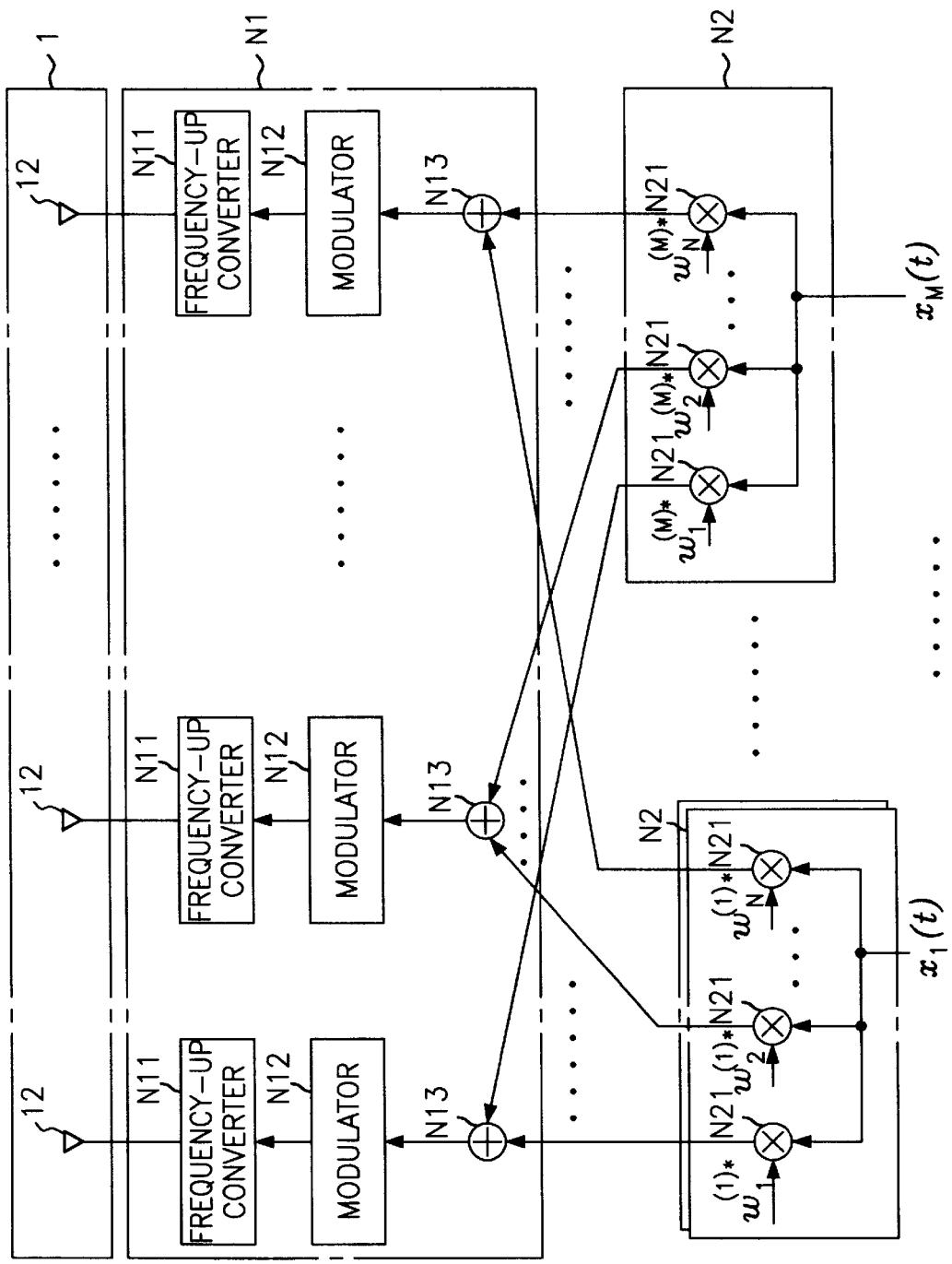
FIG. 33 is an example of the block diagram of a signal transmitting apparatus for transmitting signals each of which is transmitted to one of M subscribers according to the technique presented in the present invention.

FIG. 33 is another example of the block diagram of a signal transmitting apparatus according to an embodiment of the present invention.

In this figure, said signal transmitting apparatus utilizes the complex gain vector for appending the phase difference in between the signals at each antenna element, as that in FIG. 30. Being different from the signal transmitting apparatus, shown in FIG. 30, multiple subscribers are considered in FIG. 33 whereas only a single subscriber is considered in FIG. 30.

This means that each signal to be transmitted to the corresponding subscriber is multiplied by the corresponding gain vector that has been computed properly in said signal processing part during the receiving mode in accordance with the direction of each target subscriber. Each signal to be transmitted to its target subscriber is first divided into as many branches as the number of antenna elements to be sent to the phase delaying part (N2) which includes plural multipliers (N21). The number of phase delaying parts in the signal transmitting apparatus is the same as the number of subscribers to be served by the present signal transmitting apparatus. The number of multipliers (N21) in each phase delaying part (N2) is the same as the number of antenna elements in the array antenna (1). The signal to be transmitted via each antenna element is then multiplied by the complex conjugate of the corresponding element of the corresponding complex gain vector at each phase delaying part. Each gain vector used in this apparatus is one that has been obtained during the receiving mode in said signal processing part (5) shown in FIG. 3. All the signals to be transmitted from each antenna element are then added by plural adders (N13) in the signal transmitting part (N1).

For example, if the signal to be transmitted to the i_th subscriber at the k_th snapshot is denoted by $x_i(k)$, then it is multiplied by $w_{(i)}^j$ to form the j_th input of the signal transmitting part associated with j_th antenna element where i runs from 1 to M and j runs from 1 to N with M and N being the number of subscribers and antenna elements, respectively. Each phase delayed signal by said multiplier (N21) is sent to signal transmitting part (N1) that includes conventional procedures of transmitting signals, such as plural modulators (N12) and frequency-up convertors (N11). Each modulated and frequency-up converted signal through said modulator (N12) and frequency-up convertor (N11), respectively, is fed to the corresponding antenna element (11) at the array antenna (1).

Figure 34A:
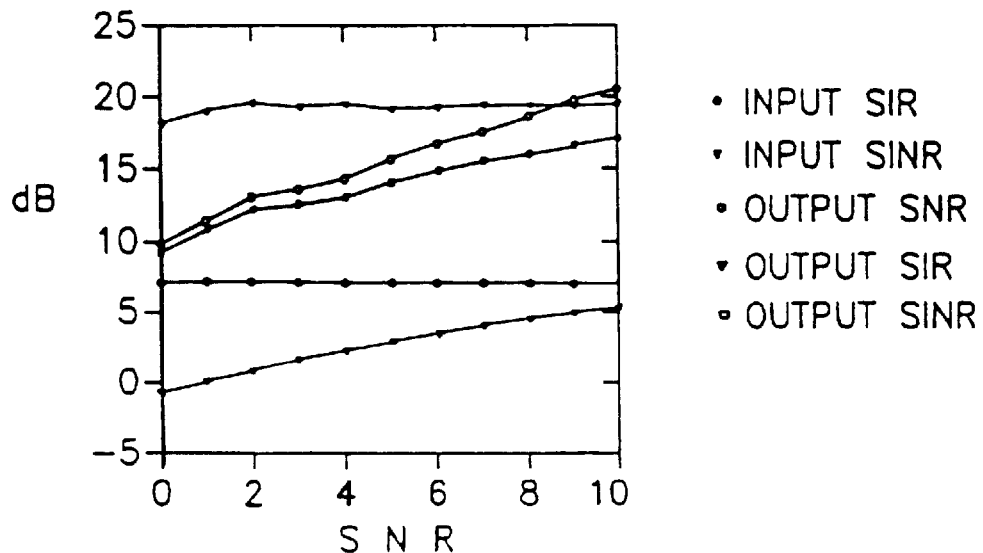
FIG. 34A and FIG. 34B illustrate the performances of the signal receiving apparatus that has been designed in accordance with the technique presented in this invention when the array antenna consists of 12 linearly arranged antenna elements with equal spacings between the antenna elements.
Figure 34B:
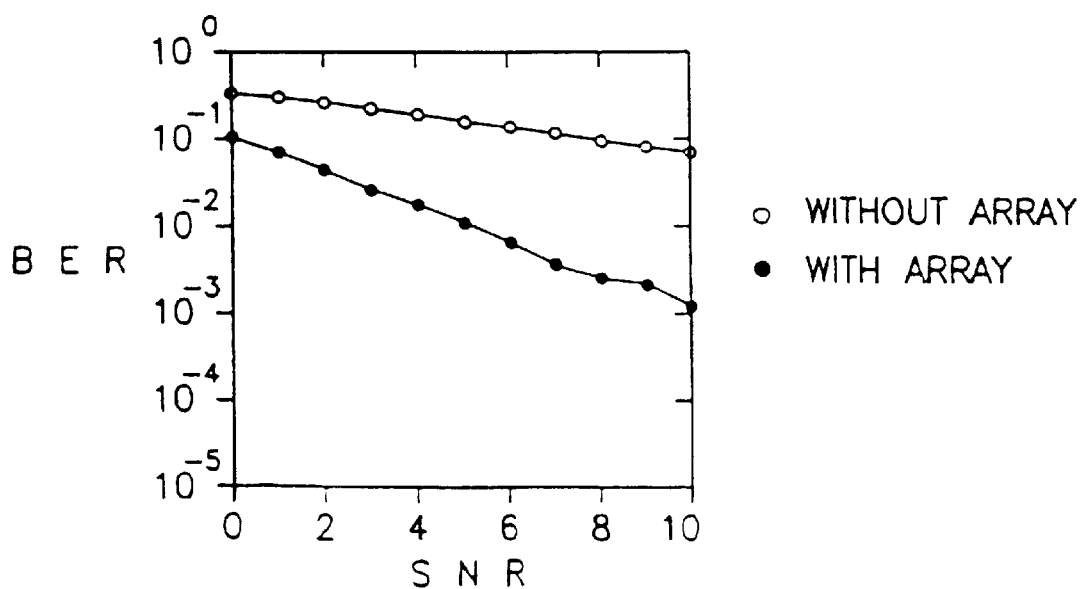

FIG. 34A and FIG. 34B illustrate the performances of the signal receiving apparatus that has been designed in accordance with the technique presented in this invention when the array antenna consists of 12 linearly arranged antenna elements with equal spacing between the antenna elements. As shown in FIG. 34A, the signal-to-noise ratio (SNR) at the output port of the proposed apparatus is reduced proportionally to the number of antenna elements, i.e., ½. As for the interferences, the proposed apparatus increases the signal-to-interference ratio (SIR) by nearly 12 dB, which is obtained due to the beam pattern provided by the optimal weight vector generated in the signal processing part of the apparatus. In the meantime, the required amount of computation is only, as mentioned previously, about $O(3N^2+12N)$ where N denotes the number of antenna elements in the array. Furthermore, when the autocorrelation matrix is approximated with the instantaneous signal vector only, the total amount of computation for generating the desired beam pattern is just $O(11N)$, in which case the SIR improvement is about 9 dB. Considering that the performance of the bit error rate (BER) in the simplified version is inferior to the original version, we can also demonstrate a compromised version which requires about $O(15N)$ of computation at every snapshot. It has been observed from the various computer simulations that the performances of the compromised version, including the BER performance, is almost comparable to that of the original version.

Summarizing the above discussions, the present invention results in the followings merits in wireless telecommunications: (a) the optimal weight vector is computed without any information regarding the signal to be received when the target signal is much larger than each of interfering signals, (b) the level of interference is reduced as much as the magnitude ratio between the main lobe and side lobes of the beam pattern provided by the optimal weight vector, (c) the effects of the noise are reduced linearly as the number of antenna elements of the array, (d) the required amount of computation for obtaining the optimal weight vector is small enough for real-time processing with an ordinary off the shelf DSP (digital signal processor), (e) the beam pattern obtained during the receiving mode can be used as it is during the transmitting mode by utilizing the same weight vector during the transmission of the signal, (f) the life time of the battery at each subscriber is extended tremendously because each transmission power of each subscriber may be reduced due to the high receiving efficiency at the receiving apparatus designed by the proposed technique.

The possible disadvantages in using the proposed technique is that the signal processing part of this invention does not work properly unless the target signal is much larger than each interfering signal in magnitude.

In fact, if the interference is larger than the target signal at the input of the receiving apparatus, then the proposed apparatus provides the main lobe along the direction of the large interference which would worsen the receiving performance. However, in many practical signal environments, the desired signal is much larger than each of the interferences. Even if it does not hold in some particular signal environments, there exists many techniques through which the desired condition could be satisfied.

For example, in CDMA mobile communications, the desired signal becomes much larger than each of the interfering signals after performing the cross-correlation with the chip code of the target signal source. Anyway, the performance of the proposed technique inevitably depends on the magnitude ratio between the target signal and each of interfering signals.

Although the specific embodiments of the present invention have been disclosed and described, it is apparent that those skilled in the art will appreciate that various modifications, additions and substitutions are possible, without departing from the scope and the spirit of the present invention as disclosed in the accompanying claims. Therefore, it should be understood that the present invention is not limited to the particular embodiment disclosed herein as the best mode contemplated for carrying out the present invention.

What is claimed is:

1. A method for designing a receiving array antenna consisting of plural antenna elements of predetermined arrangement and spacing between said antenna elements, wherein a final array output of said array antenna is obtained by a gain vector (w(k)), which is determined from an eigenvector corresponding to a maximum eigenvalue of an autocorrelation matrix of received signals, in accordance with an equation:

$$R(k)w(k)=\lambda_{MAX}w(k),$$

where R(k) denotes the autocorrelation matrix of the received signals at k__th snapshot with $\lambda_{MAX}$ being the maximum eigenvalue of R(k).

2. A method according to claim 1, wherein said final array output is obtained by first multiplying each element of said gain vector to each signal induced at the corresponding antenna element and adding up the results of multiplications.

3. A method according to claim 1, wherein said final array output is obtained by first multiplying the complex conjugate of each element of said gain vector to each signal induced at the corresponding antenna element and adding up the results of multiplications.

4. A method according to claim 1, wherein said autocorrelation matrix is computed by adding a first term and a second term, as shown in the equation given below: (in the equation, said first term is the autocorrelation matrix, at the last previous snapshot, multiplied by a forgetting factor of which the magnitude is between 0 and 1, and said second term is a signal matrix computed with said signal vector (x(t)) obtained from each antenna element of said array antenna at said present snapshot)

$$R_x(J+1)=fR_x(J)+x((J+1)T_s)x^H((J+1)T_s)$$

where $R_x(J+1)$ and $R_x(J)$ denote said autocorrelation matrix at the J+1__st and J__th snapshots, respectively, f is said forgetting factor of which the magnitude lies between 0 and 1, Ts is a snapshot period, and superscript H denotes a Hermitian operator.

5. A method according to claim 1, wherein the eigenvector corresponding to the maximum eigenvalue is computed by the procedures of:

(a) determining the gain vector to synchronize a phase of each signal induced at every antenna element to a phase of a signal induced at a reference antenna element, during a first snapshot; and (b) updating the gain vector of a last previous snapshot, in such a way that a Rayleigh quotient defined by the autocorrelation matrix and the gain vector is maximized at each snapshot, and a gain value to be multiplied to a signal induced at said reference antenna element at each snapshot is maintained to be a real quantity, during a second snapshot and on.

6. A method according to claim 5, wherein said reference antenna element is determined by an antenna element of which the phase of said signal is the latest of all said antenna elements in said array antenna at the present snapshot.

7. A method according to claim 5, wherein said reference antenna element is determined by an antenna element of which the physical distance from a signal source to be communicated with at the present snapshot is farthest compared to the other antenna elements in said array antenna.

8. A method for designing a transmitting array antenna consisting of plural antenna elements of predetermined arrangement and spacing between said antenna elements, wherein a signal to be transmitted is phase delayed by multiplying the signal to be transmitted by each element of a gain vector (w(k)), which is determined from each element of an eigenvector corresponding to a maximum eigenvalue of an autocorrelation matrix of received signals, in accordance with an equation:

$$R(k)w(k)=\lambda_{MAX}w(k),$$

where R(k) denotes the autocorrelation matrix of the received signals at k__th snapshot with $\lambda_{MAX}$ being the maximum eigenvalue of R(k).

9. A method according to claim 8, wherein the signal to be transmitted is multiplied by a complex conjugate of each element of the gain vector (w(k)).

10. A method according to claim 8, wherein said autocorrelation matrix is computed by adding a first term and a second term, as shown in the equation given below: (in the equation, said first term is the autocorrelation matrix, at the last previous snapshot, multiplied by a forgetting factor of which the magnitude is between 0 and 1, and said second term is a signal matrix computed with said signal vector (x(t)) obtained from each antenna element of said array antenna at said present snapshot)

$$R_x(J+1)=fR_x(J)+x((J+1)T_s)x^H((J+1)T_s)$$

where $R_x(J+1)$ and $R_x(J)$ denote said autocorrelation matrix at the J+1__st and J__th snapshots, respectively, f is said forgetting factor of which the magnitude lies between 0 and 1, $T_s$ is a snapshot period, and superscript H denotes a Hermitian operator.

11. A method according to claim 8, wherein said eigenvector corresponding to said maximum eigenvalue is computed by the procedures of:

(a) determining said gain vector to synchronize the phase of each signal induced at every antenna element to the phase of said signal induced at said reference antenna element, during the first snapshot; and (b) updating said gain vector of the last previous snapshot, in such a way that a Rayleigh quotient defined by said autocorrelation matrix and said gain vector is maximized at each snapshot, and a gain value to be multiplied to signal induced at said reference antenna element at each snapshot is maintained to be a real quantity, during a second snapshot and on.

12. A method according to claim 11, wherein said reference antenna element is determined by an antenna element of which the phase of said signal is the fastest of all said antenna elements in said array antenna at the present snapshot.

13. A method according to claim 11, wherein said reference antenna element is determined by an antenna element of which the physical distance from a signal source to be communicated with at the present snapshot is nearest compared to the other antenna elements in said array antenna.

14. A telecommunication system having an array antenna, comprising;

said array antenna composed of plural antenna elements, each of which is arranged by a predetermined geometry, that supplies signals induced at each antenna element to a corresponding port of a signal receiving means;

said signal receiving means that generates signal vector (x(t)) from the signals induced at each antenna element of said antenna array;

an inner product computing means for generating a final array output (y(t)) by computing an Euclidean inner product between two complex-valued vectors (y(t)= $w^H x(t)$), wherein the signal vector (x(t)) produced from said signal receiving means and a gain vector (w) provided from a signal processing means: and said signal processing means that computes the gain vector (w) from an eigenvector corresponding to a maximum eigenvalue of an autocorrelation matrix of received signals, in accordance with an equation:

$$Rw = \lambda_{MAX} w;$$

where R denotes the autocorrelation matrix of the received signals with $\lambda_{MAX}$ being the maximum eigenvalue of R for generating the final array output (y(t)) at said inner product computing means.

15. A telecommunication system having an array antenna according to claim 14, wherein said signal receiving means comprises:

a first group of multiplying means for multiplying the cosine terms ( $\cos(2 \pi f_c t)$) to each signal induced at every antenna element;

a second group of multiplying means for multiplying the sine terms ( $\sin(2 \pi f_c t)$) to each signal induced at every antenna element; and a first and a second group of low pass filtering means which are connected to said first and second group of multiplying means.

16. A telecommunication system having an array antenna according to claim 14, wherein said signal receiving means comprises:

a first group of multiplying means for multiplying the cosine terms ( $\cos(2 \pi f_c t)$) to each signal induced at every antenna element;

a second group of multiplying means for multiplying the sine terms ( $\sin(2 \pi f_c t)$) to each signal induced at every antenna element;

a first and a second group of low pass filtering means which are connected to said first and second group of multiplying means; and a first and a second group of chip correlating means for performing cross-correlation of the outputs of said low pass filtering means with chip codes of in-phase ($q_j^I(t)$) and quadrature ($q_j^Q(t)$) components, respectively, where the subscript j is the index denoting the target subscriber.

17. A telecommunication system having an array antenna according to claim 16, wherein said signal receiving further comprises:

a plurality of IF (intermediate frequency) converting means for converting frequency bands of the signals induced at the antenna elements to intermediate frequency bands; and a plurality of demodulating means which generates cosine and sine components of said IF signals.

18. A telecommunication system having an array antenna according to claim 14, wherein said signal receiving means comprises:

a plurality of IF (intermediate frequency) converting means for converting the frequency bands of the signals induced at the antenna elements to intermediate frequency bands;

a plurality of demodulating means which generates the cosine and sine components of said IF signals;

a first and a second group of chip correlating means for performing cross-correlation of the outputs of said demodulating means with the chip codes of in-phase ($q_j^I(t)$) and quadrature ($q_j^Q(t)$) components, respectively, where the subscript j is the index denoting the target subscriber.

19. A telecommunication system having an array antenna according to claim 14, wherein said signal processing means comprises:

a means for computing a residue vector (r), by using a signal vector (x(t)) provided from said array antenna at each snapshot, a final array output signal (y) of said telecommunication system at the last previous snapshot and a value of a gain vector (w) of the present snapshot, and for outputting said residue vector (r);

a means for synthesizing a scalar value (β), which is needed to generate a search direction vector (υ), from said residue vector (r);

a means for producing said search direction vector (υ), by using said residue vector (r) and said scalar value (β);

a means for producing an adaptive gain (σ), by using said signal vector (x(t)), said search direction vector (υ), said final array output signal (y) of said telecommunication system at the last previous snapshot and the value of said gain vector (w) of the present snapshot; and a means for updating said gain vector (w), by using said search direction vector (υ) and said adaptive gain (σ) at the present snapshot.

20. A telecommunication system having an array antenna according to claim 19, wherein said means for computing said residue vector comprises:

a first multiplying means which computes the squared value of said final array output (y(t)) at the last previous snapshot;

a plurality of second multiplying means which compute the inner product of said final array output (y(t)) at the last previous snapshot to said signal vector coming from said receiving means;

a plurality of third multiplying means which multiply the output of said first multiplying means by each corresponding element of said gain vector; and a plurality of subtracting means which subtract each output of said second multiplying means from each corresponding output of said second multiplying means.

21. A telecommunication system having an array antenna according to claim 19, wherein said adaptive gain synthesizing means comprises:

a plurality of first multiplying means which multiply each element of said search direction vector (υ) by the complex conjugate of each corresponding element of said signal vector (x(t));

a first adding means which adds the outputs of all said first multiplying means;

a plurality of second multiplying means which compute the square of absolute values of all the elements of said search direction vector (υ);

a second adding means which adds the outputs of all said second multiplying means;

a plurality of third multiplying means which multiply the complex conjugate of each element of said gain vector by each corresponding element of said search direction vector, in a order;

a third adding means which adds the outputs of all said third multiplying means;

a fourth multiplying means which computes the square of an output of said first adding means;

a fifth multiplying means which multiplies said final array output (y(t)) of the last previous snapshot by said output of said first adding means;

a sixth multiplying means which computes the square of the absolute value of said final array output (y(t)) of the last previous snapshot; and an adaptive gain computing means that is connected to said first adding means, said second adding means, said fourth multiplying means, said fifth multiplying means and said sixth multiplying means.

22. A telecommunication system having an array antenna according to claim 21, wherein said adaptive gain computing means generates said adaptive gain ($\sigma$) in accordance with the equation given below:

$$\rho = \frac{-G - \sqrt{G^2 - 4FH}}{2F}$$

where, $F = C \cdot Re[D] - B \cdot Re[E]$,
$G = C - |y(t)|^2 \cdot E$,
$H = Re[B] - |y(t)|^2 \cdot Re[D]$, and
Re [·] denotes the real part of the complex valued number "·"

with B being the output of said fourth multiplying means, which is the result of the multiplication of A (Said A being the output of said first adding means, which is the result of the inner product of said signal vector and said search direction vector) and said final array output, C being the output of said sixth multiplying means, which is the square of said A, D being the output of said second adding means, which is the result of the inner product of said gain vector and said search direction vector, and E being the output of said third adding means, which is the result of the inner product of said search direction vector and itself.

23. A telecommunication system having an array antenna according to claim 19, wherein said gain vector updating means comprises:

a plurality of multiplying means which multiply said adaptive gain by each element of said search direction vector at the present snapshot; and a plurality of adding means that add said gain vector obtained during the last previous snapshot to each output of said plurality of said multiplying means.

24. A telecommunication system having an array antenna according to claim 19, wherein said gain vector updating means further comprises a plurality of dividing means for dividing each output of said plurality of said adding means with the square root of N multiplied with the value of the output of said adding means connected to said reference antenna element, where N denotes the number of antenna elements in said array antenna.

25. A telecommunication system having an array antenna according to claim 19, wherein said scalar synthesizing means comprises:

a plurality of multiplying means which compute the square of the absolute value of each element of said residue vector;

an adding means that adds the outputs of all said multiplying means;

a dividing means that divides the output of said adding means at the present snapshot with another output of said adding means at the last previous snapshot; and a sign exchanging means which multiplies −1 by an output of said dividing means.

26. A telecommunication system having an array antenna according to claim 19, wherein said search direction vector synthesizing means comprises:

a plurality of multiplying means for multiplying said scalar quantity by each element of said search direction vector of the last previous snapshot; and a plurality of adding means for producing said search direction vector of the present snapshot, by adding each element of said residue vector and the output of said corresponding multiplying means.

27. A telecommunication system having an array antenna according to claim 14, wherein said signal processing means comprises:

an autocorrelation generating means that produces an autocorrelation matrix from a signal vector (x(t)) provided from said array antenna at each snapshot;

a maximum eigenvalue synthesizing means that estimates the maximum eigenvalue of said autocorrelation matrix at each snapshot;

a residue vector synthesizing means that produces a residue vector, by using said autocorrelation matrix generated at each snapshot, said maximum eigenvalue and a value of a gain vector of the present snapshot;

a scalar synthesizing means that produces a scalar value, which is needed to generate a search direction vector, from said residue vector;

a search direction vector synthesizing means that produces said search direction vector, by using said residue vector and said scalar value;

an adaptive gain synthesizing means that produces an adaptive gain, by using said autocorrelation matrix, said search direction vector ($\upsilon$), said maximum eigenvalue at the present snapshot, and the value of said gain vector (w) at the present snapshot; and a gain vector updating means that updates said gain vector by using said search direction vector and said adaptive gain at each present snapshot.

28. A telecommunication system having an array antenna according to claim 27, wherein said residue vector synthesizing means comprises:

a plurality of first multiplying means for multiplying, one by one, each element of each row of said autocorrelation matrix (R) by each corresponding element of said gain vector;

a plurality of first adding means, of which the number is as many as the number of rows of said autocorrelation matrix, for adding the outputs of all said first multiplying means;

a plurality of second multiplying means for multiplying every element of said gain vector by said maximum eigenvalue ($\lambda$) that has been estimated presently; and, a plurality of second adding means for subtracting, one by one, each output of said first adding means from each corresponding output of said second multiplying means.

29. A telecommunication system having an array antenna according to claim 27, wherein said maximum eigenvalue synthesizing means for producing said maximum eigenvalue, by utilizing said autocorrelation matrix generated from said autocorrelation matrix generating means at each snapshot and said gain vector at the present snapshot, comprises:

a plurality of first multiplying means for multiplying, one by one, each element of each row of said autocorrelation matrix by the corresponding element of said gain vector at the present snapshot;

a plurality of first adding means for adding the outputs of said first multiplying means of which each corresponding set is connected to a corresponding row of said autocorrelation matrix;

a plurality of second multiplying means for multiplying, one by one, each output of said first adding means by the complex conjugate of each corresponding element of said gain vector at the present snapshot; and a second adding means for producing an estimated value for said maximum eigenvalue of said autocorrelation matrix of said present snapshot, by adding the outputs of all said second multiplying means respectively connected to each said corresponding row.

30. A telecommunication system having an array antenna according to claim 27, wherein said adaptive gain synthesizing means comprises:

a plurality of first multiplying means for multiplying, one by one, each element of each row of said autocorrelation matrix by the corresponding element of said search direction vector;

a plurality of first adding means, of which the number is as many as the number of rows of said autocorrelation matrix, for adding the results of said first multiplying means for each row;

a plurality of first multiplying means for multiplying each output of said first adding means by the complex conjugate of each corresponding element of said gain vector;

a second adding means for adding the outputs of all said second multiplying means;

a plurality of third multiplying means for multiplying each output of said first adding means by the complex conjugate of said corresponding element of said search direction vector;

a third adding means for adding the outputs of all said third multiplying means;

a plurality of fourth multiplying means for multiplying each element of said search direction vector by the complex conjugate of said corresponding element of said gain vector;

a fourth adding means for adding the outputs of all said fourth multiplying means;

a plurality of fifth multiplying means for multiplying each element of said search direction vector by the complex conjugate of each said element, one by one;

a fifth adding means for adding all the outputs of said fifth multiplying means; and, an adaptive gain computing means for computing an adaptive gain from the outputs of said second, third, fourth and fifth adding means.

31. A telecommunication system having an array antenna according to claim 30, wherein said adaptive gain computing means generates said adaptive gain ($\sigma$) in accordance with the equation given below:

$$\rho = \frac{-F - \sqrt{F^2 - 4EG}}{2E}$$

where E, F and G are defined as
E=B·Re [C]−D·Re [A],
F=B−$\lambda$·D,
G=Re [D]−$\lambda$·Re [C], with A, B, C and D being the output of said second adding means, said third adding means, said fourth adding means and said fifth adding means, respectively, and $\lambda$ is said maximum eigenvalue, and Re [·] denotes the real part of the complex quantity "·".

32. A telecommunication system having an array antenna according to claim 14, wherein said signal processing means comprises:

a matrix operation approximation means for receiving a signal vector (x(t)) provided from said array antenna at each snapshot, and for generating a gamma vector ($\gamma$) and a zeta vector ($\zeta$) by approximating, at each snapshot, a first and a second matrix-oriented operations including autocorrelation matrix operations with the corresponding vector operations;

a means for estimating the maximum eigenvalue of said autocorrelation matrix supplied from said matrix operation approximation means;

a means for generating a residue vector, by utilizing said gamma vector ($\gamma$), said maximum eigenvalue and said gain vector of the present snapshot;

a means for generating a scalar quantity by utilizing said residue vector;

a means for generating a search direction vector, by utilizing said residue vector and said scalar quantity;

a means for generating an adaptive gain ($\sigma$) at each snapshot, by utilizing said zeta vector ($\zeta$), said search direction vector, said maximum eigenvalue and said gain vector at the present snapshot; and a means for updating said gain vector by utilizing said search direction vector and said adaptive gain at each snapshot.

33. A telecommunication system having an array antenna according to claim 32, wherein said residue vector synthesizing means comprises:

a plurality of multiplying means for multiplying every element of said gain vector by said maximum eigenvalue ($\lambda$) that has been estimated presently; and a plurality of adding means for subtracting, one by one, each element of said search direction vector from each corresponding output of said multiplying means.

34. A telecommunication system having an array antenna according to claim 32, wherein said matrix operation approximation means comprises:

a plurality of first multiplying means for multiplying each element of said signal vector (x), which is supplied from the outside, by the complex conjugate of said final array output (y) of said telecommunication system, which is produced at the last previous snapshot;

a plurality of second multiplying means for multiplying each element of said gamma vector computed at the last previous snapshot by a forgetting factor (f);

a plurality of third multiplying means for multiplying each element of said zeta vector computed at the last previous snapshot by said forgetting factor (f);

a plurality of fourth multiplying means for multiplying the outputs of said third multiplying means by said adaptive gain ($\sigma$) generated from said adaptive gain synthesizing means;

a plurality of first adding means for adding the outputs of said fourth multiplying means to the outputs of said second multiplying means;

a plurality of second adding means for adding the outputs of said first adding means to the outputs of said first multiplying means;

a plurality of fifth multiplying means for multiplying the complex conjugate of each element of said signal vector (x), by each corresponding element of said search direction vector (v), which is generated from said search direction vector synthesizing means;

a third adding means for adding up all the outputs of said fifth multiplying means;

a plurality of sixth multiplying means for multiplying the outputs of said third adding means to each element of said signal vector (x);

a plurality of seventh multiplying means for multiplying the outputs of said third multiplying means by said scalar quantity ($\beta$); and a plurality of fourth adding means for adding the outputs of said seventh multiplying means to each corresponding output of said sixth multiplying means.

35. A telecommunication system having an array antenna according to claim 32, wherein said maximum eigenvalue synthesizing means comprises:

a plurality of multiplying means for multiplying, one by one, each element of said gamma vector by the complex conjugate of each element of said gain vector at the present snapshot; and an adding means for adding up all the outputs of said multiplying means.

36. A telecommunication system having an array antenna according to claim 32, wherein said adaptive gain synthesizing means comprises:

a plurality of first multiplying means for multiplying, one by one, each element of said zeta vector, which is an output of said matrix operation approximation means, by the complex conjugate of each corresponding element of said gain vector;

a first adding means for adding up all the outputs of said first multiplying means;

a plurality of second multiplying means for multiplying, one by one, each element of said zeta vector by the complex conjugate of each corresponding element of said search direction vector;

a second adding means for adding up all the outputs of said second multiplying means;

a third plurality of multiplying means for multiplying each element of said search direction vector by the complex conjugate of each corresponding element of said gain vector;

a third adding means for adding up all the outputs of said third multiplying means;

a plurality of fourth multiplying means for multiplying each element of said search direction vector by the complex conjugate of each corresponding element of said search direction vector;

a fourth adding means for adding up all the outputs of said multiplying means; and an adaptive gain computing means for said adaptive gain from the outputs of said first, second, third and fourth adding means.

37. A telecommunication system having an array antenna according to claim 36, wherein said adaptive gain synthesizing means generates said adaptive gain ($\sigma$) in accordance with the equation given below:

$$\rho = \frac{-F - \sqrt{F^2 - 4EG}}{2E}$$

where E, F and G are defined as
E=B·Re [C]–D·Re [A],
F=B–$\lambda$·D,
G=Re [D]–$\lambda$·Re [C], with A, B, C and D being the output of said first adding means, said second adding means, said third adding means and said fourth adding means, respectively, and $\lambda$ is the maximum eigenvalue, and Re [·] denotes the real part of the complex quantity "·".

38. A signal processing method for a telecommunication system having an array antenna generating a beam pattern with a complex-valued gain vector having its maximum gain along a direction of wanted signal keeping a gain along the other directions in relatively lower level, comprising the steps of:

(a) setting an initial gain vector;

(b) receiving signals with the gain vector at a present snapshot, or transmitting a target signal with the gain vector computed during a receiving mode or both;

(c) updating a snapshot index to continue next snapshot and receiving new signals for a new snapshot;

(d) determining whether an autocorrelation matrix is computed with an instantaneous signal vector only;

(e) setting a forgetting factor with 0, if so, otherwise, setting up the forgetting factor properly in between 0 and 1;

(f) updating the autocorrelation matrix by an equation (R(k)=fR(k–1)+x(k) $x^H$(k), where f is the forgetting factor, k denotes a snapshot index, and a superscript H is a Hermitian operator);

(g) computing the gain vector in such a way that each element of the gain vector be as close as possible to corresponding element of an eigenvector corresponding to a maximum eigenvalue of an updated autocorrelation matrix; and (h) going back to step (b) to repeat.

39. A signal processing method for a telecommunication system according to claim 38, further comprising the step of:

(i) performing a cross-correlation of received signals with a predetermined chip code of wanted signal after receiving new signals is comprised for applying a proposed method in a signal environment of spread spectrum.

40. A signal processing method for a telecommunication system according to claim 38, wherein the gain vector is determined by a vector that maximizes a power of a final array output at each snapshot.

41. A signal processing method for a telecommunication system according to claim 40, wherein the gain vector is determined by the eigenvector corresponding to the maximum eigenvalue of the autocorrelation matrix.

42. A telecommunication system comprising:

an array antenna consisting of plural antenna elements of predetermined arrangement and spacing between said antenna elements;

a signal receiving apparatus wherein a reception of signals is performed by a weighted sum of a received signal vector (x(k)) with a complex gain vector (w(k)) maximizing a magnitude of a final array output, in accordance with an equation:

$y(k)=w^H(k)\,x(k)$ with a constraint of $|w(k)|=1$ at each snapshot; and a signal transmitting apparatus wherein the gain vector is used during a transmitting mode.

43. A telecommunication system according to claim 42, wherein a constraint on the magnitude of the gain vector is an arbitrary positive real constant (i.e., $|w(k)|=C$, where C is a preset positive and real constant).

44. A signal processing method for an array antenna, comprising the steps of:

(a) setting up an initial gain vector ($w(0)$) based on signals received initially;

(b) receiving signals with the gain vector at a present snapshot, or transmitting a target signal with the gain vector computed during a receiving mode, or both;

(c) confirming whether the present snapshot is the last snapshot, if so, ending off all procedures;

(d) otherwise, setting a next snapshot, updating an autocorrelation matrix based on new signal vector received, and updating the gain vector with a value which approximates to an eigenvector corresponding to a maximum eigenvalue of autocorrelation matrix of received signals, in accordance with an equation:

$$Rw=\lambda_{MAX}w;$$

where R denotes the autocorrelation matrix of received signals with $\lambda_{MAX}$ being the maximum eigenvalue of R; and (e) going back to said step (b) to repeat the procedures at each snapshot.

* * * * *

UNITED STATES PATENT AND TRADEMARK OFFICE
CERTIFICATE OF CORRECTION

PATENT NO. : 5,999,800
DATED : December 7, 1999
INVENTOR(S) : Choi et al.

Page 1 of 1

It is certified that error appears in the above-identified patent and that said Letters Patent is hereby corrected as shown below:

Column 4,
Line 46, insert new paragraph at "Also, in..."

Column 8,
Line 46, Formula at line 46 should be moved to line 57
Line 57, Formula at line 57 should be moved up to line 46

Column 13,
Line 67, "b(k)=v..." should read "b(c)=| v... --

Column 31,
Line 27, insert -- • -- between "λ" and "Re"

Column 33,
Line 47, "$w_{(i)}^{j}$" should read -- $w_j^{(i)}$ --
Line 66, "1/2 should read -- 1/12 --

Signed and Sealed this

Sixteenth Day of October, 2001

Attest:

NICHOLAS P. GODICI
Attesting Officer      Acting Director of the United States Patent and Trademark Office